United States Patent
Miyoshi et al.

(10) Patent No.: US 7,415,909 B2
(45) Date of Patent: Aug. 26, 2008

(54) SUPPORT STRUCTURE FOR PEDAL OF VEHICLE

(75) Inventors: Keisuke Miyoshi, Hiroshima (JP);
Kazunori Tomonou, Hiroshima (JP);
Takeshi Murayama, Atsugi (JP);
Fumihiko Nomura, Hiroshima (JP);
Hiroyuki Utsumi, Hiroshima (JP);
Tetsuo Hiura, Hiroshima (JP);
Katsuhiko Yamamoto, Hiroshima (JP)

(73) Assignees: Mazda Motor Corporation, Hiroshima (JP); Kuroishi Iron Works Co., Ltd., Hiroshima (JP)

( * ) Notice: Subject to any disclaimer, the term of this patent is extended or adjusted under 35 U.S.C. 154(b) by 213 days.

(21) Appl. No.: 11/081,881

(22) Filed: Mar. 17, 2005

(65) Prior Publication Data

US 2005/0217264 A1    Oct. 6, 2005

(30) Foreign Application Priority Data

| Mar. 31, 2004 | (JP) | ................... 2004-102224 |
| Mar. 31, 2004 | (JP) | ................... 2004-102225 |
| Mar. 31, 2004 | (JP) | ................... 2004-102227 |
| Mar. 31, 2004 | (JP) | ................... 2004-102229 |
| Mar. 31, 2004 | (JP) | ................... 2004-102230 |

(51) Int. Cl.
*G05G 1/30* (2008.04)

(52) U.S. Cl. .................. 74/560; 74/512; 296/187.05; 60/554; 180/274

(58) Field of Classification Search .......... 180/271, 180/274; 296/187.05; 74/512, 560
See application file for complete search history.

(56) References Cited

U.S. PATENT DOCUMENTS 4,875,385 A * 10/1989 Sitrin ...................... 74/512

(Continued)

FOREIGN PATENT DOCUMENTS

DE    19757832    7/1998

(Continued)

OTHER PUBLICATIONS

European Search Report dated Apr. 23, 2007.

(Continued)

*Primary Examiner*—Eric Culbreth
*Assistant Examiner*—Karen J. Amores
(74) *Attorney, Agent, or Firm*—Studebaker & Brackett PC; Donald R. Studebaker

(57) ABSTRACT

A support structure for a pedal of a vehicle pivotablly supports a pedal assembly (34) to a pedal bracket (38) mounted on a vehicle dash panel (6). The support structure for a pedal of a vehicle includes a reinforce member (14) for the vehicle body; an upper pedal member (44, 46); a lower pedal member (48) having a pedal (48*c*) at its lower end; an abutting member (50) not coming into contact with the reinforce member when the vehicle is in a normal operation, while it abuts against the reinforce member at its abutting portion (50*g*) by moving in the rearward direction of the vehicle body when the vehicle crashes; and a connecting mechanism (60) for connecting the abutting member to the lower pedal member in such a manner that relative movement with respect to each other is prevented when the vehicle is in a normal operation, while the connecting mechanism forcibly displaces the lower portion (48*b*) of the lower pedal member, which is the part locating below the pivot shaft of the lower pedal member, in a forward direction with respect to the upper pedal member when the vehicle crashes.

23 Claims, 25 Drawing Sheets

U.S. PATENT DOCUMENTS

| | | | |
|---|---|---|---|
| 6,041,674 A * | 3/2000 | Kato ........................... 74/512 |
| 6,571,900 B2 * | 6/2003 | Thistleton .................. 180/274 |
| 7,219,576 B2 * | 5/2007 | Leonard et al. ............... 74/518 |
| 2003/0019319 A1 | 1/2003 | Mizuma |
| 2003/0019320 A1 * | 1/2003 | Thistleton et al. ............. 74/560 |
| 2004/0226399 A1 * | 11/2004 | Hayashihara ................ 74/512 |
| 2005/0056115 A1 * | 3/2005 | Da Silva et al. ............... 74/512 |
| 2005/0188781 A1 * | 9/2005 | Suzuki ........................ 74/512 |
| 2005/0217264 A1 * | 10/2005 | Miyoshi et al. ............... 60/554 |
| 2006/0162481 A1 * | 7/2006 | Sato ........................... 74/512 |

FOREIGN PATENT DOCUMENTS

| | | |
|---|---|---|
| EP | 0805079 | 11/1997 |
| EP | 1 285 832 | 2/2003 |
| JP | 10226325 | 8/1998 |
| JP | 10244914 | 9/1998 |
| JP | 2001-030884 | 2/2001 |
| JP | 2001-047986 | 2/2001 |
| JP | 2002-274432 | 9/2002 |
| JP | 2003054390 | 2/2003 |
| WO | WO03045750 A1 | 6/2003 |

OTHER PUBLICATIONS

Official Action on Apr. 21, 2008 regarding the corresponding Japanese patent application.

* cited by examiner

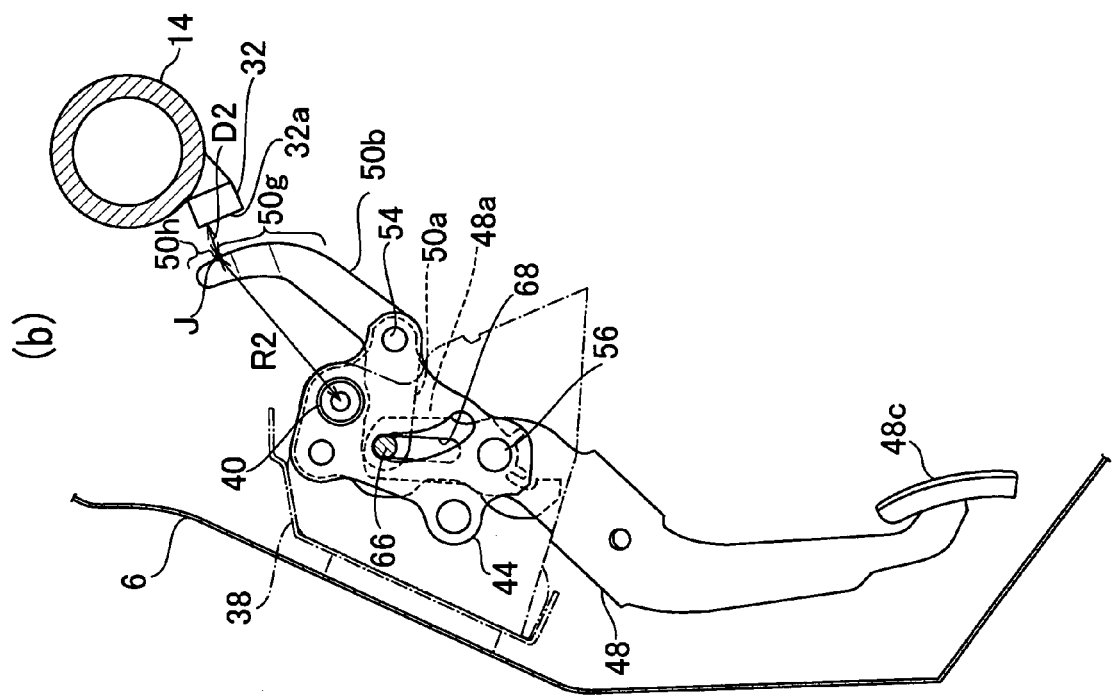
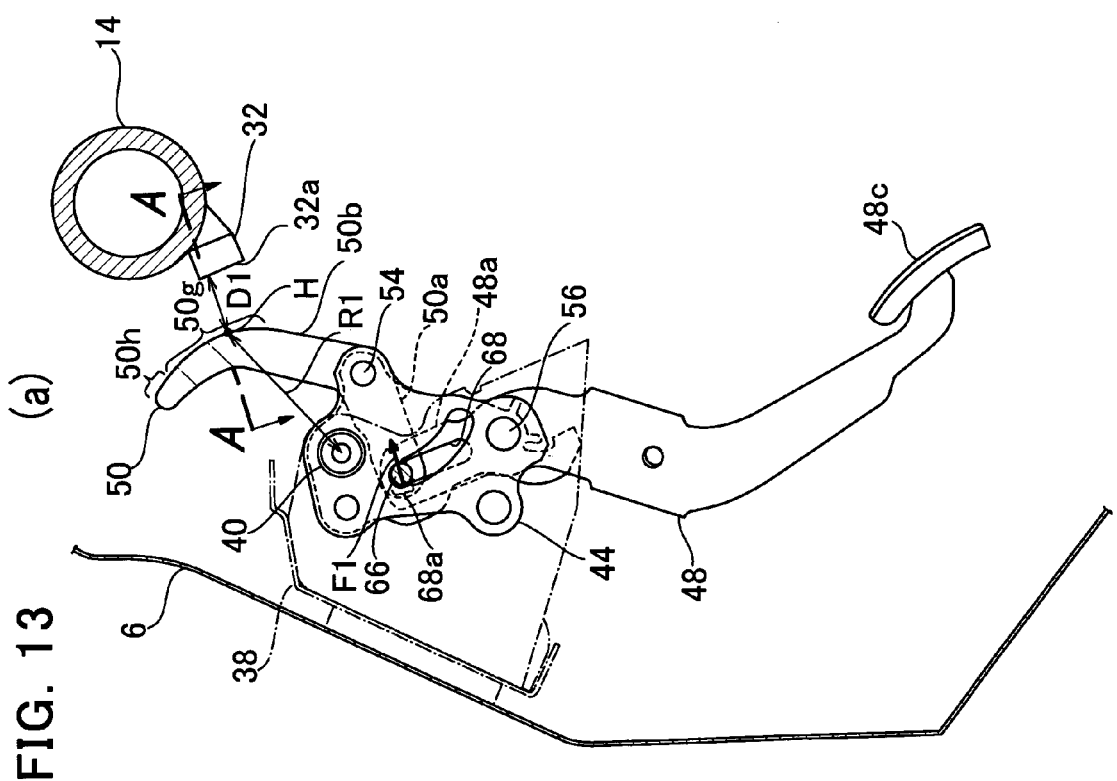
FIG. 13

FIG. 15
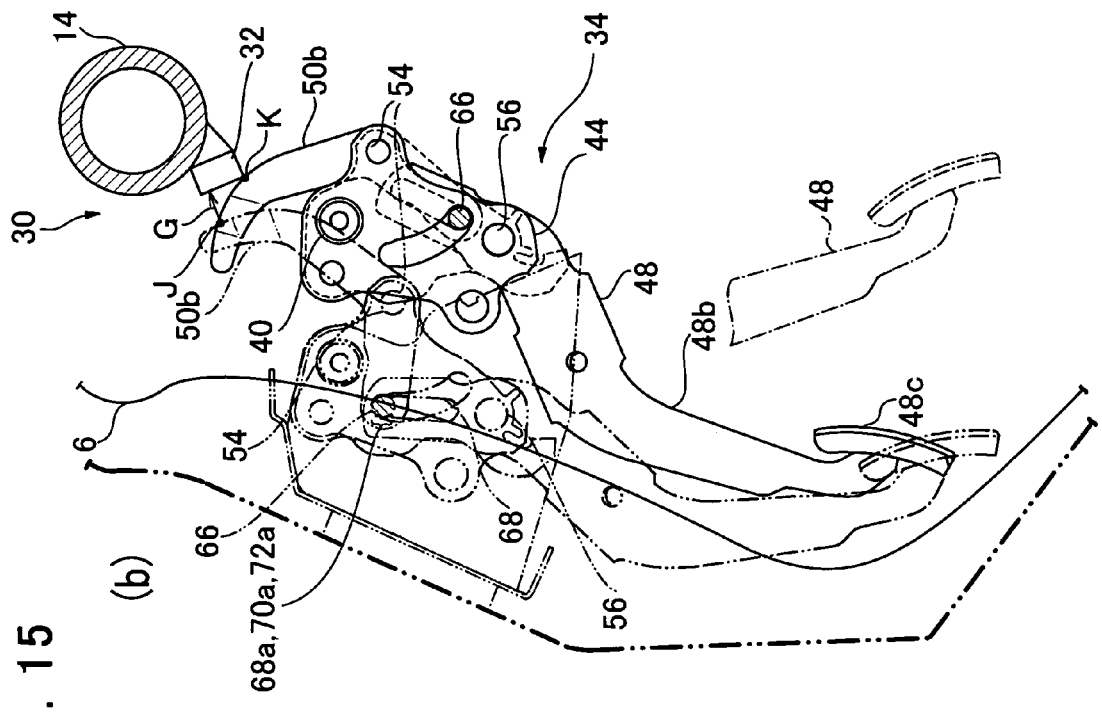
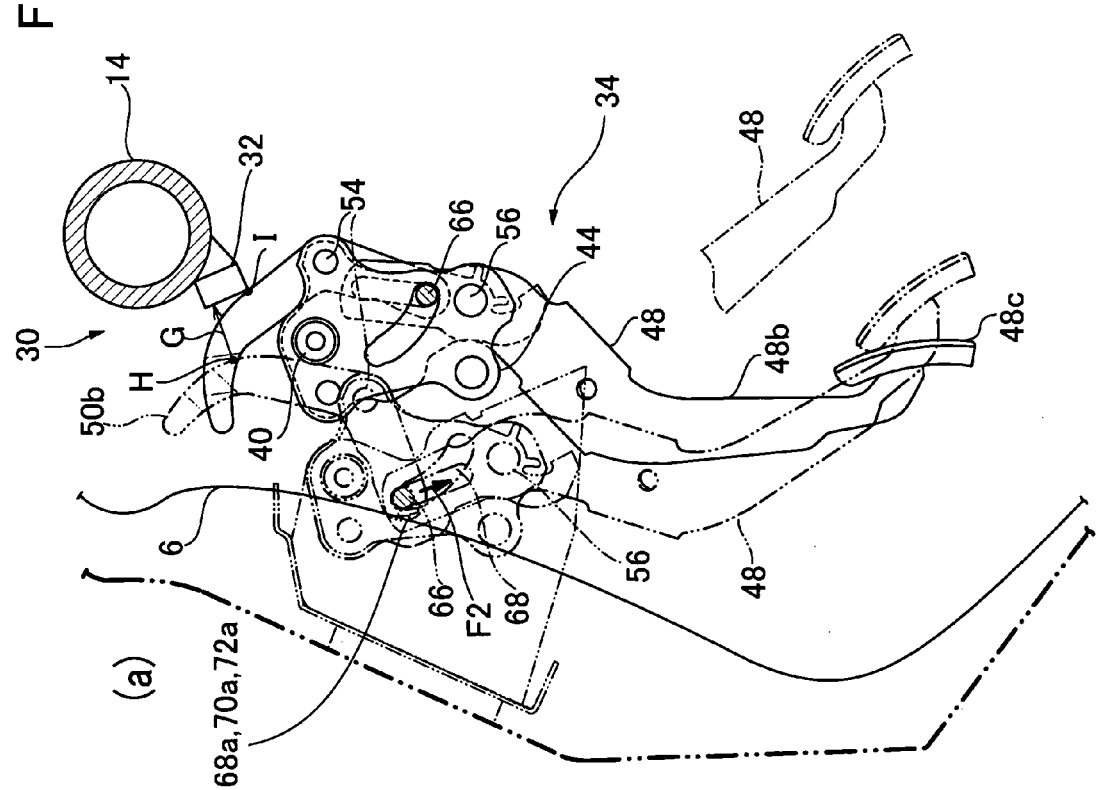

FIG. 16
(a) PIVOTING SPEED CHARACTERISTIC OF WING-CAM
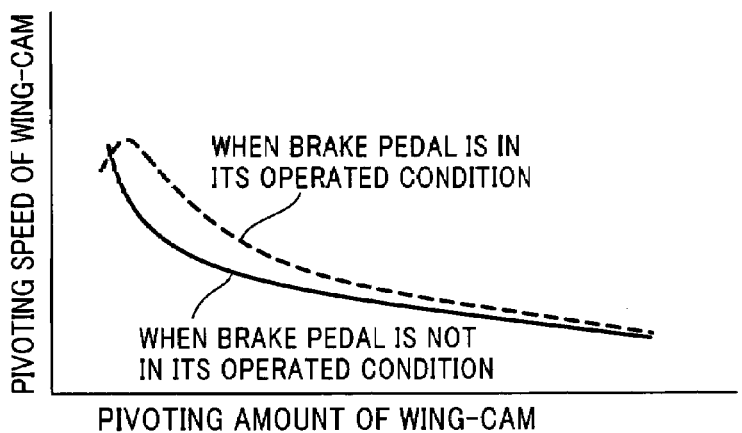
(b) PIVOTING CHARACTERISTIC OF ELONGATED HOLE OF CONNECTING MECHANISM
(WING-CAM PIVOTING SPEED IS CONSTANT)
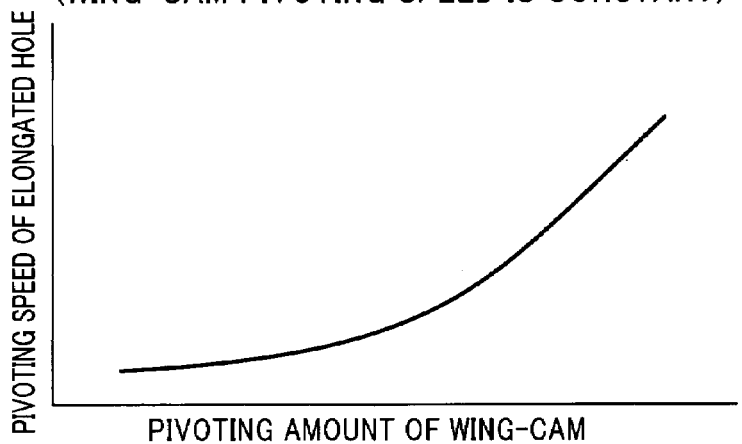
(c) FORCIBLE DISPLACEMENT CHARACTERISTIC OF LOWER PEDAL MEMBER
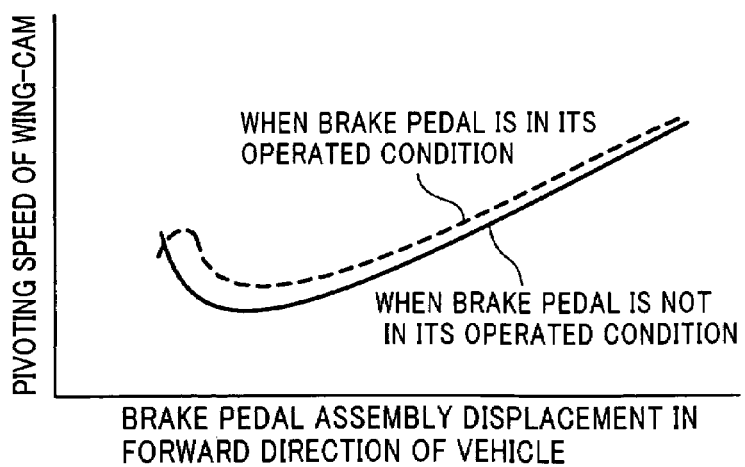

SUPPORT STRUCTURE FOR PEDAL OF VEHICLE

BACKGROUND OF THE INVENTION

1. Field of the Invention

The present invention relates to a support structure for a pedal of a vehicle, and in particular to a support structure for a pedal of a vehicle which pivotablly supports a pedal assembly to a pedal bracket mounted on the vehicle dash panel.

2. Description of the Related Art

In vehicle accidents such as front end collisions, the engine of the vehicle is forced rearwardly by a large load force affecting the front portion of the vehicle which causes the brake pedal and/or the clutch pedal attached to the dash-board lower panel to be pushed into the cabin of the vehicle, thereby interfering with the driver's feet or compressing the foot space of the driver.

In order to prevent such an interference, for example, Japanese Patent Unexamined Publication No. 2001-47986(A1) discloses an escape structure for a foot pedal wherein the foot pedal is attached to a pivotable link which is pivotablly connected both to a pedal bracket attached to a vehicle dash panel and to a member connected between pillars, which pivotable link is pivoted by the rearward movement of the pedal bracket, thereby moving the foot pedal in the frontward direction.

However, since the escape structures are not integrated and the pivotable link is connected both to the pedal bracket and to the member connected between pillars, it can be difficult for the pivotable link to be pivoted, especially when the moving direction of the pedal bracket is varied vertically and/or horizontally due to variability of the parts or deforming conditions of the vehicle dash panel. Furthermore, vibration of the member connected between the pillars causes the vibration of the pedal, which makes it difficult for the driver to feel the pedal. Also, because the pivotable link is connected both to the vehicle dash panel and to the member connected between the pillars, the assembling operation is complex.

Japanese Patent Unexamined Publication No. 2002-274432(A1) discloses an escape structure for the foot pedals wherein a foot pedal and a support means connected thereto are integrally engaged by a stop means, which engagement is released by deformation of the pedal bracket caused by a large load force affecting the front portion of the vehicle, whereby the foot pedal is moved in the direction to the front of the vehicle body by a spring biased force.

On the other hand, because deformation of the pedal bracket is utilized for pivoting the stop means, which pivoting action releases the engagement between the foot pedal and the support means, there is some risks that the escape structure will not operate properly, depending on the deforming conditions of the pedal bracket.

SUMMARY OF THE INVENTION

One object of the present invention is to provide a support structure for a pedal of a vehicle which provides reliable forcible displacement of a pedal in the direction to the front of the vehicle.

Another object of the present invention is to provide a support structure for a pedal of a vehicle which provides reliable forcible displacement of a pedal in the direction to the front of the vehicle, both when the pedal is not in its operated condition and when the pedal is in its operated condition.

Another object of the present invention is to provide a support structure for a pedal of a vehicle which provides reliable forcible displacement of the pedal in the direction to the front of the vehicle, depending on the amount of crashing force exerted on the vehicle.

The above object is achieved by providing a support structure for a pedal of a vehicle which pivotablly supports a pedal assembly to a pedal bracket mounted on a vehicle dash panel forming the front part of the inner space of the cabin of the vehicle, said support structure comprising: a reinforce member for the vehicle body extending in the width direction of the vehicle, the reinforce member being located rearwardly relative to said pedal bracket; an upper pedal member pivotablly supported on the pedal bracket; a lower pedal member pivotablly supported, on the upper pedal member, the lower pedal member having a pedal at lower end thereof, an abutting member pivotablly supported on the upper pedal member, the abutting member not coming into contact with the reinforce member when the vehicle is in a normal operation, while the abutting member abuts against the reinforce member by moving in the rearward direction of the vehicle body when the vehicle crashes; and a connecting mechanism for connecting the abutting member to the lower pedal member in such a manner that relative movement with respect to each other is prevented when the vehicle is in a normal operation, while the connecting mechanism forcibly displaces the lower portion of the lower pedal member, which is located below the pivot shaft of the lower pedal member, in a forward direction with respect to said upper pedal member when the vehicle crashes.

In accordance with the present invention described above, the pedal bracket pivotablly supports the upper pedal member, and the upper pedal member pivotablly supports the lower pedal member and the abutting member, respectively. When the vehicle is in a normal operation, i.e., when the vehicle has not crashed, the abutting member and the lower pedal member are connected by the connecting mechanism with respect to each other so that the relative movement therebetween is prevented, and the upper pedal member and the lower pedal member are pivoted integrally, whereby enabling a normal operation of the pedal by the driver. When the vehicle crashes, on the other hand, the abutting portion of the abutting member is moved in the rearward direction of the vehicle body to abut against the reinforce member of the vehicle which causes the pivoting action of the abutting member. Thus, the lower portion of the lower pedal member, which is located below the pivot shaft of the lower pedal member, is forcibly displaced in the forward direction of the vehicle body by the action of the connecting mechanism.

Furthermore, because the abutting portion of the abutting member does not come into contact with the reinforce member of the vehicle when the vehicle is in a normal operation, but only when the vehicle crashes, it abuts against the reinforce member of the vehicle by moving in the rearward direction of the vehicle body, so as to provide forcible displacement of the lower portion of the lower pedal member in the forward direction of the vehicle body. Thus, the abutting member, the upper pedal member, and lower pedal member can be integrated without being connected to the reinforce member of the vehicle.

Preferably, in the present invention, the connecting mechanism is comprised of a connecting elongated hole formed on the lower pedal member and a pin means fixed on said abutting member and inserted in the connecting elongated hole.

In accordance with the present invention described above, the abutting member and the lower pedal member are connected reliably.

Preferably, in the present invention, the connecting mechanism is a link mechanism which comprises: a pivot shaft of said abutting member; a front portion of the abutting member located in front of the pivot shaft thereof, a pin means fixed at the end of the front portion of the abutting member; an upper portion of the lower pedal member; a pivot shaft for the lower pedal member; and a connecting elongated hole formed at an upper portion of the lower pedal member, which is located above the pivot shaft of the lower pedal member, the connecting elongated hole receiving the pin means therein.

In accordance with the present invention described above, since the connecting mechanism is a link mechanism, the abutting member and the lower pedal member are connected reliably, and the lower portion of the lower pedal member can be forcibly displaced reliably in the forward direction of the vehicle by the pivoting action of the abutting member.

Also, because pin means is provided at the end of the front portion of the abutting member located in front of the pivot shaft and the connecting elongated hole is formed at an upper portion of the lower pedal member, which is located above the pivot shaft for the lower pedal member, when the front portion of the abutting member pivots about its pivot shaft, the pin means is moved along the connecting elongated hole and moves the upper portion of the lower pedal member rearwardly by the connecting elongated hole, thereby the lower portion of the lower pedal member can be forcibly displaced in the forward direction of the vehicle body reliably.

Preferably, in the present invention, the front portion of the abutting member located in front of the pivot shaft thereof is located in the direction, when the vehicle is in a normal operation, generally normal relative to the connecting elongated hole of the lower pedal member.

In accordance with the present invention described above, when the vehicle crashes, the moving direction of the pin means generally corresponds with the elongating direction of the connecting elongated hole, thereby the pin means can easily start moving from the position, that it is in when the vehicle is in a normal operation, toward the position, that it is in when the vehicle crashes, by the pivoting action of the abutting member. Furthermore, the moving direction of the pin means gradually goes in the direction generally normal to the elongating direction of the connecting elongated hole, which causes the upper portion of the lower pedal member to be pivoted rearwardly. As a result, the lower portion of the lower pedal member can be forcibly displaced in the forward direction of the vehicle body reliably.

Preferably, in the present invention, the connecting elongated hole extends in a radial direction of the pivot shaft of the lower pedal member.

In accordance with the present invention described above, when the vehicle is in a normal operation and when the pedal is in its operated condition, the direction of the force between the pin means and the connecting elongated hole is generally normal with respect to the connecting elongated hole, which direction of the force corresponds with the extending direction of the front portion of the abutting member. Thus, when the vehicle is in a normal operation and when the pedal is in its operated condition, the pin means does not move along the connecting elongated hole, and with the assistance of the frictional force therebetween, the connecting elongated hole and the pin means are locked together in the position, as a result of which, the relative movement between the abutting member and the lower pedal member is prevented, which allows a normal operation of the braking.

Preferably, in the present invention, the upper pedal member, the lower pedal member and the abutting member are located in the same space in a plan view.

In accordance with the present invention described above, the upper pedal member, the lower pedal member and the abutting member are less likely to be deformed by the force exerted affected from the reinforce member of the vehicle. As a result of that, the upper pedal member, the lower pedal member, and the abutting member are less likely to come into contact with each other, which contacts can prevent the relative movement therebetween. Also, positions between the connecting elongated hole and the pin means relative to each other are less likely to change, thus providing reliable operation of the connecting mechanism.

Preferably, in the present invention, the upper pedal member, the lower pedal member and the abutting member have a common pivot shaft, and the connecting mechanism is comprised of an engaging member which connects said upper pedal member and the lower pedal member integrally when the vehicle is in a normal operation, and which releases connection between the upper pedal member and the lower pedal member when the vehicle crashes, and a cam member which forcibly displaces the lower portion of the lower pedal member, when the vehicle crashes, in a direction to the front of the vehicle body by abutting against said abutting member and pivot movement thereof.

In accordance with the present invention described above, when the vehicle is in a normal operation, the upper pedal member and the lower pedal member are connected integrally by the engaging member of the connecting mechanism in order to provide normal operation of the pedal, while when the vehicle crashes, the connection between the upper pedal member and the lower pedal member is released by the engaging member of the connecting mechanism, and furthermore the lower portion of the lower pedal member which is now released is forcibly displaced in the forward direction of the vehicle body by the cam member of the connecting mechanism.

Preferably, in the present invention, an abutting portion of the abutting member is formed in an area that comes into contact with the reinforce member of the vehicle body, both when the pedal is in its operated condition and when the pedal is not in its operated condition, and formed in an arc-like shape having a constant distance from the pivot shaft of said upper pedal member.

In accordance with the present invention described above, when the vehicle crashes, both when the pedal is in its operated condition and when the pedal is not in its operated condition, a reliable abutment of the abutting member against the reinforce member of the vehicle can be obtained. Also, this construction allows the time that the abutting member abuts against the reinforce member of the vehicle when the pedal is its operated condition to be the same as that when the pedal is not in its operated condition, thereby providing protection for the driver's feet both when the pedal is in its operated condition and when the pedal is not in its operated condition.

Preferably, in the present invention, the abutting portion of the abutting member is formed in an area that comes into contact with the reinforce member of the vehicle, both when the pedal is in its operated condition and when the pedal is not in its operated condition, and formed in such a manner that the distance of the abutting portion from the reinforce member of the vehicle when the pedal is in its operated condition is the same as that when the pedal is not in its operated condition.

In accordance with the present invention described above, when the vehicle crashes, both when the pedal is in its operated condition and when the pedal is not in its operated condition, a reliable abutment of the abutting member against the reinforce member of the vehicle can be obtained. Also, this construction allows the time that the abutting member abuts against the reinforce member of the vehicle when the pedal is in its operated condition to be the same as that when the pedal is not in its operated condition, thereby providing protection for the driver's feet both when the pedal is in its operated condition and when the pedal is not in its operated condition.

Preferably, in the present invention, the abutting portion of the abutting member is formed in an area that comes into contact with the reinforce member of the vehicle, both when the pedal is in its operated condition and when the pedal is not in its operated condition, and formed in such a manner that the distance of the abutting portion from the pivot shaft of the upper pedal member, when the pedal is in its operated condition, is longer than that of when the pedal is not in its operated condition.

In accordance with the present invention described above, when the vehicle crashes, both when the pedal is in its operated condition and when the pedal is not in its operated condition, a reliable abutment of the abutting member against the reinforce member of the vehicle can be obtained. Also, this construction allows the abutting member to abut against the reinforce member of the vehicle when the pedal is in its operated condition earlier than when the pedal is not in its operated condition. Therefore, although a large impact force can affect the driver's feet, since his feet are pressing the pedal when the pedal is in its operated condition, the lower portion of the lower pedal member can be forcibly displaced earlier, whereby the impact force affecting the driver's feet can be reliably reduced.

Preferably, in the present invention, the abutting portion of the abutting member is formed in an area that comes into contact with the reinforce member of the vehicle, both when the pedal is in its operated condition and when the pedal is not in its operated condition, and formed in such a manner that the distance of the abutting portion from the pivot shaft of the upper pedal member, when the pedal is in its operated condition, is shorter than that of when the pedal is not in its operated condition.

In accordance with the present invention described above, when the vehicle crashes, both when the pedal is in its operated condition and when the pedal is not in its operated condition, a reliable abutment of the abutting member against the reinforce member of the vehicle can be obtained. Also, this construction allows the abutting member to abut against the reinforce member of the vehicle when the pedal is in its operated condition earlier when the pedal is not in its operated condition. Therefore, although a large impact force can affect the driver's foot, since his foot is pressing the pedal when the pedal is in its operated condition, the lower portion of the lower pedal member can be forcibly displaced earlier, whereby the impact force affecting the driver's foot can be reliably reduced.

Preferably, in the present invention, the abutting member and the connecting mechanism are constructed in such a manner that, when the vehicle crashes, the amount of the forcible displacement of the lower pedal member in the late stage of crash of the vehicle is greater than that of in the initial stage of crash of the vehicle.

In accordance with the present invention described above, when the vehicle crashes, the movement of the lower portion of the lower pedal member toward the cabin of the vehicle can effectively be prevented. More particularly, when the driver is operating the pedal, an impact force received by the driver in the late stage of crash of the vehicle can be reduced.

Preferably, in the present invention, the connecting mechanism is a link mechanism which comprises: a pivot shaft of said abutting member; a front portion of the abutting member located in front of the pivot shaft thereof; a pin means fixed at the end of the front portion of the abutting member; an upper portion of the lower pedal member; a pivot shaft for the lower pedal member; and a connecting elongated hole formed at an upper portion of the lower pedal member, which is located above the pivot shaft of the lower pedal member, the connecting elongated hole receiving the pin means therein. Further, the speed of the forcible displacement of the lower pedal member in from the initial stage to the late stage of crash of the vehicle is determined by the extending direction of the connecting elongated hole of the lower pedal member.

In accordance with the present invention described above, since the connecting mechanism is a link mechanism, the abutting member and the lower pedal member can be connected reliably, and the lower portion of the lower pedal member can be forcibly displaced reliably in the forward direction of the vehicle by the pivoting action of the abutting member.

Also, since the pin means is fixed at the end of the front portion of the abutting member, which front portion is located in front of the pivot shaft for the abutting member, and the connecting elongated hole is formed at the upper portion of the lower pedal member, which upper portion is located above the pivot shaft for the lower pedal member, when the front portion of the abutting member pivots around its pivot shaft, the pin means is moved along the connecting elongated hole and move the upper portion of the lower pedal member rearwardly. As a result, the lower portion of the lower pedal member is forcibly displaced in the forward direction of the vehicle body reliably.

Furthermore, the speed of the forcible displacement of the lower pedal member in from the initial stage to the late stage of crash of the vehicle is determined by the extending direction of the connecting elongated hole of the lower pedal member, the lower portion of the lower pedal member can be forcibly displaced in the forward direction of the vehicle body reliably, with a desired amount of forcible displacement, mainly in the initial stage of crash of the vehicle and also in the late stage of crash of the vehicle.

Preferably, in the present invention, the speed of the forcible displacement of the lower pedal member in from the initial stage to the late stage of crash of the vehicle is determined by the extending direction of the upper portion of the abutting member, which is located above the pivot shaft of said abutting member and includes said abutting portion thereof.

In accordance with the present invention described above, the lower portion of the lower pedal member can be forcibly displaced in the forward direction of the vehicle body reliably, with a desired amount of forcible displacement and with a desired speed of forcible displacement, mainly in the initial stage of crash of the vehicle and also in the late stage of crash of the vehicle.

Preferably, in the present invention, the abutting member is constructed in such a manner that the upper portion of the abutting member located above the pivot shaft thereof and including the abutting portion extends to the right above of the pivot shaft, and the connecting elongated hole of the lower pedal member is formed along a direction generally normal relative to the direction in which the front portion of the abutting member located in front of the pivot shaft thereof extends.

In accordance with the present invention described above, since the abutting member is constructed in such a manner that the upper portion of the abutting member located above the pivot shaft thereof and including the abutting portion extends to the right above of the pivot shaft, the abutting member can be abutted against the reinforce member of the vehicle reliably. Also, since the connecting elongated hole of the lower pedal member is formed along a direction generally normal relative to the direction in which the front portion of the abutting member located in front of the pivot shaft thereof extends, the amount of the forcible displacement of the lower portion of the lower pedal member can be enlarged reliably in the late stage of crash of the vehicle.

Preferably, in the present invention, the upper portion of the abutting member located above the pivot shaft thereof and including the abutting portion is arranged, when the pedal is in its operated condition, to slightly incline rearwardly right above the pivot shaft.

In accordance with the present invention described above, the abutting member will keep pivoting in an area located right above the pivot shaft for longer period when the pedal is in its operated condition than when the pedal is not in its operated condition, during which period, the pivoting speed of the abutting member in the area is faster than that of other area. Furthermore, during almost the whole period from the initial stage of crash of the vehicle to the late stage of crash of the vehicle, the amount of the forcible displacement of the lower portion of the lower pedal member when the pedal is in its operated condition can be larger than when the pedal is not in its operated condition. As a result, although a large impact force can affect the driver's foot, since his foot is pressing on the pedal when the pedal is in its operated condition, the lower portion of the lower pedal member can be forcibly displaced more quickly, whereby the impact force affecting the driver's foot can be reliably reduced.

Preferably, in the present invention, the abutting member is constructed in such a manner that the upper portion of the abutting member located above the pivot shaft thereof and including the abutting portion extends to the right above of the pivot shaft, and the connecting elongated hole of the lower pedal member is formed along a direction generally normal relative to the direction in which the front portion of the abutting member located in front of the pivot shaft thereof extends.

In accordance with the present invention described above, when the vehicle crashes, a large frictional force caused by the pinch force is prevented from affecting the connecting mechanism, thereby providing reliable operation of the connecting mechanism.

Preferably, in the present invention, the reinforce member of the vehicle is formed in such a manner that the reinforce member of the vehicle has a plane and/or convex shape in the width direction of the vehicle body, so as to prevent the displacement of the abutting member in the width direction of the vehicle body from being restricted, when the vehicle crashes and the abutting member is abutted against the reinforce member of the vehicle.

In accordance with the present invention described above, when the vehicle crashes and the abutting member abuts against the reinforce member of the vehicle, the deformation of the abutting member or the increase in the frictional force of the connecting mechanism caused by the abutting member being restricted in the width direction of the vehicle body can be prevented. As a result, the connecting mechanism can be operated reliably.

Preferably, in the present invention, the abutting member is connected to the upper pedal member with one of the sides of the abutting member opened.

In accordance with the present invention described above, the abutting member is allowed to be inclined, whereby a large frictional force generated between the abutting member and the upper pedal member can be prevented. As a result, the force exerted from the reinforce member of the vehicle to the abutting member is reliably transmitted to the pin means, thereby the connecting mechanism can be operated reliably.

Preferably, in the present invention, the connecting mechanism is a link mechanism which comprises: a pivot shaft of the abutting member; a front portion of the abutting member located in front of the pivot shaft thereof; a pin means fixed at the end of the front portion of the abutting member; an upper portion of the lower pedal member; a pivot shaft for the lower pedal member; and a connecting elongated hole formed at an upper portion of the lower pedal member, which is located above the pivot shaft of the lower pedal member, the connecting elongated hole receiving the pin means therein. Further, the upper pedal member has a guiding elongated hole which receives the pin means therein for providing guidance for the pin means when the pin means is slidingly moved in the connecting elongated hole. Still further, the connecting elongated hole is formed tightly with respect to the pin means, while the guiding elongated hole is formed loosely with respect to the pin means.

In accordance with the present invention described above, since the connecting mechanism is the link mechanism, the abutting member and the lower pedal member can be connected reliably, and the lower portion of the lower pedal member can be forcibly displaced in the forward direction of the vehicle reliably by the pivoting action of the abutting member.

Further, since the pin means is fixed at the end of the front portion of the abutting member, which front portion is located in front of the pivot shaft for the abutting member, and the connecting elongated hole is formed at the upper portion of the lower pedal member, which upper portion is located above the pivot shaft for the lower pedal member, when the front portion of the abutting member pivots around its pivot shaft, the pin means is moved along the connecting elongated hole and moves the upper portion of the lower pedal member rearwardly. As a result, the lower portion of the lower pedal member is forcibly displaced in the forward direction of the vehicle body reliably.

Furthermore, since the upper pedal member has a guiding elongated hole which receives the pin means therein for providing guidance for the pin means when the pin means is slidingly moved in the connecting elongated hole and the guiding elongated hole is formed loose with respect to the pin means, even when the abutting member receives a force from the reinforce member of the vehicle which force is likely to incline the abutting member in the width direction of the vehicle body when the pin means is moving along the connecting elongated hole, the pin means can be guided without being restricted as to its movement. Also, not only because of such a way of guidance for the pin means, but also because the connecting elongated hole is formed tight with respect to the pin means, the connecting mechanism can be operated reliably without large play.

Preferably, in the present invention, the guiding elongated hole of the upper pedal member includes an area which has a normally tight relationship with respect to the pin means.

In accordance with the present invention described above, the pin means can be held easily in that area when the vehicle is in a normal operation, whereby providing reliable braking operation when the vehicle is in a normal operation.

Preferably, in the present invention, the upper pedal member is comprised of a first upper pedal member and a second upper pedal member disposed on each side of the said lower pedal member, respectively.

In accordance with the present invention described above, even when the abutting member receives a force from the reinforce member of the vehicle which force is likely to incline the abutting member in the width direction of the vehicle body, the pin means can be guided reliably by being supported at two places spaced apart in the width direction of the vehicle body.

Preferably, in the present invention, the connecting mechanism is a link mechanism which comprises: a pivot shaft of the abutting member; a front portion of the abutting member located in front of the pivot shaft thereof; a pin means fixed at the end of the front portion of the abutting member; an upper portion of said lower pedal member; a pivot shaft for said lower pedal member; and a connecting elongated hole formed at an upper portion of the lower pedal member, which is located above the pivot shaft of the lower pedal member, the connecting elongated hole receiving said pin means therein. Further, the pin means is comprised of a body portion inserted in the connecting elongated hole and penetrates into the abutting member, and a fixing portion for fixing the body portion to the abutting member. Still further, the connecting elongated hole extends in a radial direction of the pivot shaft of the lower pedal member, and the connecting elongated hole of the lower pedal member is formed along a direction generally normal relative to the direction in which the front portion of the abutting member located in front of the pivot shaft thereof extends.

In accordance with the present invention described above, since the connecting mechanism is the link mechanism, the abutting member and the lower pedal member can be connected reliably, and the lower portion of the lower pedal member can be forcibly displaced in the forward direction of the vehicle reliably by the pivoting action of the abutting member.

Further, because the pin means is provided at the end of the front portion of the abutting member located in front of the pivot shaft and the connecting elongated hole is formed at an upper portion of the lower pedal member, which upper portion is located above the pivot shaft for the lower pedal member, when the front portion of the abutting member pivots about its pivot shaft, the pin means is moved along the connecting elongated hole and moves the upper portion of the lower pedal member rearwardly by the connecting elongated hole, thereby the lower portion of the lower pedal member can be forcibly displaced in the forward direction of the vehicle body reliably.

Furthermore, since the pin means is comprised of the body portion, for example, a bolt, inserted in the connecting elongated hole and penetrates into the abutting member, and the fixing portion, for example, a nut, for fixing the body portion to the abutting member, and the connecting elongated hole extends in the radial direction of the pivot shaft of the lower pedal member and the connecting elongated hole is formed in the direction generally normal relative to the direction in which the front portion of the abutting member located in front of the pivot shaft thereof extends, the direction of the force generated between the body portion of the pin means and the connecting elongated hole by the braking operation when the vehicle is in a normal operation is generally normal with respect to the direction in which the connecting elongated hole extends, and also this direction of the force corresponds with the direction in which the front portion of the abutting member extends. Thus, when the vehicle is in a normal operation and when the pedal is in its operated condition, the body portion of the pin means does not move along the connecting elongated hole, and with the assistance of the frictional force therebetween, the connecting elongated hole and the body portion of the pin means are locked together in that position, as a result of which, even if the fixing portion fixing the body portion of the pin means to the abutting member has loosened, the body portion of the pin means will not be removed out of the connecting elongated hole or the abutting member, so that the abutting member and the lower pedal member will not cause relative movement Preferably, in the present invention, the upper pedal member has a guiding elongated hole which receives the pin means therein for providing guidance for the pin means when the pin means is slidingly moved in the connecting elongated hole, and wherein the guiding elongated hole has a holding portion which holds the pin means in such a manner that relative movement between the upper pedal member and the lower pedal member is prevented when the vehicle is in a normal operation, and which is destroyed so as to provide sliding movement of the pin means in the guiding elongated hole when the vehicle crashes.

In accordance with the present invention described above, even if the fixing portion fixing the body portion of the pin means to the abutting member has loosened, the bolt will still be kept in the normal position by the holding portion when the vehicle is in a normal operation. Also, because the holding portion itself is destroyed when the vehicle crashes, the connecting mechanism can be operated when the vehicle crashes.

Preferably, in the present invention, the upper pedal member is comprised of first and second upper pedal members, one of which is thinner than the other, and the thinner member has the holding portion formed thereon.

In accordance with the present invention described above, the holding portion can be made easily, and it is easy to obtain a desired level of strength which is enough to be destroyed by the force exerted from the pin means.

Preferably, in the present invention, the pedal bracket is arranged so as to cover a head portion of the pin means of the connecting mechanism and so as to be located near the location where disengagment of the pin means out of the connecting elongated hole and the abutting member is prevented.

In accordance with the present invention described above, even if the fixing portion fixing the body portion of the pin means to the abutting member has loosened, the body portion of the pin means will not be removed out of the connecting elongated hole or the abutting member, thereby the normal braking operation can be assured when the vehicle is in a normal operation.

Preferably, in the present invention, the upper pedal member has a guiding elongated hole which receives said pin means therein for, providing guidance for the pin means when the pin means is slidingly moved in the connecting elongated hole, and the guiding elongated hole of the said upper pedal member includes an area which has a normally tight relationship with respect to the pin means.

In accordance with the present invention described above, even if the fixing portion fixing the body portion of the pin means to the abutting member has loosened, the body portion of the pin means is less likely to be removed out of that area, thereby the normal braking operation can be assured when the vehicle is in normal operation.

In accordance with the support structure for a pedal of a vehicle of the present invention, reliable forcible displacement of a pedal in the forward direction of the vehicle can be provided.

BRIEF DESCRIPTION OF THE DRAWINGS

In the accompanying drawings:

FIGS. 13 are side views showing the brake pedal support structure in accordance with the first embodiment of the present invention, where FIG. 13(a) shows when the pedal is not in its operated condition, and FIG. 13(b) shows when the pedal is in braking operation, and both FIGS. 13(a) and 13(b) are during the time the vehicle is in a normal operation;

FIGS. 15 are side views showing the brake pedal unit in accordance with the first embodiment of the present invention, where FIG. 15(a) shows when the pedal is not in its operated condition, and FIG. 15(b) shows when the pedal is in its operated condition, both FIGS. 15(a) and 15(b) show that the brake pedal unit is forcibly displaced;

FIGS. 16 are graphs, wherein FIG. 16(a) shows the pivoting speed characteristic of the wing-cam, FIG. 16(b) shows the pivoting characteristic of the elongated hole of the connecting mechanism, and FIG. 16(c) shows the speed characteristic of the forcible displacement of the lower pedal member, respectively, in accordance with the first embodiment of the present invention;

PREFERRED EMBODIMENTS OF THE INVENTION

Preferred embodiments of the present invention will now be described with reference to the drawings.

Figure 1:
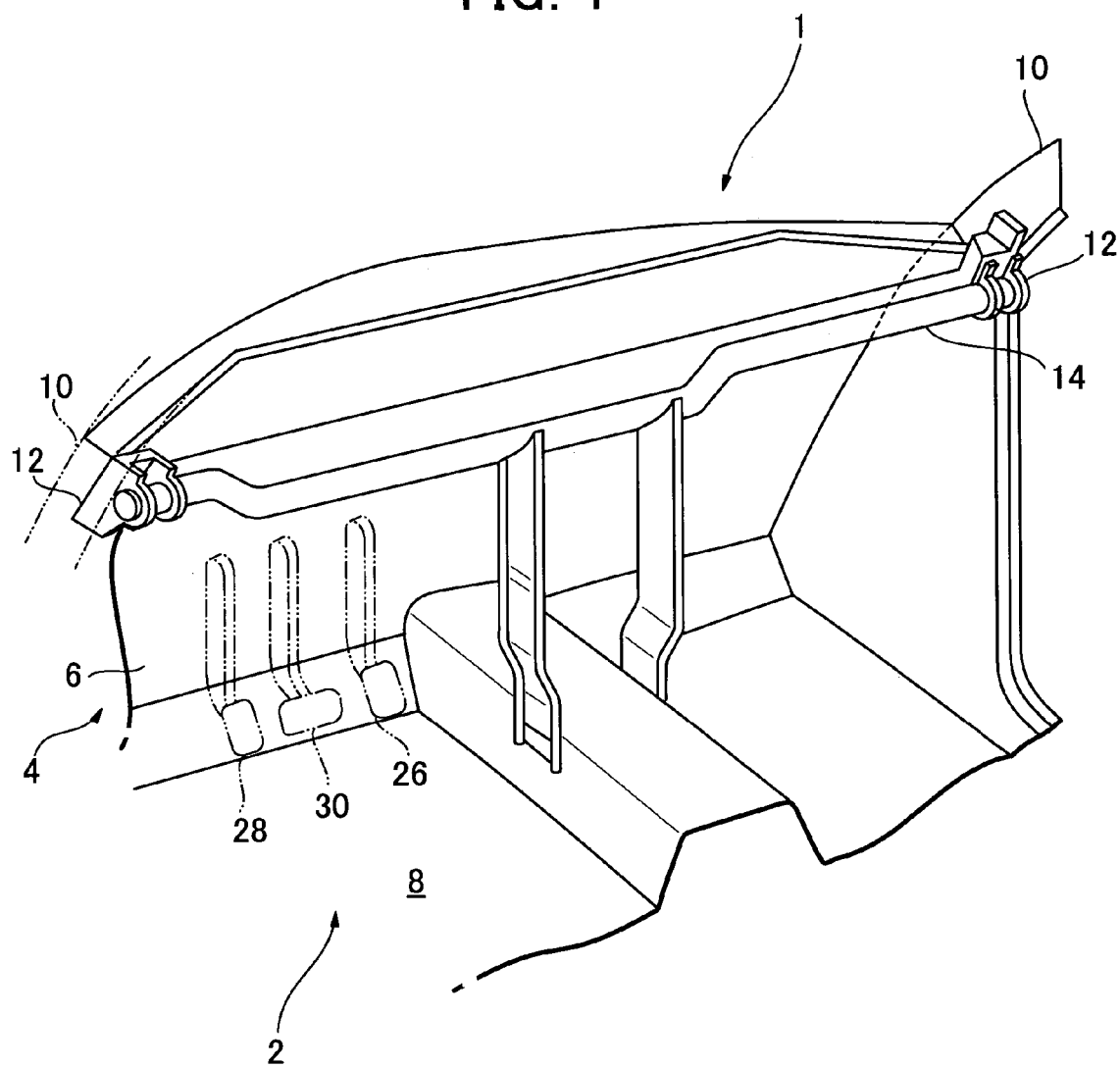
FIG. 1 is a schematic perspective view showing the front portion of a vehicle including the support structure for a brake pedal of a vehicle in accordance with the first embodiment of the present invention.
Figure 2:
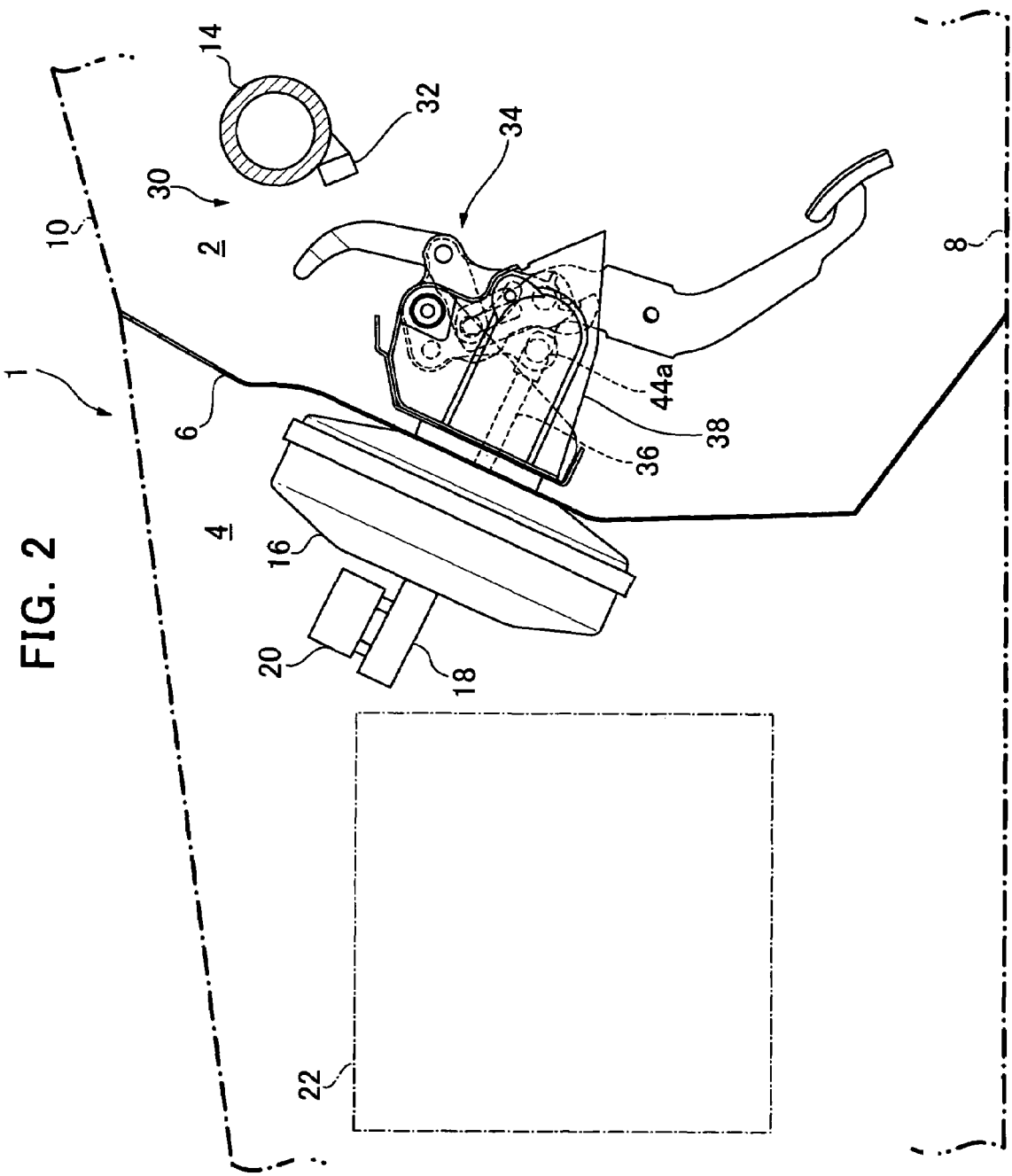
FIG. 2 is a side view showing the front portion of the vehicle including the brake pedal support structure in accordance with the first embodiment of the present invention.

Firstly, the support structure for a pedal of a vehicle of the first embodiment of the present invention will be described with reference to FIGS. 1 to 17. In the first embodiment of the present invention, the support structure for a pedal of a vehicle of the present invention is applied to a brake pedal unit. FIG. 1 is a schematic perspective view showing the front portion of a vehicle including the support structure for a brake pedal of a vehicle in accordance with the first embodiment of the present invention, and FIG. 2 is a side view showing the front portion of the vehicle including the brake pedal support structure in accordance with the first embodiment of the present invention.

As shown in FIG. 1, the vehicle 1 includes a dash board lower panel 6 separating the cabin 2 of the vehicle 1 from the engine room 4, and a floor panel 8 consisting of the floor portion of the cabin of the vehicle. The ends of the dash board lower panel 6 located in the width direction of the vehicle body are each respectively connected to a front pillar or pillar 10. An instrument panel member or reinforce member 14 of the vehicle 1 is attached to these front pillars 10 by attaching members 12.

The instrument panel member 14 is formed of a cylindrical pipe and extends in the width direction of the vehicle body within the instrument panel (not shown) fixed to the rear side of the dash board lower panel 6 in such a manner that the instrument panel member 14 connects the front pillars 10 at the respective ends thereof. A steering shaft (not shown) is attached to the instrument panel member 14.

Furthermore, the vehicle 1 includes an accelerator pedal assembly 26, a clutch pedal assembly 28 and a brake pedal assembly or unit 34 in accordance with the present invention.

As shown in FIG. 2, a master bag 16, a master cylinder 18 and a reserve tank 20 are attached to the dash board lower panel 6 at its side facing the engine room 4. An engine 22 is located in front of the master bag 16 and the master cylinder 18.

The brake pedal unit 34 is located in front of the instrument panel member 14 to be inclined slightly downwardly, and the brake pedal unit is attached to the dash board lower panel 6 at the upper portion thereof in the cabin side of the vehicle by a bracket or pedal bracket 38. One end of a piston rod 36 is connected to the brake pedal unit 34, whereas the other end of the piston rod 36 is connected to the master bag 16. The force applied to this brake pedal unit 34 by the driver's foot is transmitted to the master bag 16 through the piston rod 36, boosted by the master bag 16, and transmitted to the master cylinder 18

The instrument panel member 14 or reinforce member of the vehicle, mentioned above extends in the width direction of the vehicle body at the rear side of the brake pedal unit 34. An abutting member 32 of the vehicle 1 is attached to this instrument panel member 14 in such a manner that it faces the brake pedal unit 34 while being inclined slightly downwardly.

Figure 3:
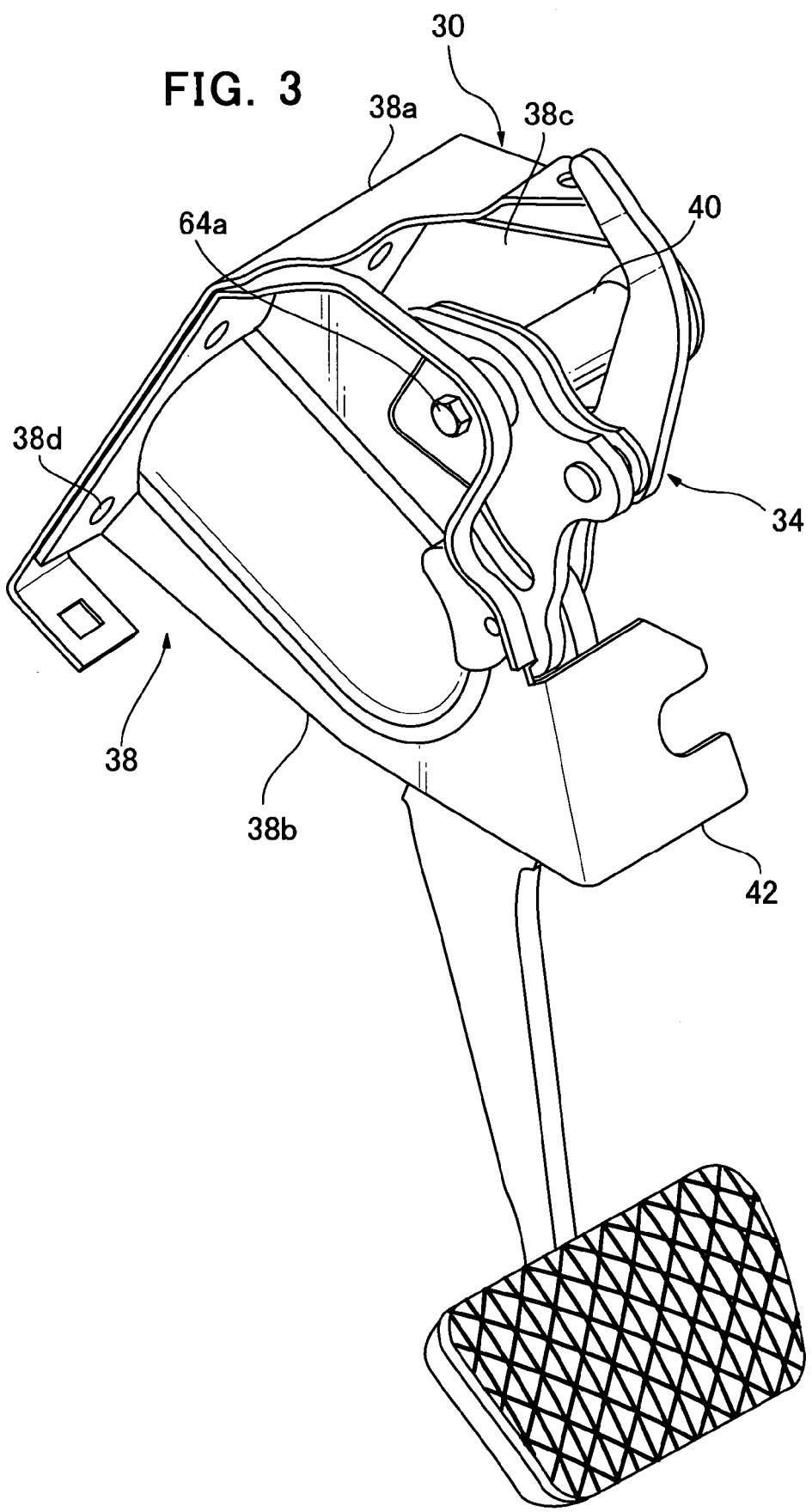
FIG. 3 is a perspective view showing the left rear portion of the brake pedal support structure in accordance with the first embodiment of the present invention.
Figure 4:
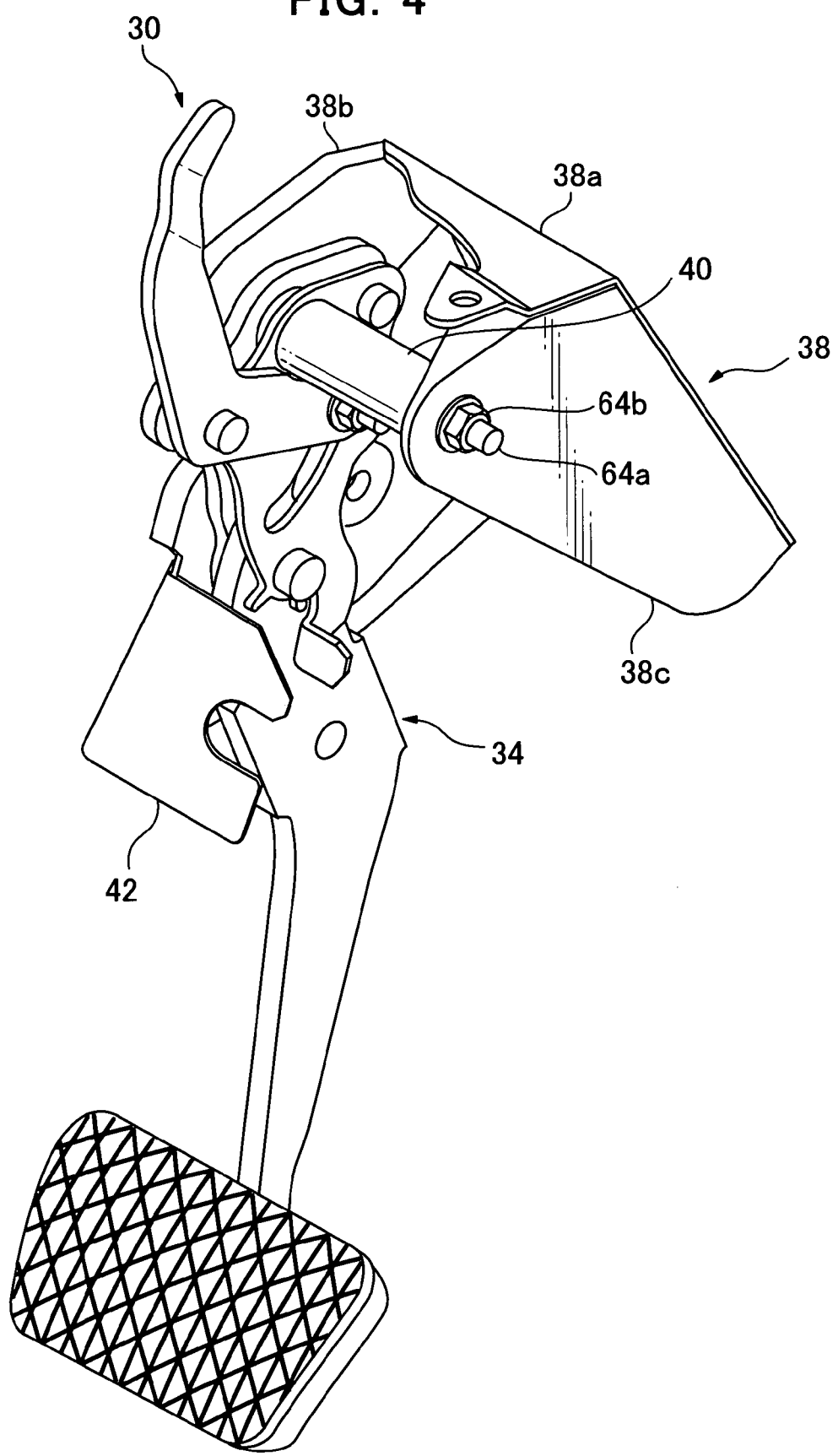
FIG. 4 is a perspective view showing the right rear portion of the brake pedal support structure in accordance with the first embodiment of the present invention.
Figure 5:
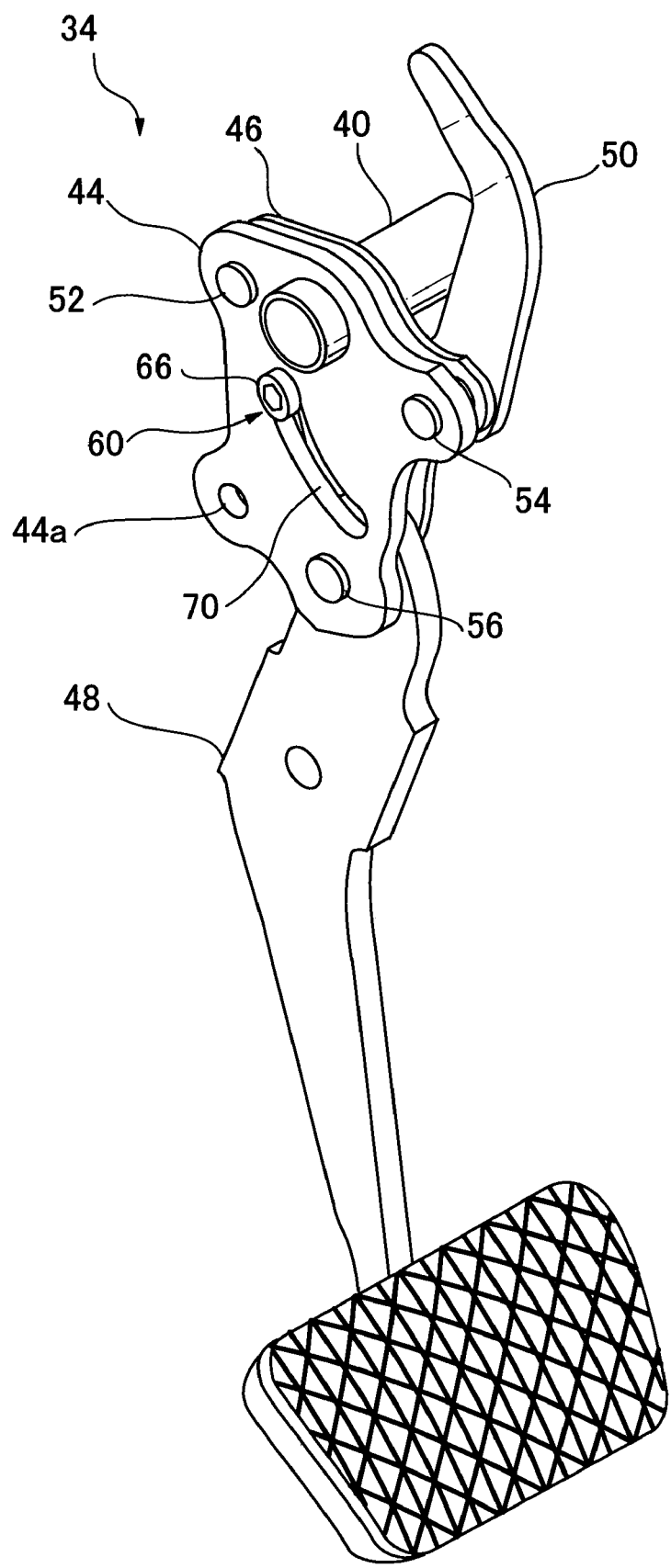
FIG. 5 is a perspective view showing the left front portion of the integrated brake pedal unit of the support structure for a brake pedal of a vehicle in accordance with the first embodiment of the present invention.
Figure 6:
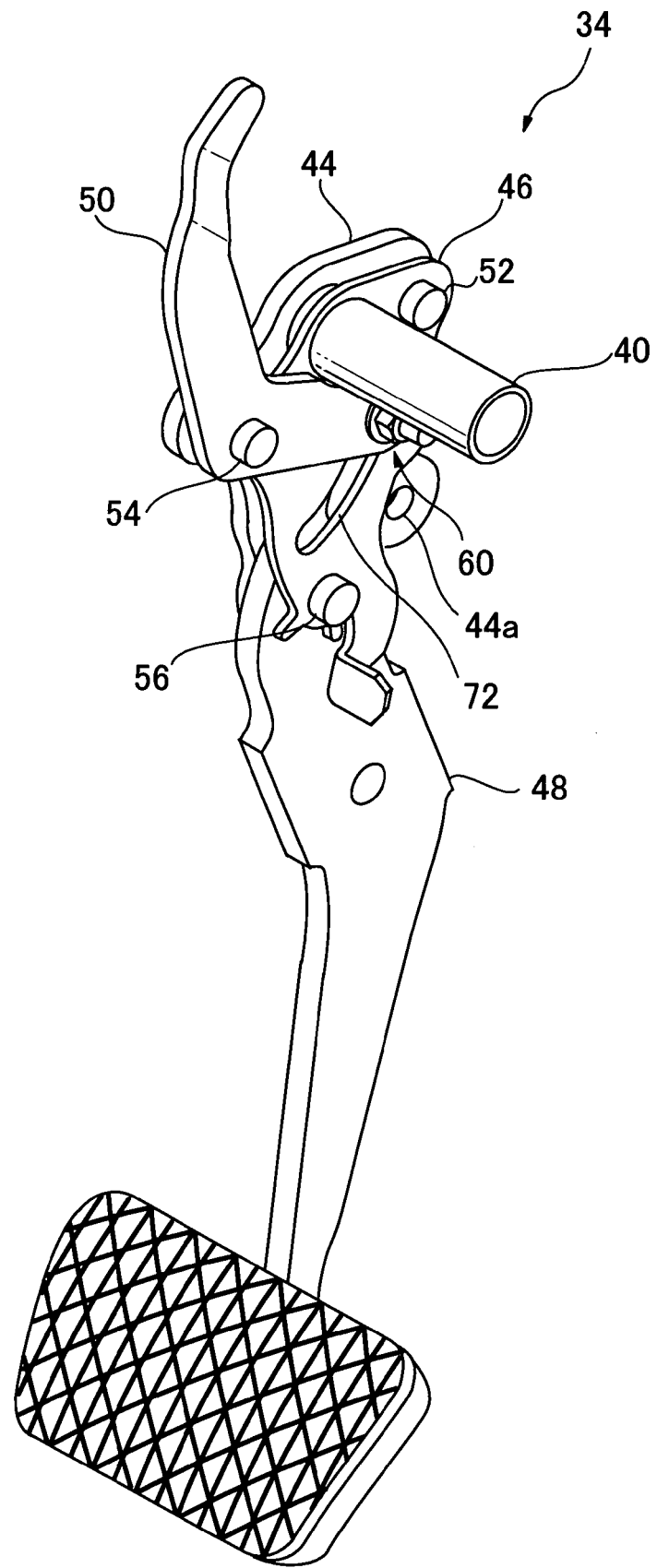
FIG. 6 is a perspective view showing the right front portion of the brake pedal unit in accordance with the first embodiment of the present invention.

Referring now to the FIGS. 3 to 6, the support structure for pedals of a vehicle of this embodiment will be described. FIG. 3 is a perspective view showing the left rear portion of the brake pedal support structure, FIG. 4 is a perspective view showing the right rear portion of the brake pedal support structure, FIG. 5 is a perspective view showing the left front portion of the integrated brake pedal unit of the support structure for a brake pedal of a vehicle, and FIG. 6 is a perspective view showing the right front portion of the pedal unit of the brake pedal unit. The instrument panel member 14 is not shown in FIGS. 3 and 4.

As shown in FIGS. 3 and 4, the brake pedal support structure 30 is comprised of an integrated brake pedal unit 34, an above mentioned bracket 38 for pivotablly supporting the brake pedal unit 34, and the instrument panel member 14 or reinforce member of the vehicle (see FIG. 2).

The bracket 38 is comprised of a base bracket 38a extending in the parallel direction with respect to the dash board lower panel 6, and a left side support bracket 38b and a right side support bracket 38c which extends rearwardly from the base bracket 38a. Each of the support brackets 38b and 38c is attached to the dash-board lower panel 6 by bolts (not shown) through holes 38d formed on the base bracket 38a.

The brake pedal unit 34 is disposed between the support brackets 38b and 38c, and pivotablly supported by a brake hub 40 supported by the support brackets 38b and 38c. A stop member 42 is formed on the left side support bracket 38b, which stop member 42 has a brake switch for sensing a braking operation.

As shown in FIGS. 5 and 6, the brake pedal unit 34 is comprised of a brake hub 40, a first upper pedal member 44, a second upper pedal member 46, a lower pedal member 48, and a wing-cam 50 or abutting member.

The first upper pedal member 44 and the second upper pedal member 46 are fixed to each other by a first pin 52, a second pin 54 and a third pin 56 to have a spaced apart relationship therebetween, and a brake hub 40 is attached to the upper pedal members 44 and 46. The lower pedal member 48 is disposed between the upper pedal members 44 and 46 and is attached to the respective upper pedal member 44 and 46 by the third pin 56. Also, a wing-cam or abutting member 50 is located on the right side in the width direction of the vehicle body of the second upper pedal member 46 and is pivotablly attached to the respective upper pedal members 44 and 46 by a second pin 54. The wing-cam 50 and lower pedal member 48 are connected by the connecting mechanism 60, as described in detail below.

A hole 44a is formed in the first upper pedal member 44 at the lower front portion thereof to connect it to the piston rod 36 (see FIG. 2).

Figure 7:
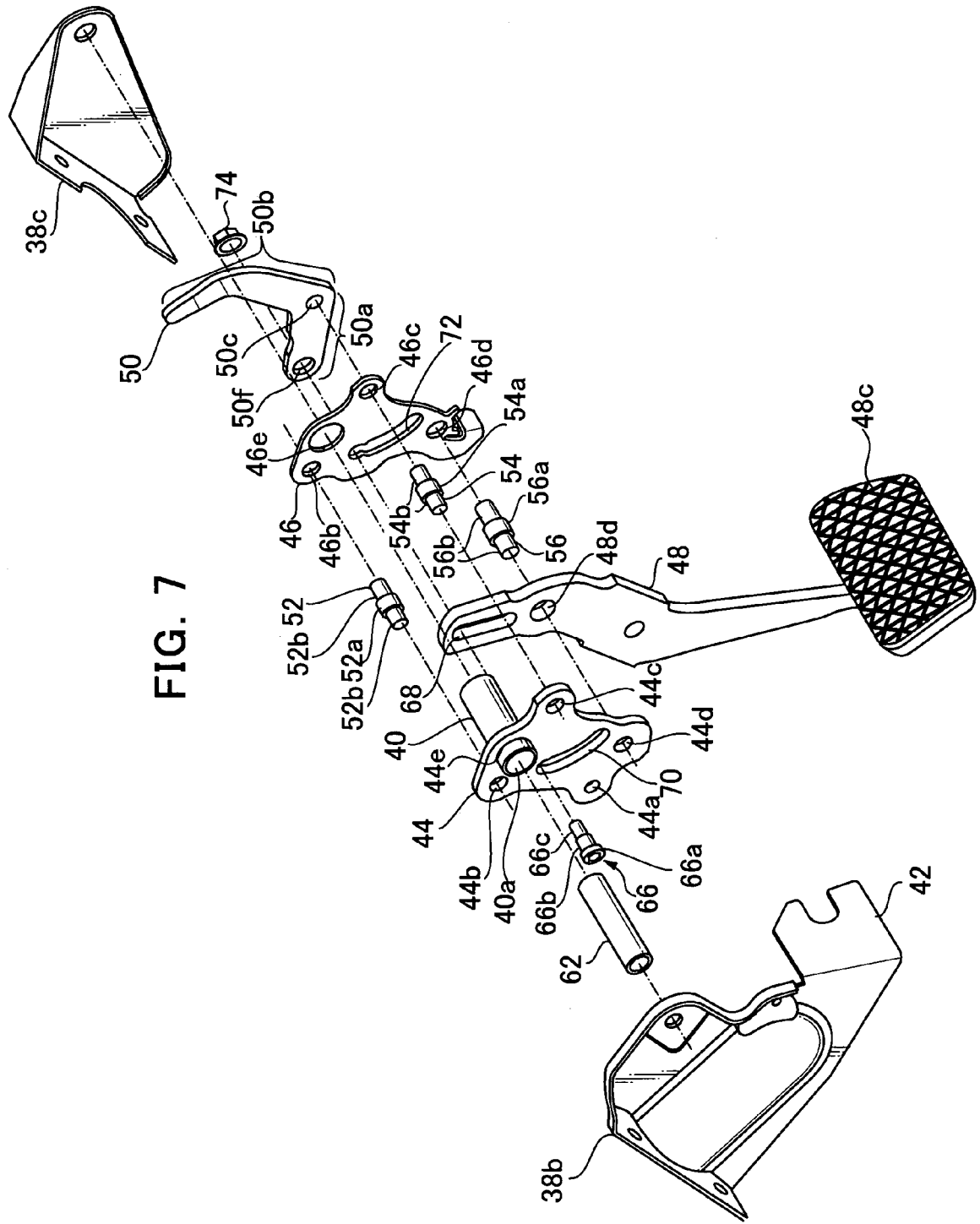
FIG. 7 is an exploded perspective view of the brake pedal support structure in accordance with the first embodiment of the present invention.
Figure 10:
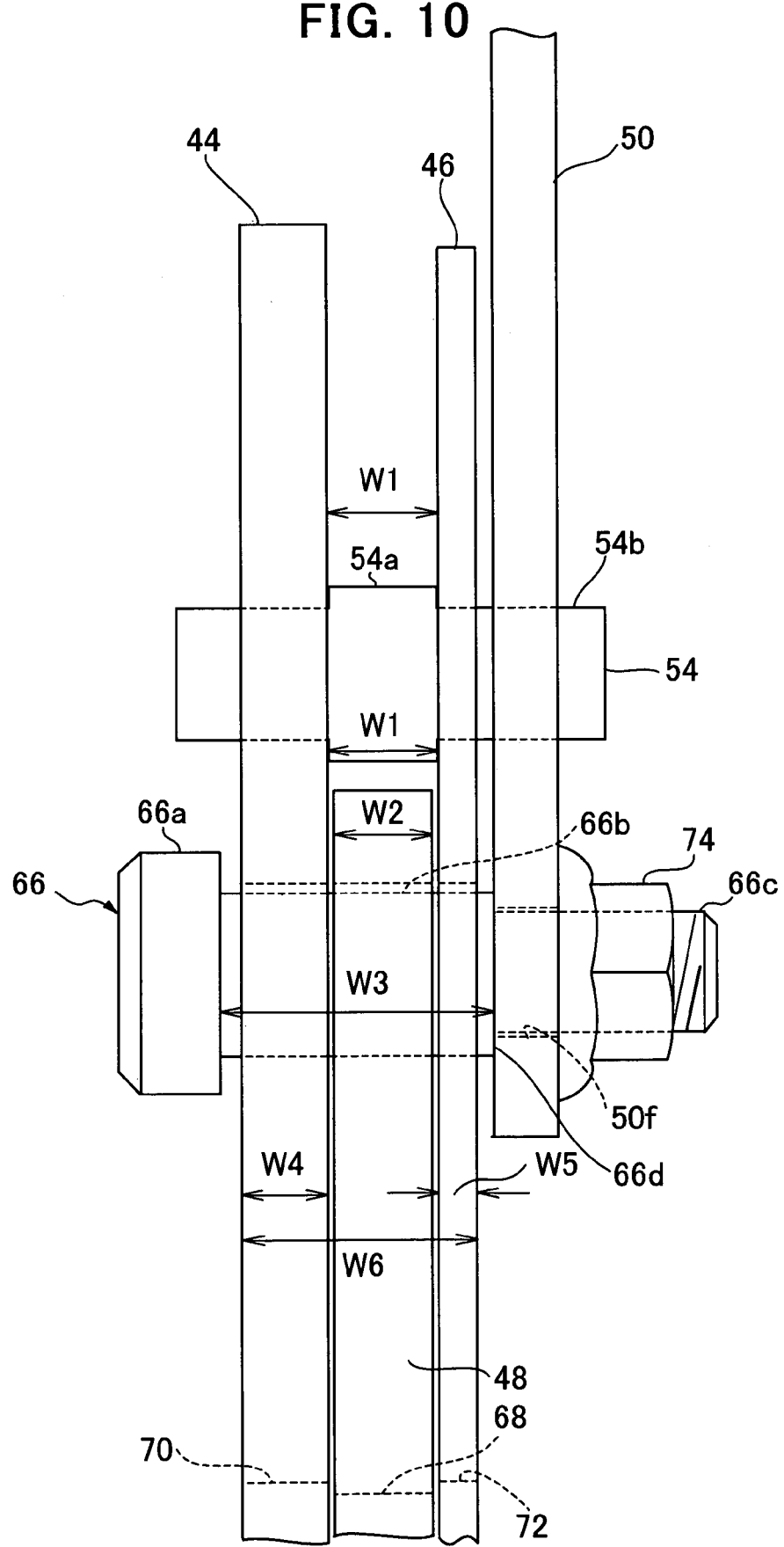
FIG. 10 is an enlarged front view of the brake pedal unit shown in FIG. 9, showing relationships between respective pedal members and the wing-cam.
Figure 11:
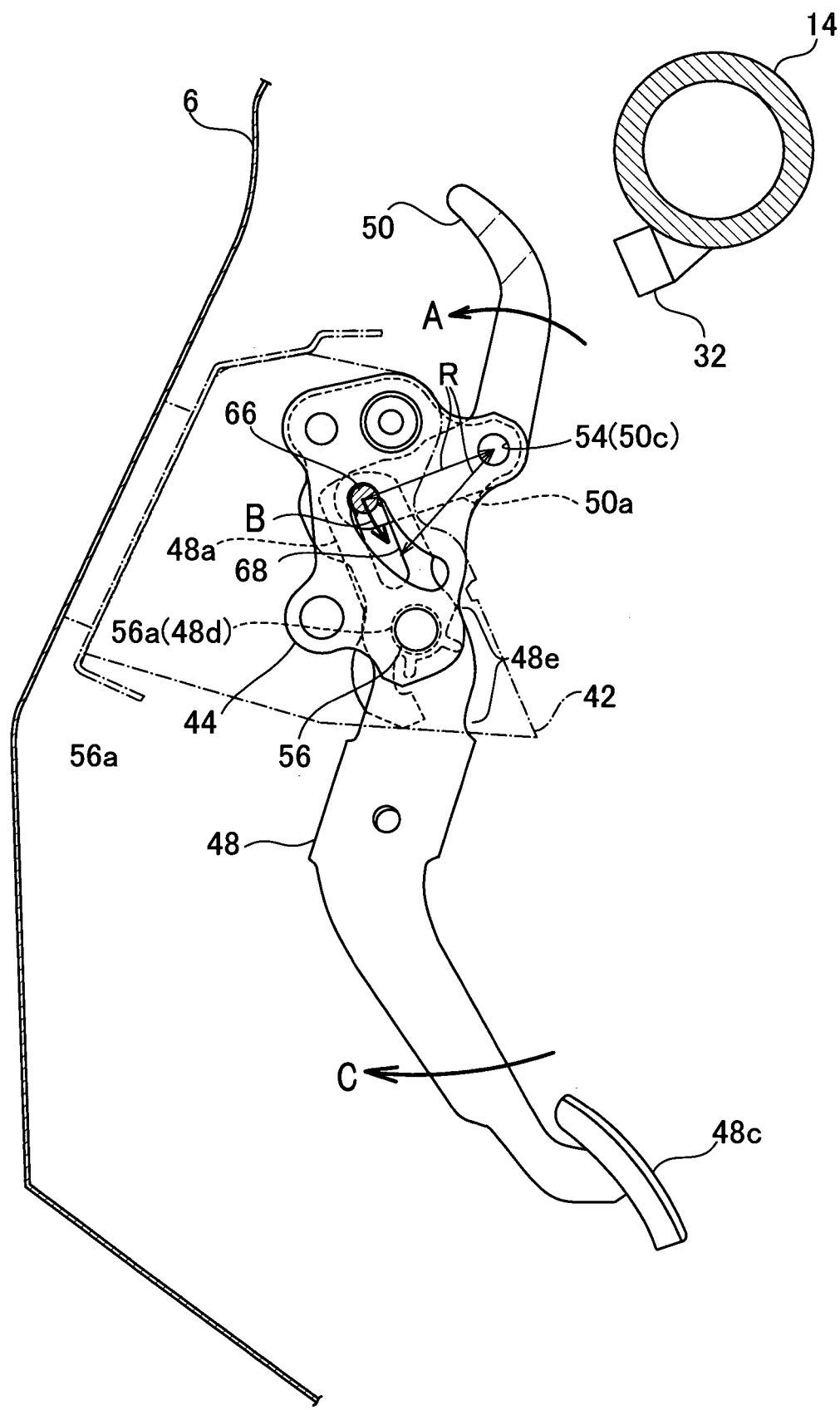
FIG. 11 is a side view showing the left side of the brake pedal support structure in accordance with the first embodiment of the present invention.
Figure 12:
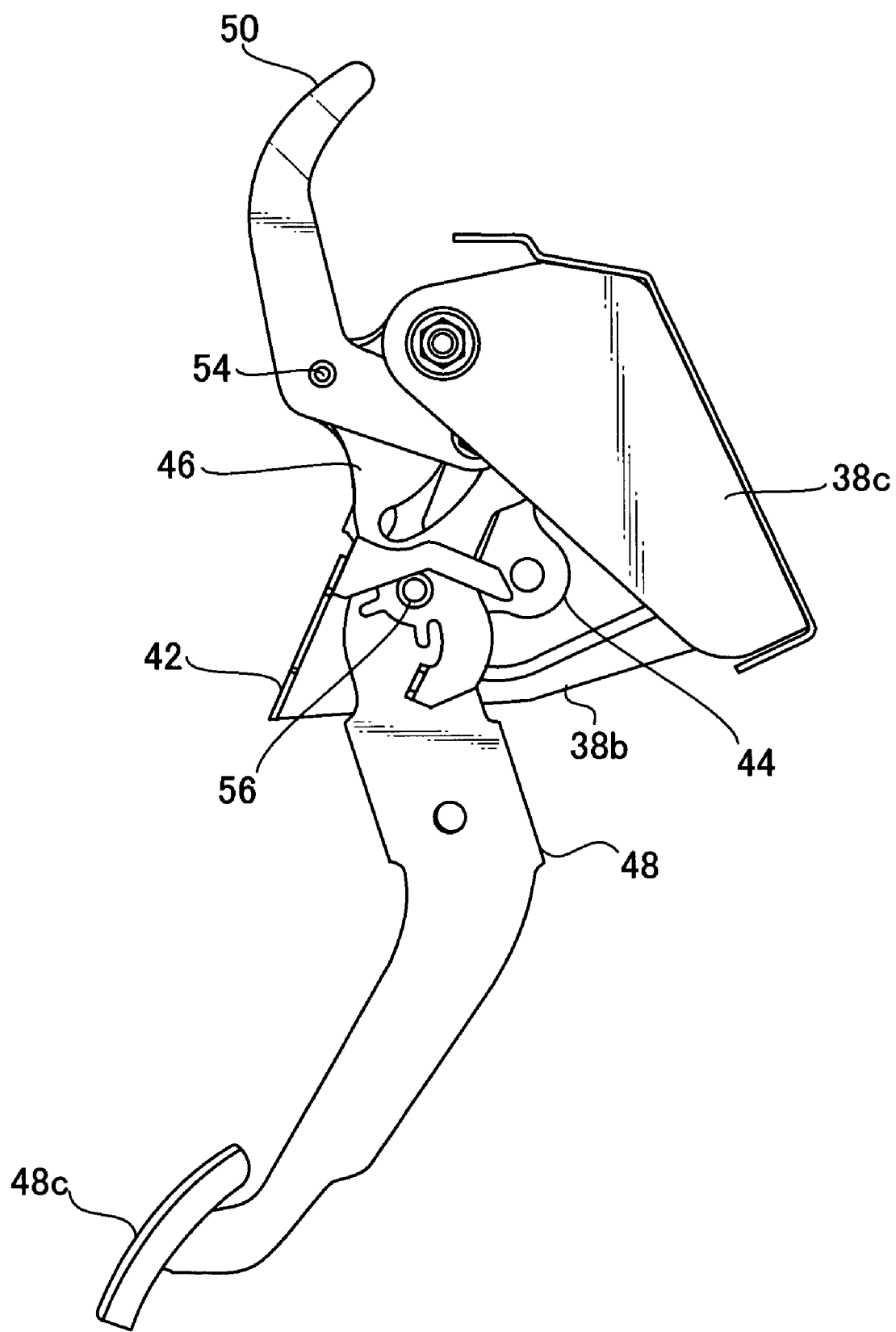
FIG. 12 is a side view showing the right side of the brake pedal support structure in accordance with the first embodiment of the present invention.

Next, the structure of the brake pedal support structure including the brake pedal unit 34 will be described with reference to the FIGS. 7 to 12. FIG. 7 is an exploded perspective view of the brake pedal support structure, FIGS. 8 are side view showing the respective left sides of the first upper pedal member, the lower pedal member, and the second upper pedal member of the brake pedal support structure, FIG. 9 is a front view showing the rear portion of the brake pedal support structure, FIG. 10 is an enlarged front view of the brake pedal unit shown in FIG. 9 showing the relationship between the pedal member and the wing-cam, FIG. 11 is a side view showing the left side of the brake pedal support structure, and FIG. 12 is a side view showing the right side of the brake pedal support structure.

Firstly, the assembling structure between the first upper pedal member 44 and the second upper pedal member 46 will be described.

Figure 9:
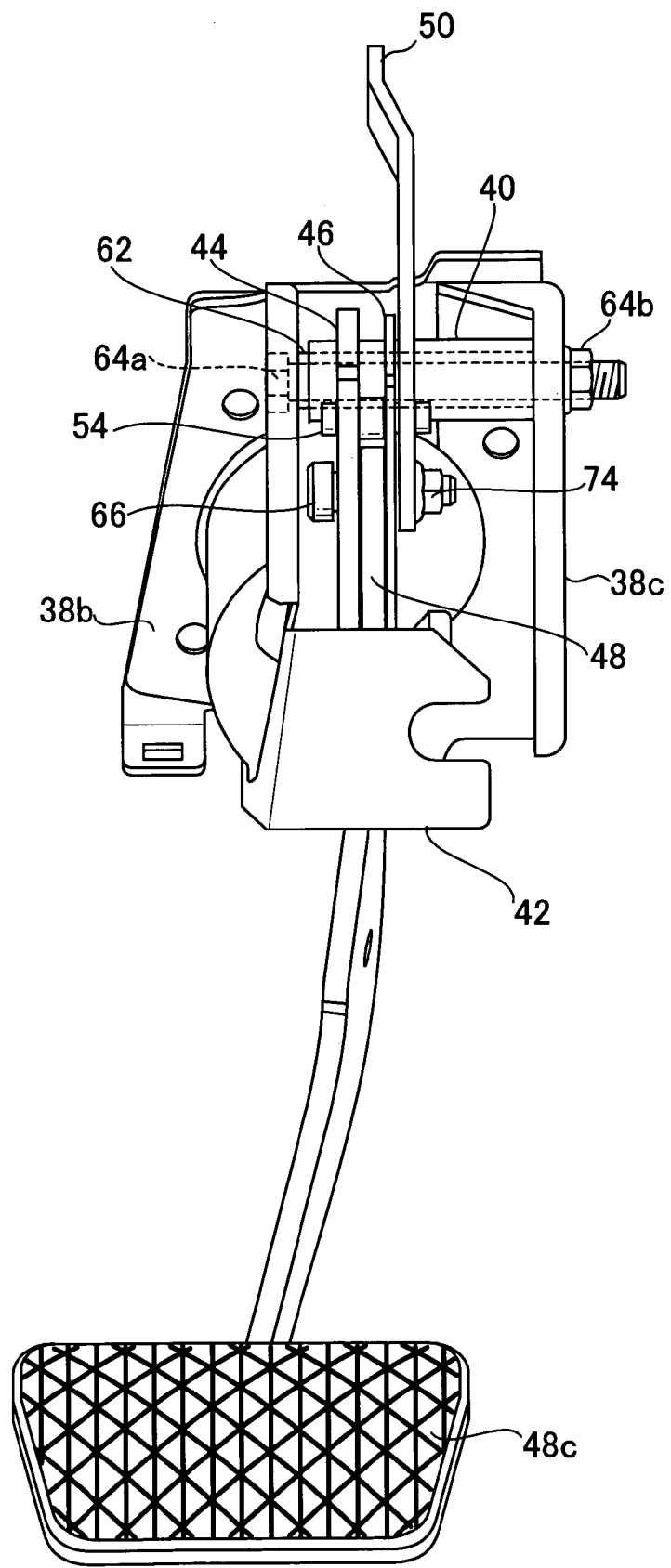
FIG. 9 is a front view showing the rear portion of the brake pedal support structure in accordance with the first embodiment of the present invention.

As shown in FIGS. 7 and 9, the first upper pedal member 44 and the second upper pedal member 46 are made of plane sheets having a generally constant thickness, and the thickness of the second upper pedal member 46 is smaller than that of the first upper pedal member 44.

Figure 8:
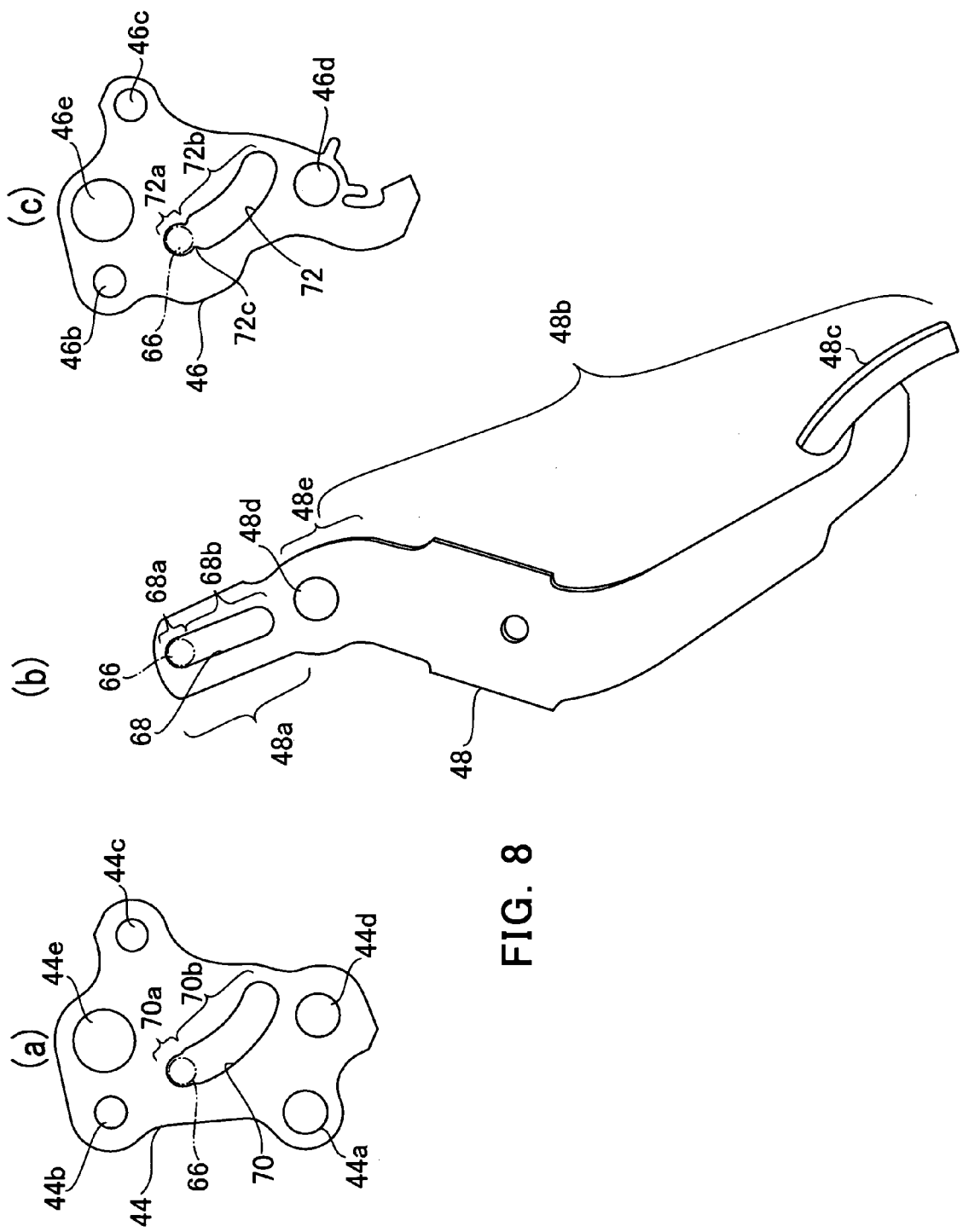
FIG. 8 are side views showing left sides of the first upper pedal member, the lower pedal member, and the second upper pedal member of the brake pedal support structure in accordance with the first embodiment of the present invention.

As shown in FIGS. 7 and 8, the first upper pedal member 44 has three holes 44b, 44c and 44d formed thereon which engage with the pins 52, 54 and 56, respectively, while the second upper pedal member 46 has three holes 46b, 46c and 46d formed thereon which engage with the pins 52, 54 and 56, respectively.

As can be seen in FIG. 7, the first pin 52, the second pin 54 and the third pin 56 all have larger diameter portions 52a, 54a and 56a respectively, and smaller diameter portions 52b, 54b and 56b respectively located at their both ends. These smaller diameter portions 52b, 54b and 56b are engaged in the holes 44b-44d and 46b-46d of the upper pedal members 44 and 46 (see FIGS. 5, 6 and 9), until end surfaces of the larger diameter portions 52a, 54a and 56a come into contact with the respective upper pedal members 44 and 46, whereby the upper pedal members 44 and 46 are fixed to each other.

As shown in FIG. 10, the width of the larger diameter portions 52a, 54a and 56a are all the same width W1. The distance between the upper pedal members 44 and 46 is kept at the same width W1 by the three pins 52, 54 and 56.

Next, the structure of the lower pedal member 48 and the assembling structure between the lower pedal member 48 and each of the upper pedal members 44 and 46 will be described in detail with reference to the FIGS. 7, 8 and 10.

As shown in FIGS. 7 and 8(b), the lower pedal member 43 includes an upper portion 48a and a lower portion 48b, and a pedal 48c is attached at the lower end of the lower portion 48b. Also, a hole 48d is formed at the interface between the upper portion 48a and the lower portion 48b, and this hole 48d engages with the larger diameter portion 56a of the third pin 56, in order to allow pivotable movement of the lower pedal member 48 around the third pin or third pivot shaft 56.

Furthermore, as shown in FIG. 10, the width W2 of the lower pedal member 48 is slightly smaller than the width W1 of the larger diameter portion 52a, 54a and 56a of the respective pins 52, 54, 56 i.e., the distance W1 between lower pedal member 48, so as to allow the lower pedal member 48 to move with respect to the upper pedal members 44 and 46 without a frictional force being generated.

Next, the structure of the wing-cam 50 or abutting member and the assembling structure between the wing-cam 50 and each of the upper pedal members 44 and 46 will be described in detail with reference to the FIGS. 7, 9 and 10.

As shown in FIG. 7, the wing-cam 50 includes a first portion 50a or front portion extending generally in a linear direction, and a second portion 50b or upper portion extending at an angle with respect to the first portion 50a. A hole 50c is formed at the interface between the first portion 50a and the second portion 50b.

As shown in FIGS. 9 and 10, the hole 50c engages with the smaller diameter portion 54b of the second pin 54 extending a desired amount from the second upper pedal member 46, so as to allow the wing-cam 50 to be pivoted around this second pin or second pivot shaft 54.

Next, the assembling structure between each of the upper pedal members 44 and 46 and the brake hub 40 will be described in detail with reference to the FIGS. 7 to 9.

As shown in FIGS. 7 and 8, holes 44e and 46e are formed in the central upper portion of the respective upper pedal members 44 and 46, which holes engage with the brake hub 40. The brake hub 40 is fixed by it being engaged with the holes 44e and 46e of the respective upper pedal members 44 and 46, and a hub spacer 58 having slightly longer length than that of the brake hub 40 is inserted in the aperture of the brake hub 40.

As shown in FIG. 9, the brake hub 40 and hub spacer 58 are located between the left side support bracket 38b and the right side support bracket 38c and extend in the width direction of the vehicle body. The hub spacer 58 is fixed to the respective support brackets 38b and 38c by being held between the support brackets 38b and 38c by means of a bolt 64a and a nut 64b (see FIGS. 3 and 4).

The inner diameter of the brake hub 40 is slightly larger than the outer diameter of the hub spacer 58 to allow its pivoting movement without large play with respect to the hub spacer 58. Thus, the brake hub 40 works as the first pivot shaft 40.

Next, the stop member 42 will be described in detail with reference to the FIGS. 7 to 9, 11 and 12.

As can be seen in FIGS. 7 and 9, the stop member 42 is formed at the rear edge of the left side support bracket 38b by folding the left side support bracket 38b. This stop member 42 is provided to enable reliable forcible displacement of the lower pedal member 48 in a case when the connecting mechanism 60, described in detail below, does not work when the vehicle crashes.

As shown in FIGS. 11 and 12, the stop member 42 extends at a near and rear side of the pivot shaft 56 or third pivot shaft of the lower pedal member 48, and has a slightly spaced apart relationship with respect to the lower pedal member 48. The stop member 42 extends toward the front and upper side of the vehicle and also extend in the width direction of the vehicle body, in such a manner that it covers the pivot shaft 56 of the lower pedal member 48 when seen from the rear side of the vehicle.

As shown in FIGS. 8 and 11, an abutting portion 48e curved in shape is formed at the rear edge of the lower pedal member 48, and extends downwardly from a position near the third pivot shaft 56. This abutting portion 48e and the stop member 42 will abut against each other under a certain condition, as will be described in detail below, whereby the connecting mechanism 60 is operated and the reliable forcible displacement of the lower pedal member 48 is provided.

Next, the connecting mechanism 60 will be described in detail with reference to the FIGS. 7 to 12. This connecting mechanism 60 is comprised of the wing-cam 50 and the lower pedal member 48 connected to each other by a pin bolt 66 and a connecting elongated hole 68, and provides a link mechanism which determines a relative pivoting position between the wing-cam 50 and the lower pedal member 48.

As shown in FIGS. 7 and 8, the connecting elongated hole 68 is formed in the upper portion 48a of the lower pedal member 48, and extending in the radial straight direction with respect to the hole 48d, while guiding elongated holes 70 and 72 are formed in the first upper pedal member 44 and the second upper pedal member 46, respectively, for providing guidance for the movement of the pin bolt 66. Also, as can be seen in FIG. 7, a hole 50f is formed in the end of the first portion 50a of the wing-cam 50, in order to fix the pin bolt 66 to the wing-cam 50.

As shown in FIGS. 7 and 10, the pin bolt 66 has a head portion 66a, a link portion 66b, and a threaded portion 66c. The link portion 66b is inserted through the guiding elongated hole 70 of the first upper pedal member 44, the connecting elongated hole 68 of the lower pedal member 48, and the guiding elongated hole 72 of the second upper pedal member 46, and the threaded portion 66c penetrates into the hole 50f of the wing-cam 50.

More particularly, as can be seen in FIG. 10, the link portion 66b has a larger outer diameter than the inner diameter of the hole 50f of the wing-cam 50, and the edge portion 66d thereof abuts against the wing-cam 50. The wing-cam 50 is held between this edge portion 66d of the link portion 66b and the nut 74, i.e., the fixing portion of the pin means, and fixed by the nut 74, whereby the pin bolt 66, i.e., the body portion of the pin means, is fixed to the wing-cam 50. In an alternative embodiment of the present invention, the nut 74 may be fixed to the wing-cam 50 or pin bolt 66 by welding, or other fixing means may be used instead of a nut.

Herein, the length W3 of the link portion 66b of the pin bolt 66 is longer than the length which is obtained by adding the widths W4 and W5 of the respective upper pedal members 44 and 46 and the distance W1 between the respective upper pedal members 44 and 46. Thus, the respective upper pedal members 44 and 46 are not fixed tightly by the wing-cam 50 and the head portion 66a of the pin bolt 66, thereby allowing the relative movement between the wing-cam 50, the pin bolt 66, and respective upper pedal members 44 and 46 without a frictional force being generated.

Also, as shown in FIG. 9, the brake pedal unit 34 is located in such a manner that the first upper pedal member 44 is disposed near the left side support bracket 38b. The pin bolt 66 will pivotablly move around the first pivot shaft 40 or brake hub when the vehicle is in normal operation, i.e., when the vehicle has not crashed, as will be described in detail below, whereas when the vehicle has crashed, it will move along the guiding elongated holes 70 and 72. The left side support bracket 38b is formed in such a manner that it extends in the moving range of the pin bolt 66 near with a close relationship with respect to the head 66a of the pin bolt 66.

Accordingly, the wing-cam 50 and the lower pedal member 48 are connected to each other by the pin bolt 66 and the connecting elongated hole 68 of the lower pedal member 48, and thus, a link mechanism is comprised of the second pivot shaft 54, the first portion 50a of the wing-cam 50, the pin bolt 66, the connecting elongated hole 68, the upper portion 48a of the lower pedal member 48, and the third pivot shaft 56.

As shown in FIG. 11, when the vehicle is in normal operation, i.e., when the vehicle has not crashed, the first portion 50a or front portion of the wing-cam 50 extends toward the front of the vehicle while being inclined downwardly, and the connecting elongated hole 68 of the lower pedal member 48 has a generally normal relationship with respect to this first portion 50a. Herein, the pin bolt 66 is located at the top, i.e., the normal position 68a, of the connecting elongated hole 68.

When the wing-cam 50 moves around the second pivot shaft 54 or second pin, as will be described in detail below, in the direction shown by the arrow A in FIG. 11, the pin bolt 66 moves along an arc-like path around the second pivot shaft 54 in the direction shown by the arrow B in FIG. 11. Then, the moving pin bolt 66 will push the upper portion 48a of the lower pedal member 48 in the rear direction through the connecting elongated hole 68, whereby the lower pedal member 48 is pivoted around the third pivot shaft 56 in the direction shown by the arrow C in FIG. 9. At this time, the pin bolt 66 is moved along the connecting elongated hole 68 from its top position 68a toward its bottom position.

Next, as can be seen in FIG. 8(b), the connecting elongated hole 68 of the lower pedal member 48 is formed over the whole length thereof, i.e., from the normal position 68a to the sliding range 68b, in such a manner that in order that the pin bolt 66 can move therealong without play, the connecting elongated hole 68 has a constant width and has a tight relationship with respect to the pin bolt 66, i.e., the clearance therebetween is small.

Next, as shown in FIGS. 8(a), 8(c), and 11, the guiding elongated holes 70 and 72 of the respective upper pedal members 44 and 46 extend around the second pin 54 or second pivot shaft in an arc-like shape, and the radius R of the holes 70 and 72 has the same length as the distance between the second pivot shaft 54 of the wing-cam 50 and the pin bolt 66. Since the moving pin bolt 66 is guided by the guiding elongated holes 70 and 72, the pin bolt 66 can reliably move along the connecting elongated hole 68 of the lower pedal member 48, thereby the connecting mechanism 60 can be reliably operated. These guiding elongated holes 70 and 72 have a constant width and have a loose relationship with respect to the pin bolt 66, i.e., have a relatively large clearance therebetween, so as not to prevent the movement of the pin bolt 66.

While the pin bolt 66 is held in its normal positions 68a, 70a and 72a, the normal operation of the braking is provided.

More particularly, as can be seen in FIGS. 8(a) and 8(c), the widths of the normal positions 70a and 72a of respective guiding elongated holes 70 and 72 are formed tight with respect to the pin bolt 66, i.e., the clearance therebetween is small, in such a manner that the pin bolt 66 is not easily moved out of the positions 70a and 72a.

Also, as shown in FIG. 8(c), the guiding elongated hole 72 of the second upper pedal member 46 has a notch 72c located at the interface between the normal position 72a and the sliding range 72b in order to prevent the pin bolt 66 from moving out of its normal position 72a. This notch has, as will be described in detail below, a strength weak enough to be destroyed by the force which is conveyed to the pin bolt 66 from the abutting member 32 of the vehicle, when the vehicle crashes.

Herein, as can be seen in FIG. 9, the first upper pedal member 44 has a relatively large thickness with enough rigidity in order to reliably transmit the force of the driver's legs to the piston rod 36. Whereas the second upper pedal member 46, which is not connected to the piston rod 36, has a smaller thickness than that of the first upper pedal member 44. This second upper pedal member 46 is an auxiliary member for the first upper pedal member 44, which supports the pin bolt 66 along with the first upper pedal member 44, and the member 46 provides an increased rigidity for the brake pedal unit 34 as a whole.

In an alternative embodiment of the present invention, the above mentioned connecting mechanism may be comprised of a connecting elongated hole formed on the wing-cam 50 and a pin bolt 66 fixed to the lower pedal member 48.

Figure 14:
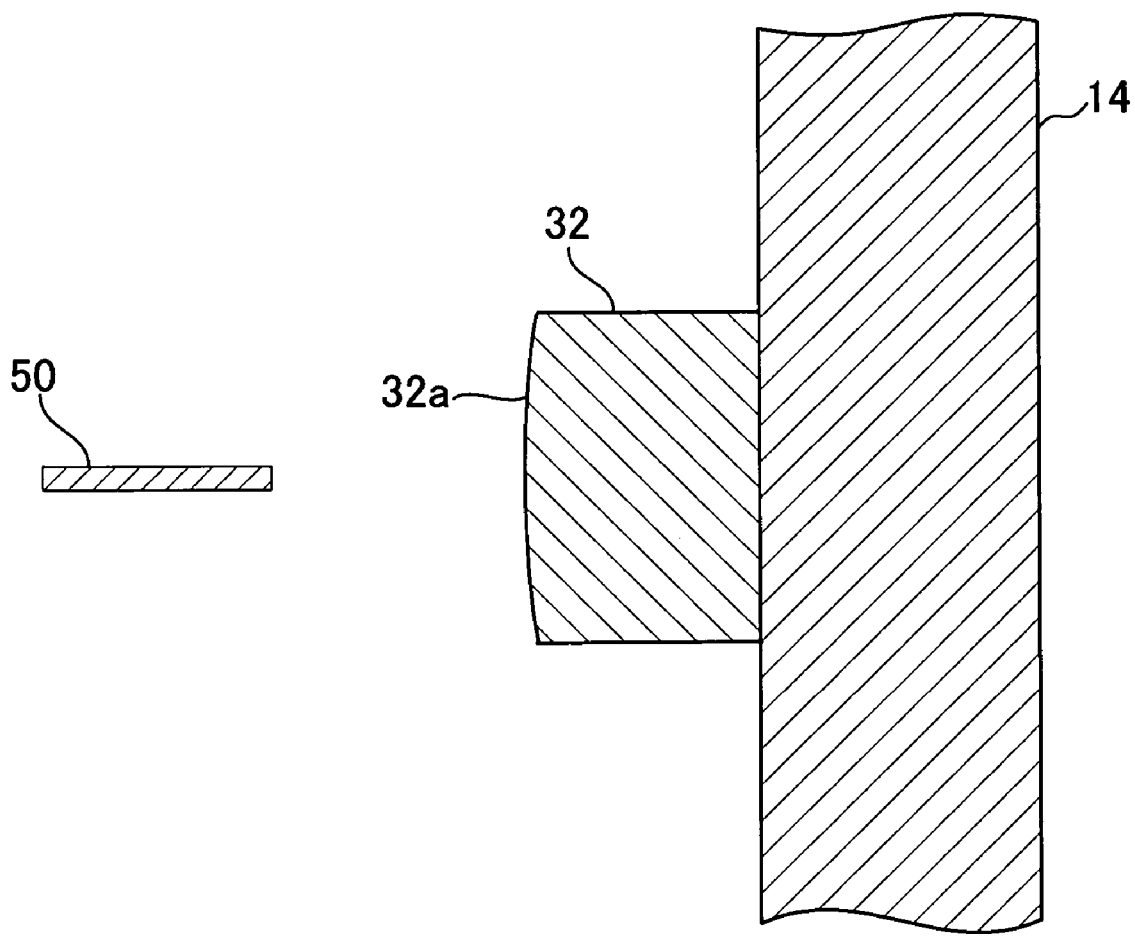
FIG. 14 is an enlarged cross-sectional view showing the abutting member of the wing-cam and the instrument panel member along the line A-A shown in FIG. 13.

Next, the structures of the wing-cam or abutting member 50 and the abutting member 32 of the vehicle 1 of the instrument panel member 14, which enable the forcible displacement of the lower pedal. member 48 by the connecting mechanism 60, will be described in detail with reference to the FIGS. 13 and 14. FIG. 14 is a cross-sectional view showing the wing-cam and the abutting member of the vehicle of the instrument panel member along the line A-A shown in FIG. 13.

Firstly, the structure of the wing-cam 50 will be described in detail. As can be seen in FIG. 13, the second portion 50b or upper portion of the wing-cam 50 extends in the direction of the upper side of the vehicle and is located in front of the abutting member 32 of the vehicle 1. The portion 52b has, at its rearward side of the vehicle, an abutting portion 50g or first abutting portion formed in a curved shape which is bent toward the front of the vehicle at its top portion. This abutting portion 50g abuts against the abutting member 32 of the vehicle 1, and the wing-cam 50 is pivoted by the abutment or collision. Also, the wing-cam 50 has an extending portion or second abutting portion 50h, as will be described in detail below, which extends from its abutting portion 50g to its top portion.

As shown in FIGS. 13 and 14, the second portion 50b of the wing-cam 50 is located generally centrally in the width direction of the vehicle body and facing the abutting member 32 of the vehicle 1.

The brake pedal unit 34 is located as shown in FIG. 13(a) when the pedal is not in its operated condition, while it is located as shown in FIG. 13(b) when the brake pedal is in its operated condition. The abutting portion 50g extends and faces the abutting member 32 of the vehicle 1 in a desired range, both when the pedal is not in its operated condition and when the pedal is in its operated condition, and at least one place of the abutting portion 50g of the wing-cam 50 can abut against the abutting member 32 of the vehicle 1 when the brake pedal unit 34 is moved rearwardly of the vehicle.

The brake pedal unit 34 will be moved rearwardly, when the vehicle crashes, as will be described in detail below, in a generally horizontal direction slightly inclining upwardly at an angle. During such a rearward movement, although the direction of the movement can be varied depending on the kind of crash of the vehicle, in accordance with this embodiment, the abutting portion 50g is located in a range which causes abutment of this portion against the abutting member 32 of the vehicle 1, in order to provide reliable abutment between the wing-cam 50 and the abutting member 32 of the vehicle 1.

As shown in FIG. 13, the abutting portion 50g is formed in such a manner that the distance R2 is longer than the distance R1. Here, the distance R2 is the length between the portion which abuts against the abutting member 32 of the vehicle 1 when braking operation, for example, the point J, and first pivot shaft 40. The distance R1 is the length between the portion which abuts against the abutting member 32 of the vehicle 1 when the pedal is not in its operated condition, for example, the point H. Namely, the abutting portion 50g is curved in shape with the distance R to the first pivot shaft 40 gradually increasing toward the top of the second portion 50b. Thus, when the brake pedal unit 34 is pivoted around the first pivot shaft 40 by the braking operation, the relative distance D2 between the abutting portion 50g and the abutting member 32 of the vehicle 1 when the pedal is in its operated condition is shorter than the relative distance D1 when the pedal is not in its operated condition.

The abutting member 32 of the vehicle will now be described. This abutting member 32 of the vehicle pivots the wing-cam 50 when the wing-cam 50 abuts against the abutting member 32 of the vehicle. As shown in FIG. 13, the abutting member 32 of the vehicle is attached to the instrument panel member 14 at the front lower side of the instrument panel member 14 so that its abut surface 32a faces the wing-cam 50.

As shown in FIG. 14, the abut surface 32a of the abutting member 32 of the vehicle is formed in a shape curved in the width direction of the vehicle body, so that its convex surface is facing toward the wing-cam 50. Due to this curved surface, even if the wing-cam 50 abuts against the abut surface 32*a* with deflecting in the width direction of the vehicle body, such a deflection can be allowed. Also, the width of the abutting member 32 of the vehicle in the width direction of the vehicle body is much larger than the thickness of the wing-cam 50, even if the wing-cam 50 is moved rearwardly with some deflection in the width direction of the vehicle body, the wing-cam 50 and the abutting member 32 of the vehicle can be reliably abutted with respect to each other. Furthermore, the abutting member 32 of the vehicle has enough strength to prevent its deformation by the abutment or collision of the wing-cam 50 thereto, which deformation causes the wing-cam 50 to penetrate into the abutting member 32 of the vehicle. In an alternative embodiment of the present invention, this abut surface 32*a* may have a plane shape. Also, the side surface of the abutting portion 50*g* of the wing-cam 50 facing toward the abutting member 32 of the vehicle may be formed in a curved shape.

Next, with reference to the FIG. 13, the operation of the above mentioned brake pedal support structure of this embodiment when the vehicle is in a normal operation, i.e., when the vehicle has not crashed, will be described in detail. FIGS. 13 are side views showing conditions of the brake pedal unit, where FIG. 13(*a*) shows when the pedal is not in its operated condition, and FIG. 13(*b*) shows when the pedal is in its operated condition, both of which are when the vehicle is in normal operation or when the vehicle is not crashed.

Firstly, as can be seen in FIG. 13(*a*), when the pedal is not in its operated condition, the pin bolt 66 is located at the normal position 68*a*, in such a manner that the longitudinal direction of the first portion 50*a* of the wing-cam 50, i.e., the direction of the line connecting the second pivot shaft 54 and the pin bolt 66, is generally normal with respect to the longitudinal direction of the connecting elongated hole 68 of the lower pedal member 48.

When the pedal 48*c* is pushed down by the driver's foot under this condition, the lower pedal member 48 starts to be pivoted around the third pivot shaft 56, whereby the pin bolt 66 receives the force F1 from the connecting elongated hole 68. However, because the connecting elongated hole 68 extends in the direction radially around the third pivot shaft 56, the direction of the force F1 is normal with respect to the longitudinal direction of the connecting elongated hole 68. Also, the direction of the force F1 generally corresponds to the longitudinal direction of the first portion 50*a* of the wing-cam 50, and furthermore, generally normal to the moving direction of the pin bolt 66, i.e., the extending direction of the normal positions 70*a* and 72*a* of the guiding elongated holes 70 and 72.

Therefore, since the force F1 is received by the second pin or second pivot shaft 54 through the first portion 50*a* of the wing-cam 50 and also received by the guiding elongated holes 70 and 72 of the respective upper pedal members 44 and 46, the pin bolt 66 will not receive the force which causes the circumferential movement around the second pivot shaft 54. Furthermore, at this time, a frictional force will be caused between side surface of the connecting elongated hole 68 and the pin bolt 66.

As a result, when the vehicle is in normal operation, the connecting elongated hole 68 and the pin bolt 66 are interlocked with respect to each other in the normal position 68*a*, whereby relative movement between the lower pedal member 48 and the wing-cam 50 can be prevented. Furthermore, as mentioned above, because the normal positions 70*a* and 72*a* of the respective guiding elongated holes 70 and 72 are tightly formed and the guiding elongated hole 72 has a notch 72*c* formed thereon, the pin bolt 66 can be held at the normal positions 70*a* and 72*a*.

Accordingly, as can be seen in FIG. 13(*b*), when the pedal is pushed down by the driver's foot, since the respective upper pedal members 44 and 46, the lower pedal member 48, and the wing-cam 50 do not move with respect to each other, the brake pedal unit 34 will integrally pivot around the first pivot shaft 40, without causing the wing-cam 50 and the lower pedal member 48 to pivot around their respective second pivot shaft 54 and third pivot shaft 56.

Herein, when the driver's foot is released or removed from the pedal 48*c*, the lower pedal member 48 will be returned to the position shown in FIG. 13(*a*) by a spring force (not shown) while maintaining the relationship described above.

Next, with reference to the FIGS. 2, 13 and 15, the operation of the brake pedal support structure 30 when the vehicle is in normal operation will be described in detail. FIGS. 15 are side views showing the operation of the brake pedal unit, wherein FIG. 15(*a*) shows when the pedal is not in its operated condition and FIG. 15(*b*) shows when the pedal is in its operated condition. In FIGS. 15, the two-dot chain line shows the condition when the vehicle is in normal operation, the solid line shows the condition after the pedal has been displaced, i.e., after the wing-cam 50 has been pivoted, and the chain line shows the case where the lower pedal member 48 is not provided with the wing-cam 50 and the connecting mechanism 60.

Firstly, the displacing operation of the brake pedal unit 34 will be described in detail. As shown in FIG. 2, the master cylinder 18 is mounted on the dash board lower panel 6 at relatively upper position thereof, and when the vehicle crashes against obstacles located in front of the vehicle, the engine 22 is forced toward the rearward direction, and the engine 22 collides against the master cylinder to push up the master cylinder from below. Thereafter, the engine 22 falls down. As shown in FIG. 15, the dashboard lower panel 6 pushed by the master cylinder 18 is deformed in such a manner that the upper portion thereof protrude into the cabin of the vehicle. When this occurs, the brake pedal unit 34 moves rearwardly in a generally horizontal and slightly upwardly direction (as indicated by G in FIG. 15.). The direction of this rearward movement can be varied depending on a kind of crash, such as, a front end crash, an offset crash, etc.

As shown in FIGS. 15(*a*) and 15(*b*), when the brake pedal unit 34 is moved rearwardly by the crash of the vehicle, as indicated by G, the abutting portion 50*g* of the wing-cam 50 abuts against the abutting member 32 of the vehicle at point H when the pedal is not in its operated condition, or at point J when the pedal is in its operated condition.

When the wing-cam 50 abuts against the abutting member 32 of the vehicle, the second portion 50*b* of the wing-cam 50 receives a force from the abutting member 32 of the vehicle, the force's direction being generally normal with respect to a line connecting the second pivot shaft 54 and the abutting point, for example, point H or J, and by this force the wing-cam 50 is pivoted around the second pivot shaft 54. By this pivoting movement of the wing-cam 50, the pin bolt 66 is forced to start moving against the frictional force of the connecting elongated hole 68 and respective guiding elongated holes 70 and 72 to destroy the notch 72*c* formed on the second upper pedal member 46. Herein, in the normal positions 68*a*, 70*a* and 72*a*, the moving direction of the pin bolt 66 generally corresponds to the longitudinal direction of the connecting elongated hole 68 of the lower pedal member 48, and with the guidance of the respective guiding elongated holes 70 and 72, the pin bolt 66 can move easily out from its normal positions 68a, 70a and 72a.

Thereafter, the wing-cam 50 continues pivoting so as to fall forward around the second pivot shaft 54. By this pivoting movement of the wing-cam 50, the pin bolt 66 moves along an arc-like path around the second pivot shaft 54, thus the direction of the movement of the pin bolt 66 will gradually be changed toward the direction which is normal to the longitudinal direction of the connecting elongated hole 68. Thus, the pin bolt 66 moves in the connecting elongated hole 68, while it applies a force to the upper portion 48a of the lower pedal member 48, the force's direction being normal with respect to the longitudinal direction of the connecting elongated hole 68. By this force, the upper portion 48a of the lower pedal member 48 pivots rearwardly around the third pivot shaft 56. As a result, the lower portion 48b of the lower pedal member 48 is forcibly displaced in the forward direction of the vehicle.

Next, as shown in FIG. 15 by the solid line, the wing-cam 50 continues pivoting until the pin bolt 66 abuts at the end of the connecting elongated hole 68 and guiding elongated holes 70 and 72. At this time, the wing-cam 50 is slidingly pivoted with respect to the abutting member 32 of the vehicle, and its abutting position will vary from the point H to I, when the pedal is not in its operated condition, whereas it will vary from the point J to K, when the pedal is in its operated condition. The wing-cam 50 will, when its pivoting action has finished, take generally horizontal position, with its abutting portion 50g extending toward the front upper side of the vehicle, and with its extending portion 50h extending generally horizontally or extending toward the front upper side of the vehicle.

Next, as shown in FIG. 15 by the chain line, if such a wing-cam 50 or connecting mechanism 60 are not provided, then the lower pedal member 48 moves toward the inside of the cabin of the vehicle to a much larger extent. It will clearly be understood that such the large extent rearward movement can be prevented by the brake pedal support structure 30 of this embodiment.

Herein, even when the lower pedal member 48 is forcibly displaced, the piston rod 36 is still connected to the first upper pedal member 44. Thus, when the pedal is in its operated condition, the force applied by the driver's foot is transmitted to the piston rod 36 through the forcibly displaced lower pedal member 48 and respective upper pedal members 44 and 46, whereby the braking force of the vehicle can be maintained. Also, the driver can support his body by pressing his foot on the pedal 48c in order to prevent himself from being thrown out of the vehicle.

Herein, when the vehicle crashes during a braking operation, a large impact force is applied to the driver's feet. In this embodiment of the present invention, as shown in FIG. 13, since the wing-cam 50 is disposed in such a manner that the distance D2 between the abutting portion 50g and the abutting member 32 of the vehicle when the pedal is in its operated condition is shorter than the distance D1 when the pedal is not in its operated condition, the abutting portion 50g of the wing-cam 50 can be abutted against the abutting member 32 of the vehicle earlier when the pedal is in its operated condition, than when the pedal is not in its operated condition. Therefore, when the pedal is in its operated condition, the lower pedal member 48 is forcibly displaced in an earlier stage, whereby the amount of impact force affecting the driver can be effectively reduced.

Also, in accordance with the brake pedal support structure 30 of this embodiment, the wing-cam 50 and the instrument panel member 14 are not connected to each other, and the distance R from the first pivot shaft 40 of the abutting portion 50g (see FIG. 13) is adjusted in such a manner that the abutting portion 50g of the wing-cam 50 and the abutting member 32 of the vehicle are spaced apart by the distances D1 and D2. Thus a desired characteristic can be obtained both when the pedal is not in its operated condition and when the pedal is in its operated condition. In this brake pedal unit 34, since the lower pedal member 48 and wing-cam 50 or abutting member are connected by the connecting mechanism 60 and integrated with respective upper pedal members 44 and 46, a relatively compact brake pedal unit 34 can be accomplished. Furthermore, since the integrated brake pedal unit 34 is not connected to the instrument panel member 14, the brake pedal unit 34 can easily be assembled in the vehicle body, and the accuracies of these components, which are needed to determine relative position between the brake pedal unit 34 and the instrument panel member 14, will be decreased.

Also, since the lower pedal member 48 is forcibly displaced by the connecting mechanism 60, a relatively compact and a light weight brake pedal unit 34 can be accomplished.

Next, with reference to the FIGS. 15 and 16, the pivoting characteristic of the wing-cam 50, the pivoting characteristic of the connecting elongated hole 68 by the connecting mechanism 60, and the characteristic of the forcible displacement of the lower pedal member 48 that is obtained by these two characteristics will be described in detail. FIGS. 16 are graphs, wherein FIG. 16(a) shows the pivoting speed characteristic of the wing-cam, FIG. 16(b) shows the pivoting characteristic of the elongated hole of the connecting mechanism, and FIG. 16(c) shows the speed characteristic of the forcible displacement of the lower pedal member, respectively.

In this embodiment of the present invention, by properly adjusting the pivoting characteristic of the wing-cam 50 (FIG. 16(a)) and the pivoting characteristic of the connecting elongated hole 68 (FIG. 16(b)), the characteristic of the forcible displacement or characteristic of the forcible pivoting of the lower pedal member 48 can be obtained. Thus, as shown in FIG. 16(c), the speed of the forcible displacement of the lower pedal member 48 is set high both in the initial stage of crash of the vehicle, namely at the beginning of the pivoting by the abutting against the abutting member 32 of the vehicle and in the late stage of crash of the vehicle in which the amount of rearward movement of the member 48 is large, and wherein the displacing speed of the member 48 in the late stage of crash of the vehicle is larger than that in the initial stage of crash of the vehicle.

Firstly, the pivoting characteristic of the wing-cam 50 will be described in detail. As shown by the two-dot chain lines in FIGS. 15(a) and 15(b), because the second portion 50b of the wing-cam 50 extends upwardly with respect to the second pivot shaft 54 when the vehicle is in a normal operation, in the initial stage of crash of the vehicle, the direction of the rearward movement of the brake pedal unit 34 (generally horizontal direction) corresponds to the pivoting direction of the wing-cam 50, which is the circumferential direction around the second pivot shaft 54. Therefore, in the initial stage of crash of the vehicle, the amount of pivoting of the wing-cam 50 generally corresponds to the amount of rearward movement of the brake pedal unit 34, whereby the rearward movement of the brake pedal unit 34 is converted to the pivoting action of the wing-cam 50 with high efficiency.

Next, because the second portion 50b of the wing-cam 50 pivots in the forward direction of the vehicle body around the second pivot shaft 54 so as to fall forward until it reaches the horizontal position, the pivoting direction of the wing-cam 50 gradually changes with respect to the rearward movement of the brake pedal unit 34 as the wing-cam 50 further pivots.

Thus, as the wing-cam 50 further pivots, the efficiency of the conversion from the rearward movement of the brake pedal unit 34 to the pivoting action of the wing-cam 50 gradually decreases.

Herein, if the speed of the rearward movement of the brake pedal unit 34 is constant, then the pivoting speed of the wing-cam 50 in the initial stage of crash of the vehicle is higher than that when the wing-cam 50 further pivots. Accordingly, the characteristic of the wing-cam 50 can be shown by this pivoting speed as in FIG. 16(*a*).

Also, in the initial stage of crash of the vehicle, because the pivoting speed of the wing-cam 50 is high, the speed of the pin bolt 66 relative to the speed of the connecting elongated hole 68 is high as well. Thus, the pin bolt 66 held in the normal positions 68*a*, 70*a* and 72*a* can move against the frictional force with respect to the connecting elongated hole 68 and by destroying the notch 72*c*, it can move out of the normal positions 68*a*, 70*a* and 72*a*.

Next, as shown in FIG. 15(*b*), when the brake pedal is in its operated condition, the second pivot shaft 54 is located slightly below the first pivot shaft 40 or brake hub, while the second portion 50*b* of the wing-cam 50 is located to be slightly inclined in the rearward direction of the vehicle body, and inclining slightly rearwardly with respect to the vertical direction. Thus, the second portion 50*b* of the wing-cam 50 is firstly pivoted so as to stand up in the vertical direction, and then falls forwardly in the forward direction of the vehicle when it abuts against the abutting member 32 of the vehicle.

Therefore, as shown in FIG. 16(*a*), when the brake pedal is in its operated condition, the pivoting speed of the wing-cam 50 increases until the wing-cam 50 takes a vertical position, thereafter, the speed of the wing-cam 50 is decreased by the second portion 50*b* of the wing-cam 50 falling forward in the forward direction of the vehicle.

Also, because the second portion 50*b* of the wing-cam 50 starts pivoting from a position inclined in the rearward direction of the vehicle body, thus the range in which the high efficiency of conversion from the rearward movement of the brake pedal unit 34 to the pivoting action of the wing-cam 50 can be obtained. Namely, the range in which the second portion 50*b* of the wing-cam 50 pivots at the generally vertical position, will be larger when the brake pedal is in its operated condition than when the brake pedal is not in its operated condition. As a result, the pivoting speed of the wing-cam 50 is greater when the brake pedal is in its operated condition over whole pivoting range thereof, than when the brake pedal is not in its operated condition.

Next, the pivoting characteristic of the connecting elongated hole 68 obtained by the connecting mechanism 60 will be described in detail. Herein, in the late stage of crash of the vehicle, since the impact force applied to the driver can be strong, there is a need for providing a large displacement of the lower pedal member 48 in a short period, in order to protect the driver more reliably. However, in the late stage of crash of the vehicle, it is difficult to provide a larger displacement of the lower pedal member 48 in a short period by the characteristic of the wing-cam 50, described above, thus in this embodiment of the present invention, a large forcible displacement of the lower pedal member 48 can be obtained by the connecting mechanism 60.

Firstly, as shown by the two-dot chain lines in FIGS. 15(*a*) and 15(*b*), because the first portion 50*a* of the wing-cam 50 extends in the forward direction of the vehicle with inclining downwardly when the vehicle is in normal operation, when the wing-cam 50 further pivots, the amount of the movement of the pin bolt 66 in the forward direction of the vehicle body gradually increases.

On the other hand, since the connecting elongated hole 68 of the lower pedal member 48 extends in the normal direction with respect to the first portion 50*a*, when the pin bolt 66 further moves, the connecting elongated hole 68, i.e., the upper portion 48*a* of the lower pedal member 48, pivots in such a manner that the direction of the connecting elongated hole 68 stands up vertically. Also, the moving direction of the pin bolt 66 gradually changes toward the direction normal with respect to the longitudinal direction of the connecting elongated hole 68.

Therefore, as the wing-cam 50 further pivots, the efficiency of the conversion from the amount of the pivoting movement of the wing-cam 50 to the amount of the pivoting movement of the connecting elongated hole 68 gradually increases.

Herein, if the pivoting speed of the wing-cam 50 is constant, then the pivoting speed of the lower pedal member 48 in the initial stage of crash of the vehicle is small and gradually becomes larger as the wing-cam 50 further pivots. Thus, the pivoting characteristic of the connecting elongated hole 68 obtained by the connecting mechanism 60 can be shown by this pivoting speed of the connecting elongated hole 68 or upper portion 48*a*, as in FIG. 16(*b*).

As shown in FIG. 16(*b*), according to the pivoting characteristic of the connecting elongated hole 68 by the connecting mechanism 60, if the pivoting speed of the wing-cam 50 is constant, then the pivoting speed of the connecting elongated hole 68 increases as the wing-cam 50 further pivots. As a result, in the late stage of crash of the vehicle, a high speed of the forcible displacement of the lower pedal member 48 can be obtained by the connecting mechanism 60.

Therefore, by adding the pivoting characteristic of the wing-cam 50 (FIG. 16(*a*)) to the pivoting characteristic of the connecting elongated hole 68 (FIG. 16(*b*)), the characteristic of the forcible displacement of the lower pedal member 48 can be obtained as shown in FIG. 16(*c*).

In this embodiment of the present invention, as shown in FIG. 16(*c*), the direction in which second portion 50*b* of the wing-cam 50 extends and the length from the second pivot shaft 54 to the pin bolt 66 are adjusted in such a manner that the speed of the forcible displacement of the lower pedal member 48 in the late stage of crash of the vehicle is larger than that in the initial stage of crash of the vehicle. Also, the direction in which upper portion 48*a* of the lower pedal member 48 extends and the location in the radial direction of the connecting elongated hole 68 formed in the upper portion thereof are adjusted in the same manner.

Thus, as shown in FIG. 16(*c*), the high speed forcible displacement of the lower pedal member 48 can be provided by the wing-cam 50 and the connecting mechanism 60, both in the initial stage of crash of the vehicle and in the late stage of crash of the vehicle, wherein the speed of the displacement in the late stage of crash of the vehicle is higher than that in the initial stage of crash of the vehicle.

Accordingly, in this embodiment of the present invention, the lower pedal member 48 is displaced by a large amount in a short period when the abutting portion 50*g* of the wing-cam 50 abuts or collides against the abutting member 32 of the vehicle, whereby preventing the lower pedal member 48 from moving toward the inside of the cabin of the vehicle. Especially, the rapidly increasing impact force received by the driver in the initial stage of crash of the vehicle, when driver is operating the brake pedal, can be reduced.

Also, since the lower pedal member 48 is displaced by a large amount in a short period in the late stage of crash of the vehicle, whereby effectively preventing the lower pedal member 48 from moving rearwardly into the cabin of the vehicle. Furthermore, because the speed of the forcible displacement in the late stage of crash of the vehicle is higher than that in the initial stage of crash of the vehicle, whereby the rearward movement can more effectively be prevented. More particularly, when the driver is operating the brake pedal 48c, the amount of the impact force received by the driver can be reduced.

Also, because the speed of the forcible displacement of the lower pedal member 48 when the brake pedal is in its operated condition is higher through all the pivoting range than that when the brake pedal is not in its operated condition, the impact force received by the driver can be reduced.

Also, because the second portion 50b of the wing-cam 50 extends in the upper direction with respect to the second pivot shaft 54, and the pivoting speed of the connecting elongated hole 68 is adjusted by the connecting mechanism 60, the abutting portion 50g of the wing-cam 50 can be reliably abutted against the abutting member 32 of the vehicle, and a large amount of displacement of the lower pedal member 48 in the late stage of crash of the vehicle can be obtained.

Accordingly, in this embodiment of the present invention, although the efficiency of the conversion from the amount of rearward movement of the brake pedal unit 34 to the amount of the forcible displacement of the lower pedal member 48 decreases in the late stage of crash of the vehicle due to the pivoting characteristic of the wing-cam 50, the efficiency of the conversion from the amount of rearward movement of the brake pedal unit 34 to the amount of the forcible displacement of the lower pedal member 48 can be increased in the late stage of crash of the vehicle due to the pivoting characteristic of the connecting elongated hole 68 obtained by the connecting mechanism 60. Thus, in the initial stage of crash of the vehicle, the efficiency of the conversion from the amount of rearward movement of the brake pedal unit 34 to the amount of the forcible displacement of the lower pedal member 48 can be improved by the pivoting characteristic of the wing-cam 50, while, in the late stage of crash of the vehicle, the efficiency of the conversion from the amount of rearward movement of the brake pedal unit 34 to the amount of the forcible displacement of the lower pedal member 48 can be improved by the pivoting characteristic of the connecting mechanism 60.

Next, with reference to the FIG. 15, the operation of the brake pedal support structure 30 after the forcible displacement of the lower pedal member 48 has finished will be described in detail.

As shown in FIGS. 15(a) and 15(b), when the forcible displacement of the lower pedal member 48 has finished, the wing-cam 50 is positioned in such a manner that its abutting portion 50g extends in the forward direction of the vehicle with inclining upwardly (see FIG. 13) and its extending portion 50h extends generally horizontally or extends in the forward direction of the vehicle with inclining upwardly (see FIG. 13). Also, the abutting portion 50g and the extending portion 50h of the wing-cam 50 are located below the instrument panel member 14 to abut against the lower portion of the abutting member 32 of the vehicle.

When the brake pedal unit 34 moves rearwardly beyond the position in which the forcible displacement has finished, the wing-cam 50 moves with respect to the abutting member 32 of the vehicle so that its abutting position changes from the abutting portion 50g or first abutting portion, the point I or K, to the extending portion 50h or second abutting portion. At this time, the wing-cam 50 receives a pushing force in the forward direction of the vehicle inclining downwardly from the abutting member 32 of the vehicle, and this force is transmitted from the wing-cam 50 to the left side support bracket 38b and the right side support bracket 38c through the respective upper pedal members 44 and 46 and the brake hub 40. In this embodiment of the present invention, the respective support brackets 38b and 38c are deformed by this pushing force in such a manner that the brake pedal unit 34 is displaced downwardly with respect to the direction to the front of the vehicle.

In this embodiment of the present invention, when the wing-cam 50 has finished pivoting, because the abutting portion 50g or first abutting portion extends toward the front upper side of the vehicle and the extending portion 50h or second abutting portion extends generally horizontally or extends toward the front upper side of the vehicle, the force received from the abutting member 32 of the vehicle can be transmitted to the respective support brackets 38b and 38c, whereby the respective support brackets 38b and 38c can be reliably deformed.

More particularly, because the extending portion 50h or second abutting portion abuts against the abutting member 32 of the vehicle with extending generally horizontally or extending toward the front upper side of the vehicle, the brake pedal unit 34 can be pushed down further.

Thus, when the brake pedal unit 34 moves rearwardly, the brake pedal unit 34 is displaced toward below the instrument panel member 14 as if it sinks down while the respective support brackets 38b and 38c are deformed by the force received from the abutting member 32 of the vehicle.

Accordingly, in this embodiment of the present invention, not only the lower pedal member 48 is forcibly displaced by the connecting mechanism 60, but also the brake pedal unit 34 is forcibly displaced by the deformation of the respective support brackets 38b and 38c, whereby the rearward movement of the lower pedal member 48 into the cabin of the vehicle can be prevented. Also, because the rearward movement of the lower pedal member 48 into cabin of the vehicle is prevented by the deformation of the respective support brackets 38b and 38c, a compact and light weight brake pedal unit 34 can be accomplished.

Next, the operation of the brake pedal support structure 30 of this embodiment which assures a braking operation when the vehicle is in a normal operation will be described in detail.

Firstly, as can be seen in FIGS. 9 and 11, since the left side support bracket 38b is formed in such a manner that it extends to the proximity of the head 66a of the pin bolt 66 over all the moveable range of the pin bolt 66, even if the nut 74 fixing the pin bolt 66 is loosened, the pin bolt 66 is not removed out of the connecting elongated hole 68 or the hole 50f of the wing-cam 50.

Next, as shown in FIG. 13, when the vehicle is in a normal operation, since the pin bolt 66 receives a force F1 from the connecting elongated hole 68, the direction of which force F1 is generally normal with respect to the longitudinal direction of the connecting elongated hole 68, even if the nut 74 has loosened, the pin bolt 66 is pushed against the first portion 50a of the wing-cam 50 and the respective guiding elongated holes 70 and 72 and therefore the pin bolt 66 is not likely to be-removed by the frictional force.

More particularly, as shown in FIG. 8, because the normal positions 70a and 72a of the respective guiding elongated holes 70 and 72 are formed tight with respect to the pin bolt 66, and furthermore, the notch 72c is formed on the guiding elongated hole 72 of the upper pedal members 44 and 46, even if the nut 74 has loosened, the pin bolt 66 is less likely to be removed out of the normal positions 70a and 72a and is held in the normal positions 70a and 72a. Since the second upper pedal member 46 is made of a thin plate, it has a high formability and the notch 72c can easily be formed.

Next, when the vehicle is in a normal operation, i.e., when the vehicle has not crashed, the connecting elongated hole 68 of the lower pedal member 48 and the guiding elongated holes 70 and 72 of the respective upper pedal members 44 and 46 have such a relationship that their relative positions gradually change as their positions depart from the normal positions 70a and 72a. Thus, even if the nut 74 has loosened, the pin bolt 66 is less likely to be moved along either the connecting elongated hole 68 or the guiding elongated holes 70 and 72.

Next, the operation of the brake pedal support structure 30 of this embodiment which provides the reliable forcible displacement of the lower pedal member 48 will be described in detail.

Firstly, as shown in FIG. 14, because the abut surface 32a of the abutting member 32 of the vehicle is formed in a curved shape in the width direction of the vehicle body, whereby the movement of the wing-cam 50 is less likely to be restricted by the abutting member 32 of the vehicle, no pinch force will affect the wing-cam 50. Therefore, the torsional deformation by such a pinch force can be prevented. Furthermore, the operation of the connecting mechanism 60 can be prevented from being obstructed by a large frictional force generated between the pin bolt 66 and the connecting elongated hole 68 of the lower pedal member 48 due to the pinch force. As a result, the connecting mechanism 60 can operate more reliably. On the other hand, if the connecting mechanism 60 operates reliably, no large counterforce against the force received by the abutting member 32 of the vehicle will be caused on the connecting mechanism 60, and thus the deformation of the wing-cam 50 can be prevented.

Next, since the wing-cam 50 is disposed outside of the second upper pedal member 46, one of its side surfaces is opened, and thus the frictional force generated in the case that the wing-cam is sandwiched by two members can be prevented.

Also, since the second upper pedal member 46 and the wing-cam 50 are being held without any tight contact therebetween by the head portion 66a of the pin bolt 66 and the nut 74, the wing-cam 50 is allowed to pivot in the width direction of the vehicle body. Therefore, although the wing-cam 50 may be inclined in the width direction of the vehicle body by the abutment against the abutting member 32 of the vehicle, no large frictional force against the second upper pedal member 46 can be generated. On the other hand, since the second upper pedal member 46 provides guidance of the wing-cam 50, the wing-cam 50 is prevented from inclining mainly in the width direction of the vehicle body.

Due to the above, in this embodiment of the present invention, the wing-cam 50 can easily be pivoted, whereby the force received from the abutting member 32 of the vehicle can reliably be transmitted to the pin bolt 66. As a result, even if the frictional force generated between the pin bolt 66 and the connecting elongated hole 68 becomes slightly large, the pin bolt 66 can be reliably moved with respect to the connecting elongated hole 68.

Next, because the sliding ranges 70b and 72b of the guiding elongated holes 70 and 72 are formed relatively loose with respect to the pin bolt 66, thus, even when the wing-cam 50 is inclined in the width direction of the vehicle body due to the force received from the abutting member 32 of the vehicle, the movement of the pin bolt 66 can be guided without significant restriction thereof. On the other hand, since the connecting elongated hole 68 of the lower pedal member 48 is formed tightly with respect to the pin bolt 66, the connecting mechanism 60 can be reliably operated without play.

Also, because the guiding elongated holes 70 and 72 are formed tightly with respect to the pin bolt 66 at their normal positions 70a and 72a, even when the wing-cam 50 is inclined in the width direction of the vehicle body due to the impact force received from the abutting member 32 of the vehicle, and thus the pin bolt 66 is going to be inclined as well, the pin bolt 66 is supported in the guiding elongated holes 70 and 72 at the normal positions 70a and 72a. Thus, because the pin bolt 66 can be prevented from inclining with respect to the connecting elongated hole 68 of the lower pedal member 48, the frictional force generated between the pin bolt 66 and the connecting elongated hole 68 does not become large, whereby the pin bolt 66 can easily start moving from the normal position 68a of the connecting elongated hole 68.

Next, because the guiding elongated holes 70 and 72 are formed on the respective upper pedal members 44 and 46 to be spaced apart in the width direction of the vehicle body, even when the wing-cam 50 is inclined in the width direction of the vehicle body due to the force received from the abutting member 32 of the vehicle, the pin bolt 66 can be supported at two points spaced apart in the width direction of the vehicle body. Thus the pin bolt 66 can be reliably guided.

The first pivot shaft 40, the second pivot shaft 54 and the third pivot shaft 56 respectively generates a counterforce when they received the force from the abutting member 32 of the vehicle through the wing-cam 50, and the counterforce and the force from the wing-cam 50 may deform the respective upper pedal members 44 and 46.

In this embodiment of the present invention, because the respective upper pedal members 44 and 46 are disposed at both sides of the lower pedal member 48, the rigidity of the overall brake pedal unit 34 against the force received from the abutting member 32 of the vehicle can be improved. Thus, even when the force is transmitted from the abutting member 32 of the vehicle to the brake pedal unit 34 through the wing-cam 50, the brake pedal unit 34 is less likely to be deformed, whereby the obstruction against the movement of respective members of the brake pedal unit 34 is prevented. More particularly, in this embodiment of the present invention, although the pin bolt 66 and the connecting elongated hole 68 are formed tightly with respect to each other so as to operate without play, no large frictional force is caused at the connecting mechanism 60, whereby the connecting mechanism 60 can be reliably operated.

Furthermore, since the brake hub 40 and the respective pins 54, 56 acting as the first to third pivot shafts are so arranged to be located in the same plane with respect to the upper pedal members 44 and 46 having no offsets in the width direction of the vehicle body therebetween (see FIGS. 5, 6, and 9), moment forces for bending the respective upper pedal members 44 and 46 are less likely to be causes. Thus, it can be prevented that the respective upper pedal members 44 and 46 deform and due to the deformations, the respective upper pedal members 44 and 46 and the lower pedal member 48 or the wing-cam 50 come into contact with each other, causing a large frictional force, thereby pivoting action therebetween is obstructed. Also, the relative positions between the connecting elongated hole 68, the respective guiding elongated holes 70 and 72 and the pin bolt 66 are less likely to be changed, whereby the connecting mechanism 60 can be reliably operated.

Next, with reference to the FIG. 17, the operation of the stop member 42 of the brake pedal support structure in this embodiment of the present invention will be described in detail.

Figure 17:
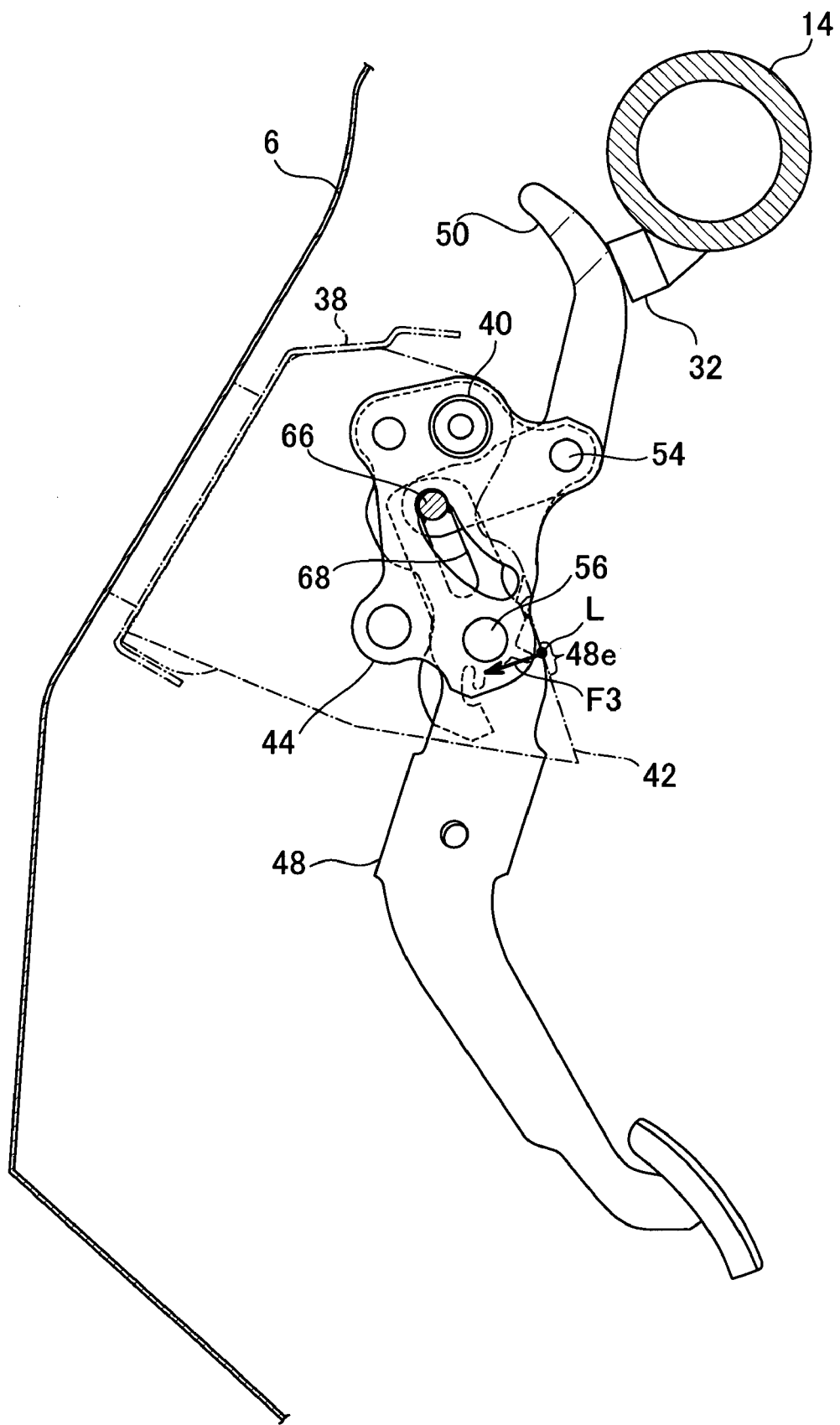
FIG. 17 is a side view of the left side of the brake pedal unit in accordance with first embodiment of the present invention showing the operation of the stop member.

FIG. 17 is a left side view of the brake pedal unit showing the operation of the stop member. FIG. 17 shows that, when the brake pedal unit 34 moves rearwardly and the wing-cam 50 abuts against the abutting member 32 of the vehicle, the connecting mechanism 60 does not operate properly. In this condition, the brake pedal unit 34 moves rearwardly integrally and the lower pedal member 48 abuts against the stop member 42.

As described above, the connecting mechanism 60 is constructed so as to reliably operate. However, some situations may be expected in which the connecting mechanism 60 does not operate, such as, for example, when the pin bolt 66 does not overcome the frictional force generated between the connecting elongated hole 68 and the respective guiding elongated holes 70 and 72, or the notch 72c is not destroyed.

If the driver is pushing the brake pedal when the vehicle crashes, then that force produced by the braking operation prevents the respective upper pedal members 44 and 46 and lower pedal member 48 from pivoting rearwardly integrally, whereby the wing-cam 50 pivots with respect to these members 44, 46 and 48, and thus the connecting mechanism 60 can easily be operated. On the other hand, there are some situations in which the operation of the connecting mechanism 60 can be obstructed, such as, for example, when the frictional force generated between the pin bolt 66 and the lower pedal member 48 increases due to the driver's braking force, or as described above, when the pin bolt 66 is being held in its normal position.

Also, when the brake pedal is not in its operated condition, unless the piston rod 36 has broken, because the piston rod 36 exerts a pulling force on the upper pedal member in the forward direction of the vehicle body, which causes the wing-cam 50 to easily pivot with respect to each of members 44, 46 and 48. However, the piston rod 36 might be broken when the vehicle crashes.

Therefore, in this embodiment of the present invention, even though the connecting mechanism 60 does not operate, the stop member 42 provides a reliable operation of the connecting mechanism 60.

As shown in FIG. 17, if the connecting mechanism 60 does not operate when the wing-cam 50 abuts against the abutting member 32 of the vehicle, the brake pedal unit 34 pivots integrally, i.e., with the relative angle and the relative position between the wing-cam 50 and the lower pedal member 48 remaining the same as that when the vehicle is in normal operation, and then the brake pedal unit 34 pivots rearwardly around the first pivot shaft 40.

Thus, when the brake pedal unit 34 pivots integrally, the abutting portion 48e of the lower pedal member 48 abuts against the stop member 42 at a location indicated by L in FIG. 17. By this abutment, a force F3 is exerted on the lower portion of the lower pedal member 48, and by this force along with the force the wing-cam 50 receives from the abutting member 32 of the vehicle, the connecting mechanism 60 can be operated.

At this time, a frictional force is generated between the pin bolt 66 and the connecting elongated hole 68 due to the force F3. Because the stop member 42 is located near the third pivot shaft 56, the member 42 will not exert a large moment force on the lower pedal member 48, whereas a force strong enough to operate the connecting mechanism 60 can be obtained. Thus, even though the frictional force F3 is generated between the pin bolt 66 and the connecting elongated hole 68, this frictional force is not so strong that it obstructs the movement of the pin bolt 66 along the connecting elongated hole 68.

Also, because the abutting portion 48e of the lower pedal member 48 is formed in a curved shape, it can slide with respect to the stop member 42 smoothly and reliably.

Furthermore, since the stop member 42 is located near the lower pedal member 48 when the brake pedal is not in its operated condition, the connecting mechanism 60 can be operated quickly when the brake pedal is not in its operated condition. Also, the member 42 does not obstruct the normal braking operation.

Accordingly, in this embodiment of the present invention, the connecting mechanism 60 can be reliably operated and the lower pedal member 48 is forcibly displaced, whereby the rearward movement of the lower pedal member into the cabin of the vehicle can be reliably prevented.

Figure 18:
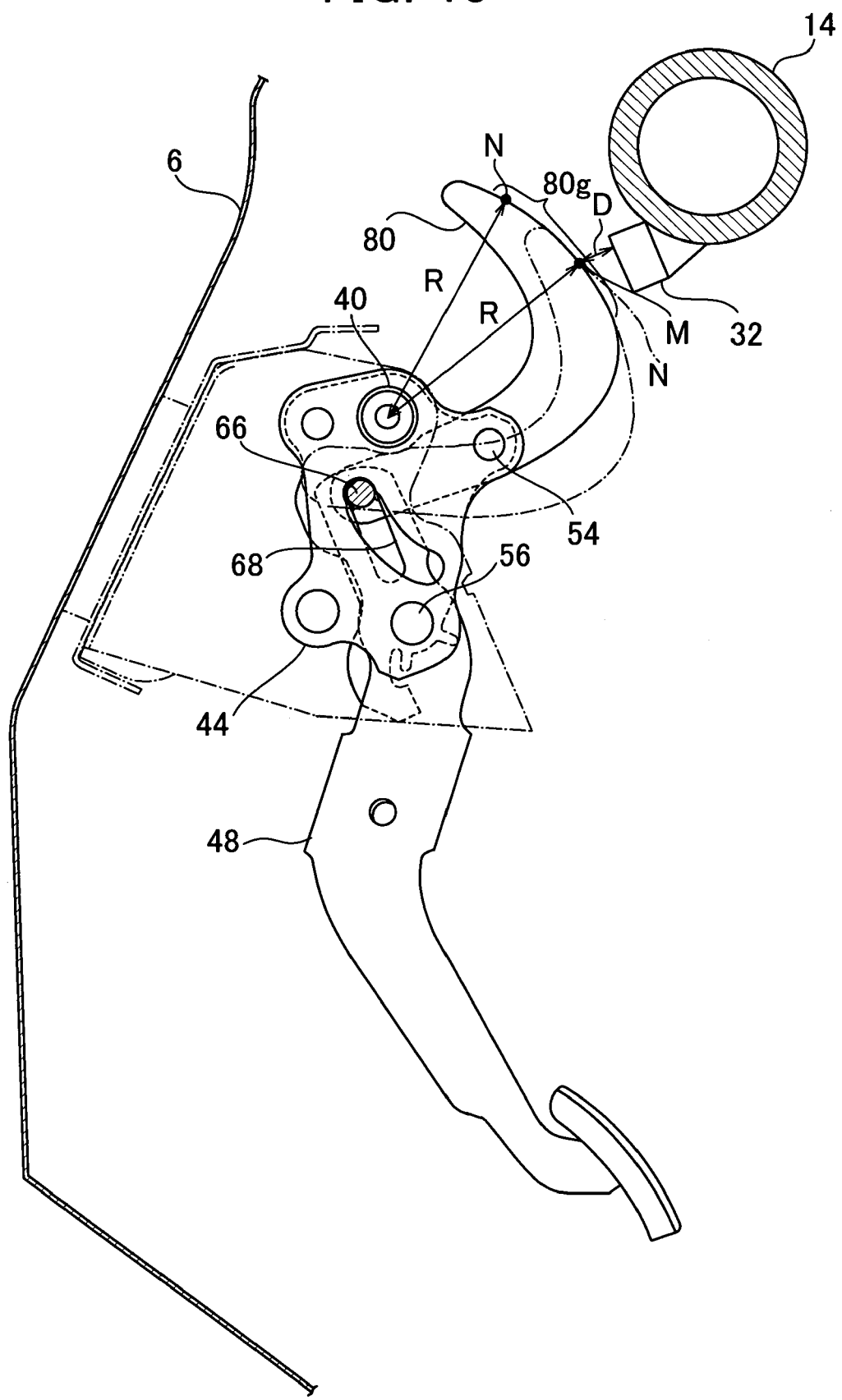
FIG. 18 is a side view showing the left side of the brake pedal support structure in accordance with the second embodiment of the present invention.

Now, with reference to the FIG. 18, the brake pedal support structure of the second embodiment of the present invention of the present invention will be described in detail. FIG. 18 is a left side view of the brake pedal unit in accordance with this embodiment. Since the basic structure of this embodiment is the same as that of the first embodiment of the present invention, only the difference therebetween will be described in detail, namely shape of the wing-cam.

As shown in FIG. 18, the abutting portion 80g of the wing-cam 80 is formed in such a manner that the distance between the first pivot shaft 40 to the abutting portion 80g remains at a constant R having an arc-like shape.

When brake pedal unit 34 moves rearwardly, it abuts or collides at a point M when the brake pedal is not in its operated condition, whereas when the brake pedal is in its operated condition, shown by a dot chain line, it abuts or collides at the point N. Because the abutting portion 50g is formed to have a constant radial R arc-like shape, the distances from the first pivot shaft 40 to these points M or N are the same. Thus, both when the brake pedal is not in its operated condition and when the brake pedal is in its operated condition, the relative distance between the abutting portion 80g and the abutting member of the instrument panel member 14 is a same distance D.

In this embodiment of the present invention, because the timing of the abutment between the wing-cam 80 and the abutting member 32 of the vehicle when the brake pedal is not in its operated condition is the same as when the brake pedal is in its operated condition, regardless of whether or not the brake pedal is in its operated condition, the driver's feet can be protected.

Figure 19:
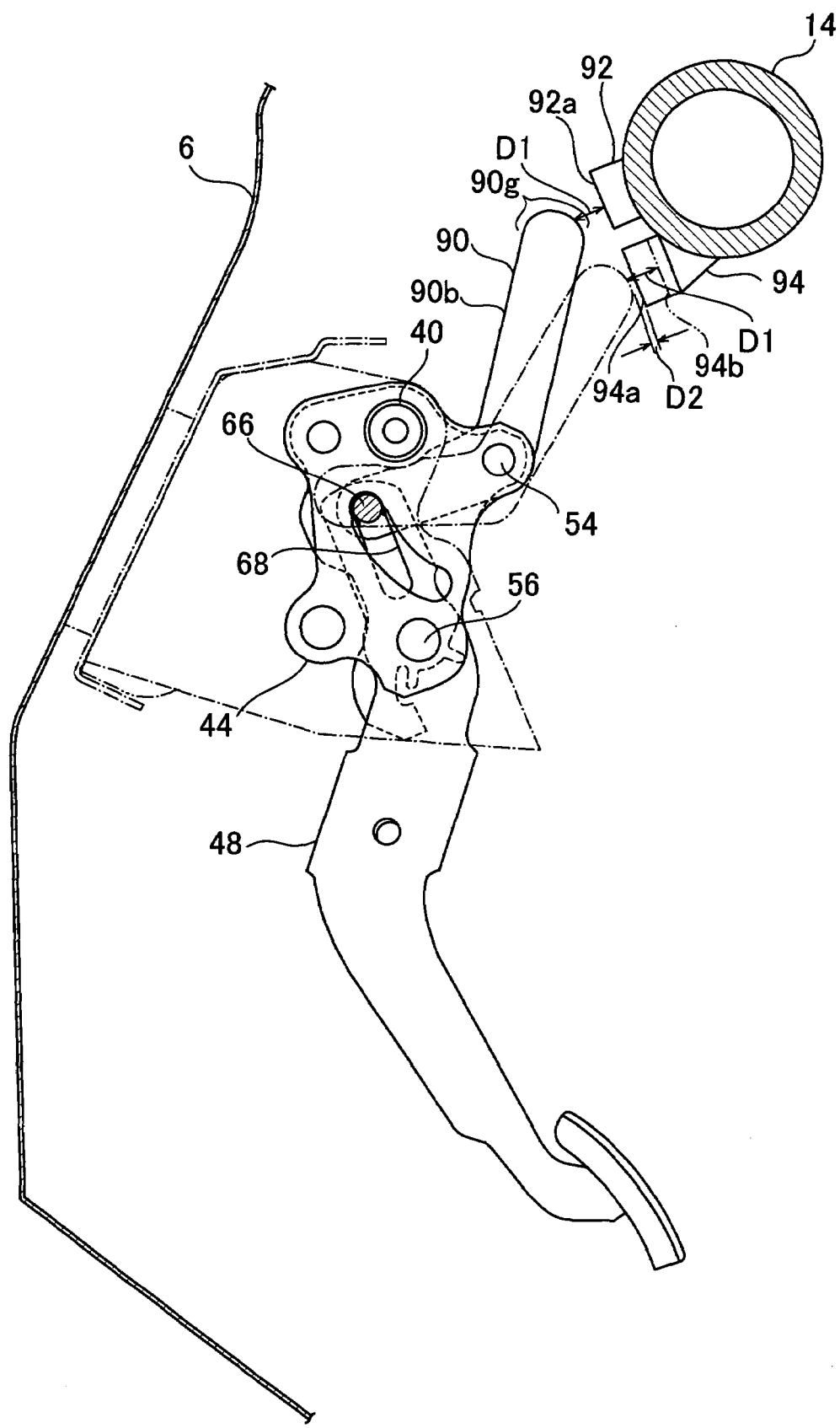
FIG. 19 is a side view showing the left side of the brake pedal support structure in accordance with the third embodiment of the present invention.

Now, with reference to the FIG. 19, the brake pedal support structure in accordance with the third embodiment of the present invention will be described in detail. FIG. 19 is a left side view showing the brake pedal support structure in accordance with this embodiment. Since the basic structure of this embodiment is the same as that of the first embodiment of the present invention, only the difference therebetween will be described in detail, namely the shape of the wing-cam.

As shown in FIG. 19, the wing-cam 90 of this embodiment is formed in such a manner that its second portion 90b extends generally in a straight shape, which has an abutting portion 90g formed by a curved surface at the end thereof.

The instrument panel member 14, on the other hand, has a first abutting member 92 of the vehicle and a second abutting member 94 of the vehicle, respectively, formed thereon. The respective first and second abutting members 92 and 94 of the vehicle are located in such a manner that the abutting portion 90g abuts or collides against the first abutting member 92 of the vehicle when the brake pedal is not in its operated condition, whereas, as shown by a dot chain line, the abutting portion 90g abuts or collides against the second abutting member 94 of the vehicle when the brake pedal is in its operated condition.

The first and second abutting members 92 and 94 of the vehicle are disposed in such a manner that when the brake pedal is not in its operated condition, there is a distance D1 between the respective abut surfaces 92a and 94a and the abutting portion 90*g*, while when the brake pedal is in its operated condition, there is a distance D2 shorter than D1.

Thus, the wing-cam 90 abuts against the abutting member 94 earlier when the brake pedal is in its operated condition than when the brake pedal is not in its operated condition, and as a result, the lower pedal member 48 can be forcibly displaced earlier, whereby providing protection for the driver's feet.

Also, because the first abutting member 92 of the vehicle and the second abutting member 94 of the vehicle are formed separately, the wing-cam 90 can abut against the first and second abutting members 92 and 94 of the vehicle more properly both when the brake pedal is not in its operated condition and when the brake pedal is in its operated condition.

In an alternative embodiment of the present invention, the respective abut surfaces 92*a* and 94*a* of these abutting members 92 and 94 of the vehicle may be located in such a manner that the relative distance between the abutting portion 90*g* and the abutting members 92 and 94 of the vehicle of the instrument panel member 14 when the brake pedal is not in its operated condition is the same as when the brake pedal is in its operated condition. For example, as shown in FIG. 19 by the two-dot chain line, the abut surface 94*a* of the second abutting member 94 of the vehicle can be formed to be spaced apart by the distance D1 from the abutting portion 90*g*, which distance is that when the brake pedal is not in its operated condition.

In this case, the abutting timings between the wing-cam 90 and these abutting members 92 and 94 of the vehicle are the same, both when the brake pedal is not in its operated condition and when the brake pedal is in its operated condition, thus regardless of whether or not the brake pedal is in its operated condition, the driver's feet can be protected.

Figure 20:
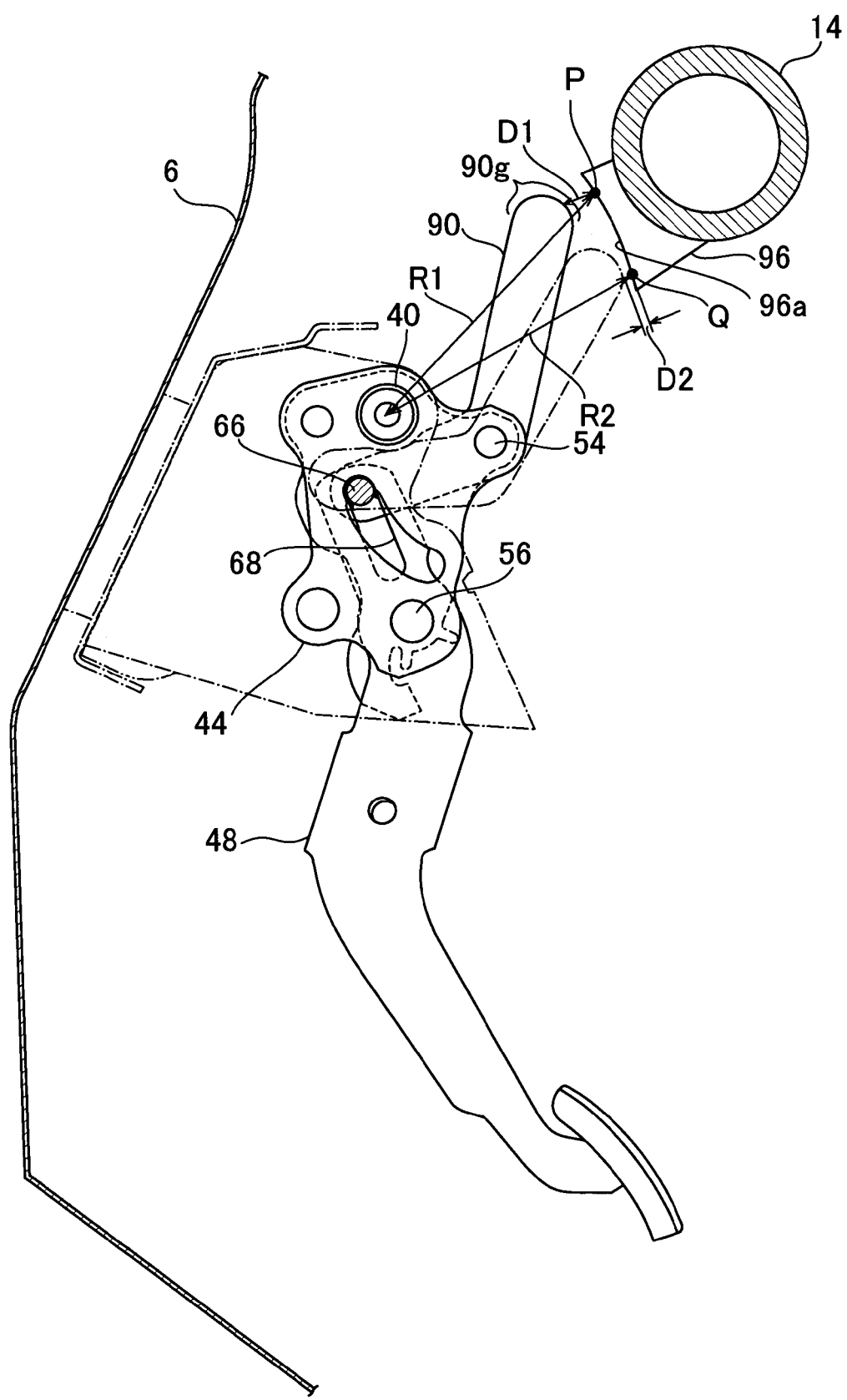
FIG. 20 is a side view showing an alternative embodiment of the abutting member of the vehicle in accordance with the third embodiment of the present invention.

Furthermore, in this embodiment of the present invention, as shown in FIG. 20, the first abutting member of the vehicle and the second abutting member of the vehicle can be formed integrally, against which the wing-cam 90 abuts reliably. In this case, the abutting member 96 of the vehicle is formed in such a manner that the cross-section of the abut surface 96*a* seen in the width direction of the vehicle body has a curved concave shape in a rearward direction.

This abut surface 96*a* has a curved surface wherein the distance R2 from the first pivot shaft 40 to a point Q where the abutting portion 90*g* abuts or collides when the brake pedal is in its operated condition, is shorter than the distance R1 from first pivot shaft 40 to a point P where the abutting portion 90*g* abuts or collides when the brake pedal is not in its operated condition. Thus, the relative distance between the abutting portion 90*g* and the abutting member 96 of the vehicle is the distance D1 when the brake pedal is not in its operated condition, whereas when the brake pedal is in its operated condition, the distance D2 is shorter than D1, whereby the wing-cam 90 can be earlier abutted against the abutting member 96 of the vehicle than when the brake pedal is not in its operated condition.

In an alternative embodiment of the present invention, this abut surface 96*a* may be formed in an arc-like shape having a constant distance R from the first pivot shaft 40. In this case, as described above, the same abutting timing between the wing-cam 90 and the abutting member of the vehicle can be obtained.

Also, the abutting member of the vehicle may be constructed of a plurality of members, in order that the wing-cam 90 can reliably abut against these abut surfaces. In this case, the abut surfaces of the respective members can be formed in plane surfaces, which are connected with respect to each other between each of these members, whereby the abutting portion 90*g* can move smoothly from one of the abut surfaces to another abut surface. Also, the abut surface may be formed by curved surfaces, which are provided continuously between these members, whereby forming an arc-like surface or curved surfaces having different curvatures as a whole.

Now, with reference to the FIGS. 21 to 25, the support structure for a brake pedal of a vehicle in accordance with the fourth embodiment of the present invention will be described in detail.

Figure 21:
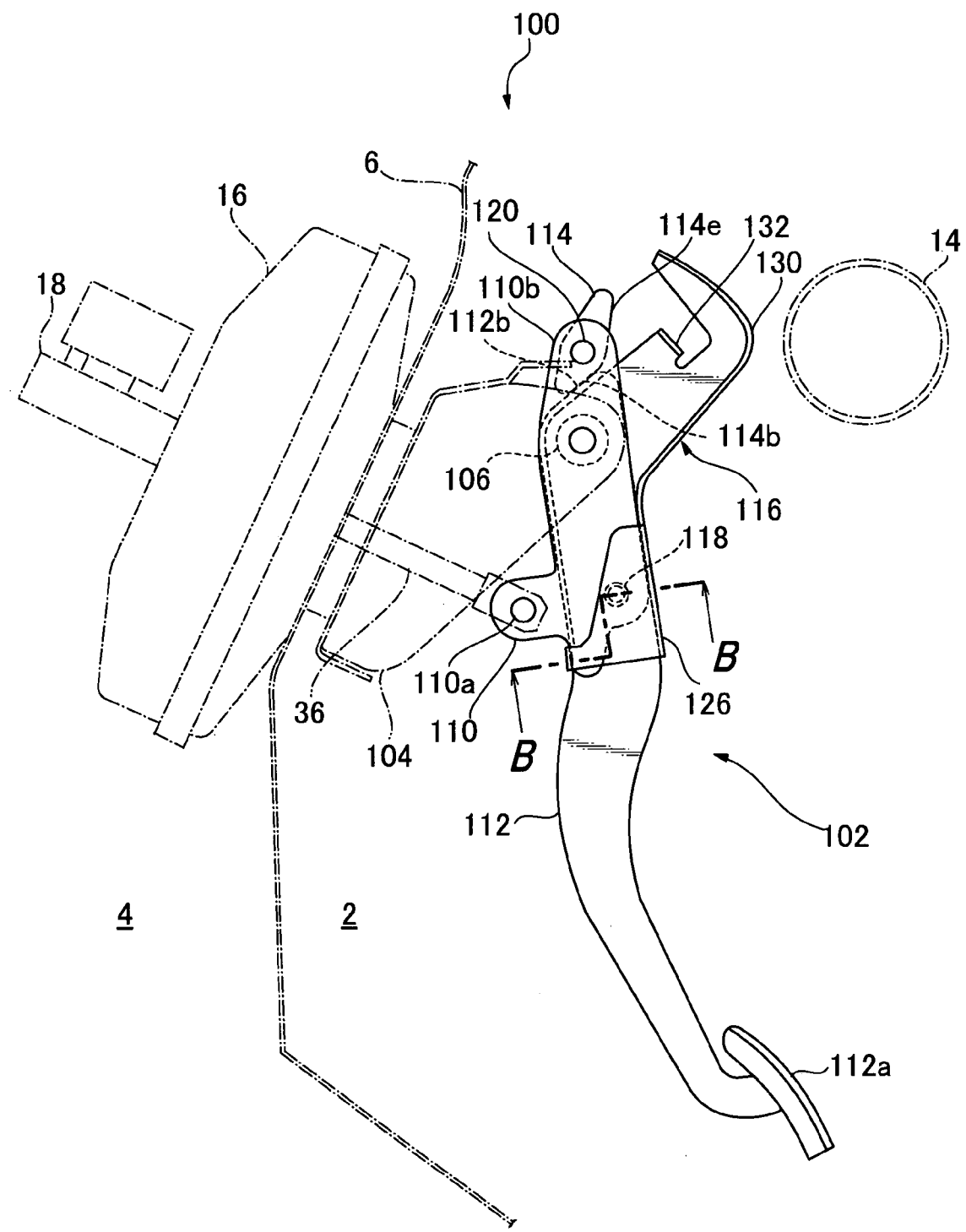
FIG. 21 is a side view showing the left side of the support structure for a brake pedal of a vehicle in accordance with the fourth embodiment of the present invention.
Figure 22:
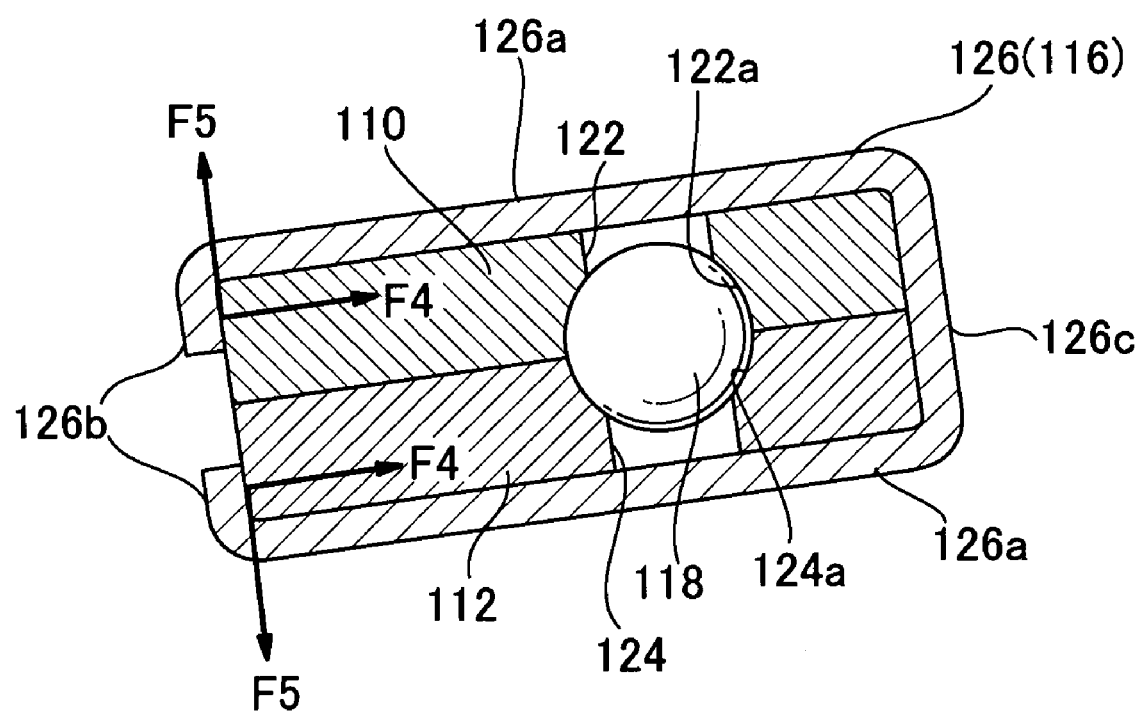
FIG. 22 is a cross-sectional view of the brake pedal unit along the line B-B shown in FIG. 21.
Figure 23:
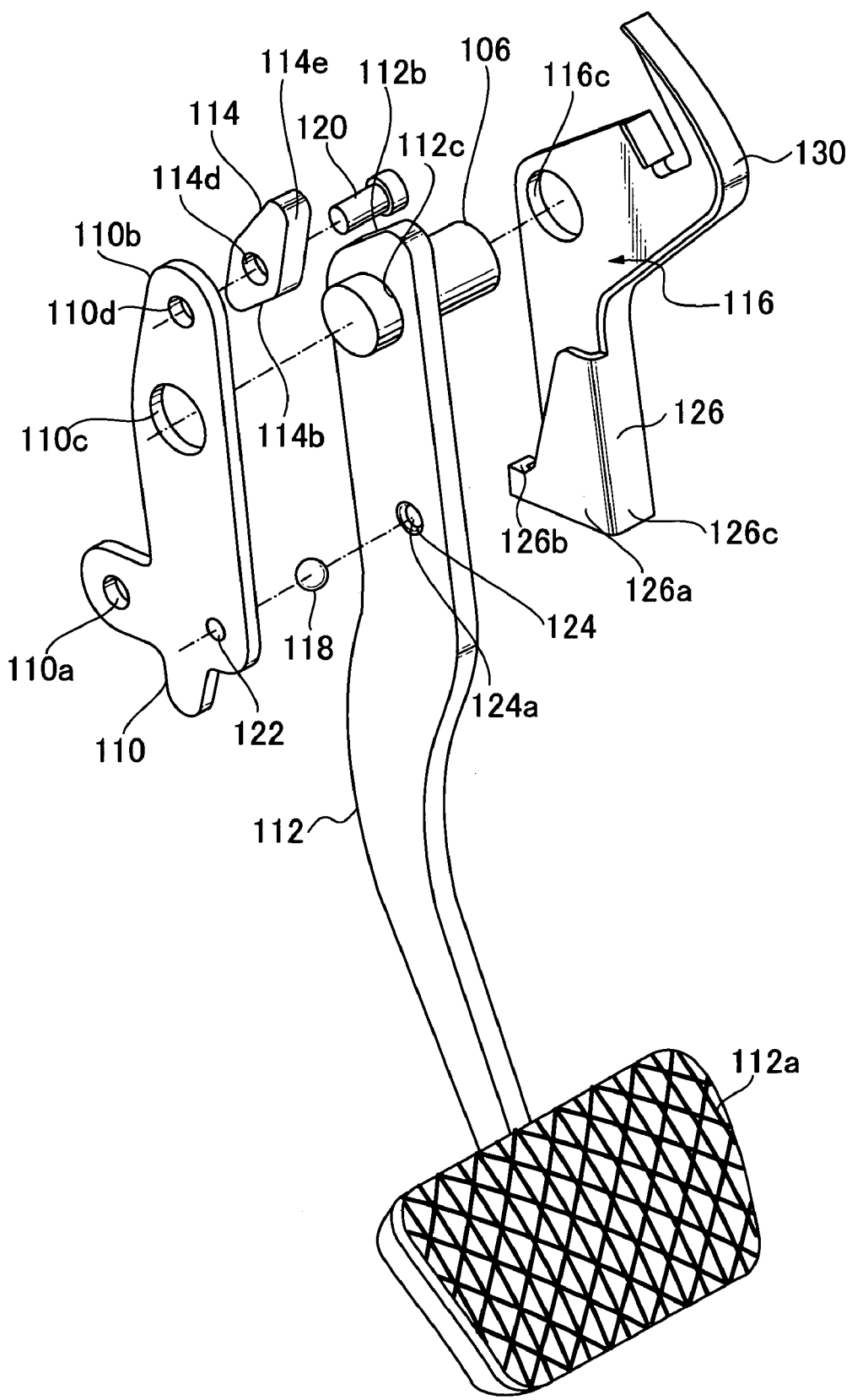
FIG. 23 is an exploded perspective view of the brake pedal unit of the brake pedal support structure in accordance with the fourth embodiment of the present invention.

FIG. 21 is a left side view showing the support structure for a brake pedal of a vehicle of the fourth embodiment of the present invention, FIG. 22 is a cross-sectional view of the pedal unit along the line B-B shown in FIG. 21, and FIG. 23 is an exploded view of the parts of the pedal unit.

As shown in FIG. 21, the same as the first embodiment of the present invention, the vehicle 1 includes a dash board lower panel 6 separating the cabin 2 of the vehicle 1 from the engine room 4, and an instrument panel member 14. A master bag 16 and a master cylinder 18 are attached to the dash board lower panel 6 on its side facing the engine room 4, and a brake pedal support structure 100 is attached to the other side facing the cabin of the vehicle.

The brake pedal support structure 100 is comprised of an integrated brake pedal unit 102 and a bracket 104 or pedal bracket. This bracket 104 is attached to the dash board lower panel 6, and the brake pedal unit 102 is pivotablly supported by a pin shaft 106 attached to this bracket 104.

Next, as can be seen in FIGS. 21 and 22, the brake pedal unit 102 includes an upper pedal member 110, a lower pedal member 112, a cam member 114, a lever member 116 or abutting member, and engaging member 118. A pedal 112*a* is attached at the bottom end of the lower pedal member 112. Also, one end of the piston rod 36 is connected to the upper pedal member 110 via a hole 110*a*, and the other end of the piston rod 36 is connected to the master bag 16.

The upper pedal member 110 and the lever member 116 are all attached to the pin shaft 106 or first pivot shaft so as to pivot around the pin shaft 106. The upper pedal member 110, the lower pedal member. 112, and the lever member move integrally around the pin shaft 106 when the vehicle is in normal operation, i.e., when the vehicle has not crashed. Also, the lower pedal member 112 is attached to the pin shaft 106 so as to be moveable in the width direction of the vehicle body with respect to the upper pedal member 110.

Next, the cam member 114 is attached to the upper portion of the upper pedal member 110 extending above the lower pedal member 112 by a pin shaft 120 or second pivot shaft, so as to pivot around the pin shaft 120. This cam member 114 has a lower portion with a lower rear side surface 114*b* which abuts against a front side surface 112*b* formed at the top portion of the lower pedal member 112 and extends in the front and downward directions when the vehicle is in a normal operation, i.e., when the vehicle has not crashed. This cam member 114 forcibly pivots the second pedal member 112 in the forward direction of the vehicle by its rotation. The cam member 114 has a thickness or width in the width direction of the vehicle body which is enough to abut it against the front side surface 112*b*, even when the lower pedal member 112 moves in the width direction of the vehicle body. In an alternative embodiment of the present invention, the cam member 114 may move in the width direction of the vehicle body along with the lower pedal member 112.

Next, as can be seen in FIG. 23, the pin shaft 106 engages with holes 110*c*, 112*c*, and 116*c* formed in the upper pedal member 110, the lower pedal member 112, and the lever member 116, respectively. Both ends of the pin shaft 106 are attached to the bracket 104. Also, a pin shaft 120 engages with holes 114d and 110d formed in the cam member 114 and upper portion 110b of the upper pedal member 110, respectively.

Also, the upper pedal member 110 and the lower pedal member 112 have engaging holes 122 and 124 formed to be spherical in shape and located at the same distance below the holes 110c and 112c respectively. These engaging holes 122 and 124 penetrate the pedal members 110 and 112 in the width direction of the vehicle body, and have dents 122a and 124a formed with curvatures same as that of the outer surface of the engaging member 118.

As can be seen in FIG. 22, when the vehicle is in normal operation, the respective pedal members 110 and 112 overlap, and the engaging holes 122 and 124 are located in such a manner that the dents 122a and 124a correspond to each other in such an overlapped position, whereby the dents 122a and 124a hold the engaging member therebetween in the width direction of the vehicle body.

Next, as can be seen in FIG. 23, the lever member 116 has a engaging holding portion 126 at a position below the hole 116c for holding the respective pedal members 110 and 112. As can be seen in FIGS. 22 and 23, this engaging holding portion 126 has a side surface 126a, a folded portion 126b, and a rear surface 126c, wherein the side surface 126a holds the respective pedal members 110 and 112 from both sides in the width direction of the vehicle body in order to prevent them from being separated in the width direction of the vehicle body, while the folded portion 126b and the rear surface 126c hold the respective pedal members 110 and 112 from the front and rear in order to prevent them from pivoting in the front or rear direction.

On the other hand, when the vehicle crashes, the lever member 116 abuts against the instrument panel member 14 to cause an impact force, and the folded portion 126b of the engaging holding portion 126 is deformed by this impact force, whereby engagement between the engaging holding portion 126 and the respective pedal members 110 and 112 is released. At this time the lower pedal member 112 is moved with respect to the upper pedal member 110 in the width direction of the vehicle body, and the engaging member 118 is released.

Also, the respective pedal members 110 and 112 are engaged to each other in the front and rear directions by the engaging member 118 in such a manner that the respective pedal members 110 and 112 pivot reliably and integrally when the brake pedal is in its operated condition, and will not be deformed by the driver's braking operation force exerted on the folded portion 126b from the pedal 112a.

Next, as can be seen in FIGS. 21 and 23, the lever member 116 has a first abutting portion 130 at its rear and above the pin shaft 106 or hole 116c. This first abutting portion 130 extends vertically in front of the instrument panel member 14, and when brake pedal support structure 100 moves rearwardly, it abuts against the instrument panel member 14 reliably.

Also, the lever member 116 has a flange portion 132 or second abutting portion folded in the width direction of the vehicle body, which is located at its upper front portion with respect to the pin shaft 106 or hole 116c. This second abutting portion 132 abuts against the rear side surface 114 of the upper portion of the cam member 114 when the lever member 116 pivots relative to the respective pedal members, whereby causing the cam member 114 to be rotated.

Now, with reference to the FIGS. 21, 22, 24, and 25, the operation of this embodiment will be described in detail.

In the brake pedal support structure 100 of this embodiment, when the vehicle is in normal operation, the respective pedal members 110 and 112 are pivoted around the pin shaft 106 by the engaging holding portion 126 and the engaging member 118. The force received by the pedal 112a is transmitted to the piston rod 36 connected to the first pedal member 110.

Figure 24:
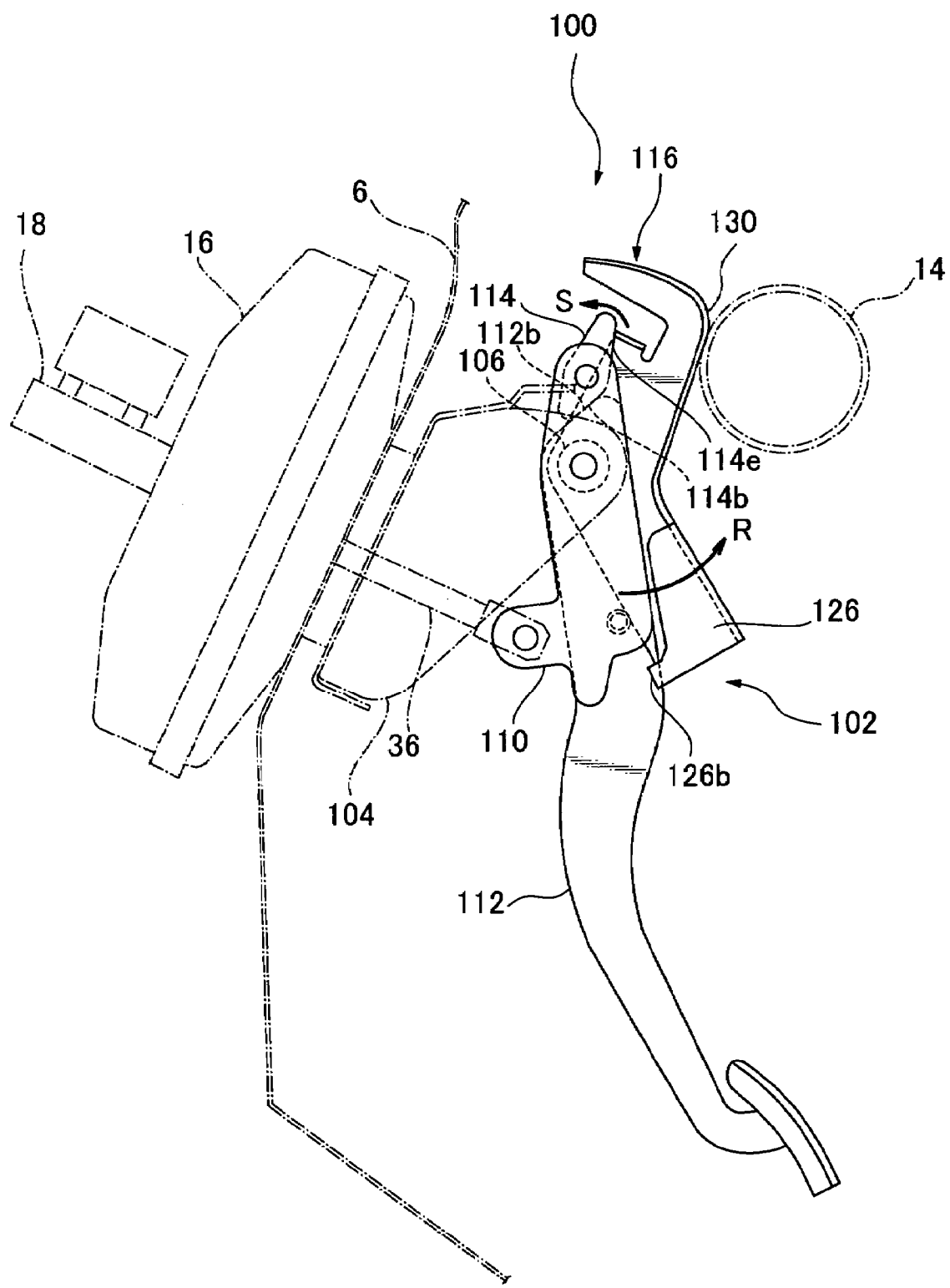
FIG. 24 is a side view of the brake pedal support structure in accordance with the fourth embodiment of the present invention, where the brake pedal support structure is forcibly displaced.

Next, as shown in FIG. 24, the brake pedal unit 102 is moved rearwardly when the vehicle crashes, then the first abutting portion 130 of the lever member 116 abuts against the instrument panel member 14, and the lever member 116 receives a force which causes it to rotate around the pin shaft 106 in the direction indicated by R in the Figure.

At this time, the folded portion 126b of the engaging holding portion 126 is deformed by an impact force received from the first abutting portion, from the shape shown in FIG. 22 to a shape extending straightly in the direction from the front to the rear of the vehicle. As a result, the engaging force overlapping the respective pedal members 110 and 112 is lost, and the lever member 116 pivots relative to the respective pedal members 110 and 112 in the direction indicated by R.

Also, the folded portion 126b exerts a force F4 shown in FIG. 22 on the upper pedal member 110 and the lower pedal member 112, whereby the upper pedal member 110 and the lower pedal member 112 are caused to move rearwardly. At this time, when the brake pedal is not in its operated condition, since the upper pedal member 110 is connected to the piston rod 36, the upper pedal member 110 tends to keep the same position, while when the brake pedal is in its operated condition, the lower pedal member 112 tends to keep the same position due to the foot force exerted on the pedal. On the other hand, because the upper pedal member 110 and the lower pedal member 112 are connected to each other by the engaging member 118, the respective pedal members 110 and 112 are not easily moved rearwardly, both when the brake pedal is in its operated condition and when the brake pedal is not in its operated condition.

In this condition, because the engaging member 118 is formed to be spherical in shape, the respective pedal members 110 and 112 tend to be spaced apart in the width direction of the vehicle body with the engaging member 118 acting as a fulcrum due to the force F4. Furthermore, when the folded portion 126b is deformed, by the frictional force against the respective pedal members, the, folded portion 126b exerts the force F4 shown in FIG. 22 on the respective pedal members 110 and 112, whereby the respective pedal members 110 and 112 tend to be spaced apart in the width direction of the vehicle body.

At this time, because the upper pedal member 110 is connected to the piston rod 36, its movement in the width direction of the vehicle body is restricted, while the lower pedal member 112 can move in the width direction of the vehicle body, and thus the lower pedal member 112 moves away from the upper pedal member 110 in the width direction of the vehicle body.

Figure 25:
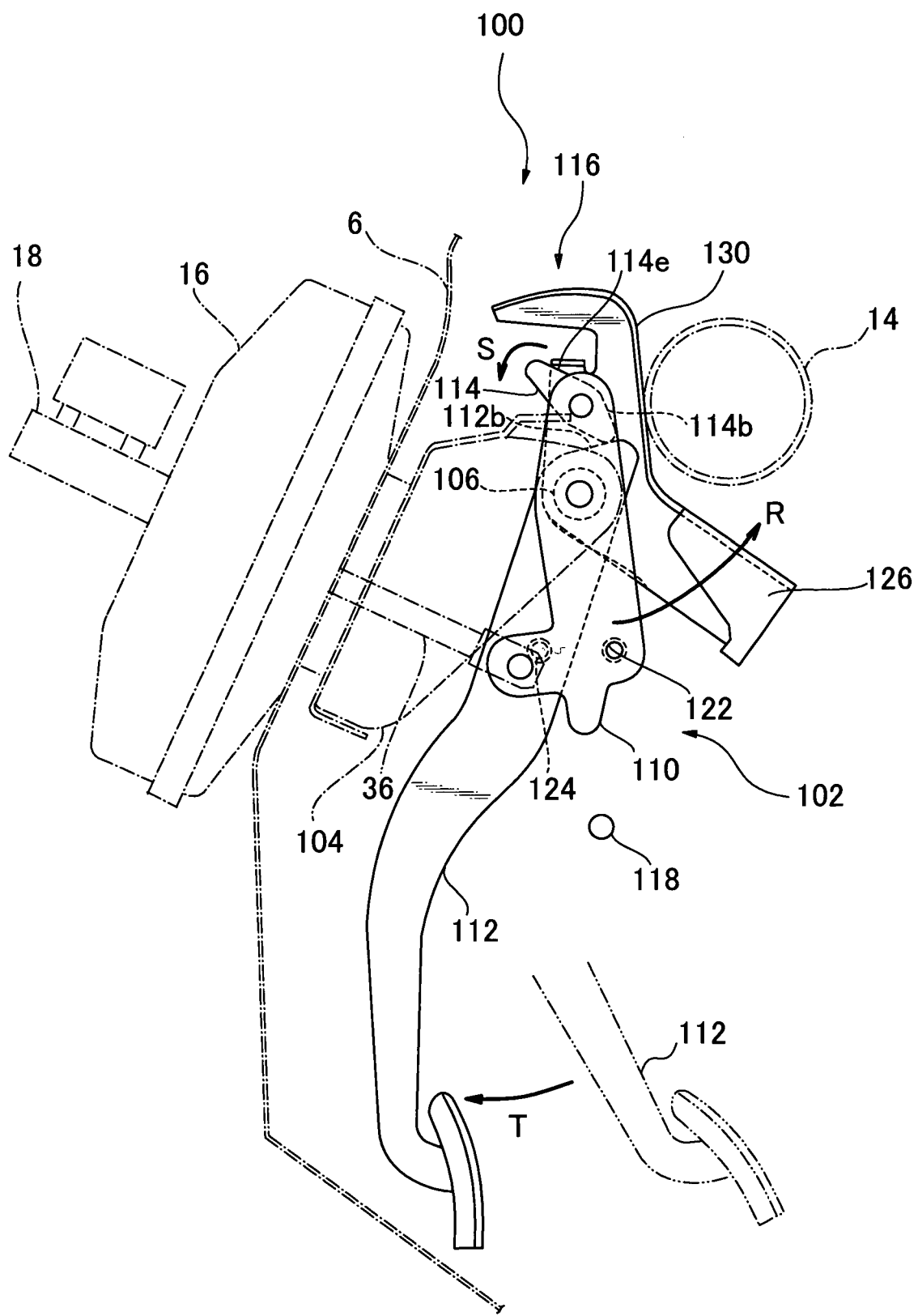
FIG. 25 is an another side view of the brake pedal support structure in accordance with the fourth embodiment of the present invention, wherein the brake pedal support structure is forcibly displaced.

The engaging force from the front to rear direction of the vehicle and the engaging force in the width direction of the vehicle body of the respective pedal members 110 and 112 which overlaps them are lost, whereby the lower pedal member 112 moves away from the upper pedal member 110 in the width direction of the vehicle body. As a result, as can be seen in FIG. 25, the engaging member 118 comes out of the engaging holes 122 and 124, and thus the respective pedal members can now pivot from the front to rear direction with respect to each other.

On the other hand, as can be seen in FIG. 24, when the lever member 116 pivots in the direction R, the second abutting portion 132 abuts against the upper rear side surface 114e of the upper portion of the cam member 114, whereby the cam member 114 tends to be rotated in the direction S. At this time, as described above, because the lower pedal member 112 can pivot with respect to the upper pedal member 110 from the front to rear direction, as shown in FIG. 25, the lower rear side surface 114b of the lower portion of the cam member 114 pushes the front side surface 112b formed at the top of the lower pedal member 112. As a result, the lower pedal member 112 is forcibly pivoted in the direction T, from the position shown by the chain line to the position shown by the solid line.

Accordingly, in this embodiment of the present invention, the lower pedal member 112 can be forcibly displaced reliably by the lever member 116 and the cam member 114, thus preventing the lower pedal member 112 from moving rearwardly into the cabin of the vehicle.

In an alternative embodiment of the present invention, the first abutting portion 130 of the lever member 116 or abutting member may be formed the same as the abutting portions 50g 50h, 80g, and 90g of the wing-cam or abutting members 50, 80, or 90 of the first to third embodiment described above. Also by adjusting the distance between the second abutting portion 132 of the lever member or abutting member 116 and the upper rear side surface 114e of the cam member 114, an effect similar to those of the first to third embodiments can be obtained.

Also, by providing the abutting member 32, 92, 94, or 96 of the vehicle on the instrument panel member 14 or reinforce member of the vehicle as described above with respect to the first to third embodiments, an effect similar to those of the first to third embodiments can be obtained.

Furthermore, by selecting the shape and extending direction of the lever member 116 or abutting member, or by selecting the outer shape or profile of the cam member 114 and its location, a result similar to that described with respect to the pivoting characteristic of the wing-cam 50 and the pivoting characteristic of the connecting elongated hole 68 obtained by the connecting mechanism 60 of the first embodiment can be obtained. By adding such a characteristic, a characteristic of the forcible displacement the same as that of the lower pedal member 48 can be obtained.

Although the first to fourth embodiments have been described with respect to the brake pedal unit, the present invention can be applied to other pedal assemblies, including a clutch pedal assembly or an accelerator pedal assembly.

Accordingly, in accordance with the first to the fourth embodiments of the present invention, a compact and integrated pedal assembly can be obtained, wherein the pedal can be forcibly displaced in the forward direction of the vehicle reliably.

Although the present invention has been explained with reference to specific, preferred embodiments, one of ordinary skill in the art will recognize that modifications and improvements can be made while remaining within the scope and sprit of the present invention. The scope of the present invention is determined solely by appended claims.

What is claimed is:

1. A support structure for a pedal of a vehicle which pivotably supports a pedal assembly to a pedal bracket mounted on a vehicle dash panel forming the front part of the inner space of the cabin of the vehicle, said support structure comprising:
a reinforce member for the vehicle body extending in the width direction of the vehicle, said reinforce member being located rearwardly relative to said pedal bracket;
an upper pedal member pivotably supported on said pedal bracket;
a lower pedal member pivotably supported on said upper pedal member, said lower pedal member having a pedal at lower end thereof;
an abutting member pivotably supported on said upper pedal member, said abutting member not coming into contact with said reinforce member when the vehicle is in a normal operation, while said abutting member abuts against said reinforce member by moving in the rearward direction of the vehicle body when the vehicle crashes; and
a connecting mechanism for connecting said abutting member to said lower pedal member in such a manner that relative movement with respect to each other is prevented when the vehicle is in a normal operation, while said connecting mechanism forcibly displaces the lower portion of said lower pedal member, which is located below a pivot shaft of the lower pedal member, in a forward direction with respect to said upper pedal member when the vehicle crashes,
wherein said connecting mechanism is comprised of a connecting elongated hole formed on said lower pedal member and a pin fixed on said abutting member and inserted in said connecting elongated hole.

2. A support structure for a pedal of a vehicle according to claim 1, wherein said connecting mechanism is a link mechanism which comprises:
a pivot shaft of said abutting member;
a front portion of said abutting member located in front of the pivot shaft thereof;
a pin fixed at the end of said front portion of said abutting member;
an upper portion of said lower pedal member;
a pivot shaft for said lower pedal member; and
a connecting elongated hole formed at an upper portion of said lower pedal member, which is located above the pivot shaft of said lower pedal member, said connecting elongated hole receiving said pin therein.

3. A support structure for a pedal of a vehicle according to claim 2, wherein said front portion of said abutting member located in front of the pivot shaft thereof is located in the direction, when the vehicle is in a normal operation, generally normal relative to said connecting elongated hole of said lower pedal member.

4. A support structure for a pedal of a vehicle according to claim 3, wherein said connecting elongated hole extends in a radial direction of the pivot shaft of the lower pedal member.

5. A support structure for a pedal of a vehicle according to claim 1, wherein said upper pedal member, said lower pedal member and said abutting member are located in the same space in a plan view.

6. A support structure for a pedal of a vehicle according to claim 1, wherein an abutting portion of said abutting member is formed in an area that comes into contact with said reinforce member of the vehicle body, both when the pedal is in its operated condition and when the pedal is not in its operated condition, and formed in an arc-like shape having a constant distance from said pivot shaft of said upper pedal member.

7. A support structure for a pedal of a vehicle which pivotably supports a pedal assembly to a pedal bracket mounted on a vehicle dash panel forming the front part of the inner space of the cabin of the vehicle, said support structure comprising:
a reinforce member for the vehicle body extending in the width direction of the vehicle, said reinforce member being located rearwardly relative to said pedal bracket;
an upper pedal member pivotably supported on said pedal bracket;
a lower pedal member pivotably supported on said upper pedal member, said lower pedal member having a pedal at lower end thereof;

an abutting member pivotably supported on said upper pedal member, said abutting member not coming into contact with said reinforce member when the vehicle is in a normal operation, while said abutting member abuts against said reinforce member by moving in the rearward direction of the vehicle body when the vehicle crashes; and a connecting mechanism for connecting said abutting member to said lower pedal member in such a manner that relative movement with respect to each other is prevented when the vehicle is in a normal operation, while said connecting mechanism forcibly displaces the lower portion of said lower pedal member, which is located below a pivot shaft of the lower pedal member, in a forward direction with respect to said upper pedal member when the vehicle crashes, wherein an a butting portion of said abutting member is formed in an area that comes into contact with said reinforce member of the vehicle, both when the pedal is in its operated condition and when the pedal is not in its operated condition, and formed in such a manner that the distance of said abutting portion from said reinforce member of the vehicle when the pedal is in its operated condition is the same as that when the pedal is not in its operated condition.

8. A support structure for a pedal of a vehicle according to claim 1, wherein said abutting portion of said abutting member is formed in an area that comes into contact with said reinforce member of the vehicle, both when the pedal is in its operated condition and when the pedal is not in its operated condition, and formed in such a manner that the distance of said abutting portion from said pivot shaft of said upper pedal member, when the pedal is in its operated condition, is longer than that of when the pedal is not in its operated condition.

9. A support structure for a pedal of a vehicle according to claim 1, wherein said abutting portion of said abutting member is formed in an area that comes into contact with said reinforce member of the vehicle, both when the pedal is in its operated condition and when the pedal is not in its operated condition, and formed in such a manner that the distance of said abutting portion from said pivot shaft of said upper pedal member, when the pedal is in its operated condition, is shorter than that of when the pedal is not in its operated condition.

10. A support structure for a pedal of a vehicle which pivotably supports a pedal assembly to a pedal bracket mounted on a vehicle dash panel forming the front part of the inner space of the cabin of the vehicle, said support structure comprising:

a reinforce member for the vehicle body extending in the width direction of the vehicle, said reinforce member being located rearwardly relative to said pedal bracket;

an upper pedal member pivotably supported on said pedal bracket;

a lower pedal member pivotably supported on said upper pedal member, said lower pedal member having a pedal at lower end thereof;

an abutting member pivotably supported on said upper pedal member, said abutting member not coming into contact with said reinforce member when the vehicle is in a normal operation, while said abutting member abuts against said reinforce member by moving in the rearward direction of the vehicle body when the vehicle crashes; and a connecting mechanism for connecting said abutting member to said lower pedal member in such a manner that relative movement with respect to each other is prevented when the vehicle is in a normal operation, while said connecting mechanism forcibly displaces the lower portion of said lower pedal member, which is located below a pivot shaft of the lower pedal member, in a forward direction with respect to said upper pedal member when the vehicle crashes, wherein said connecting mechanism is a link mechanism which comprises:

a pivot shaft of said abutting member;

a front portion of said abutting member located in front of the pivot shaft thereof;

a pin fixed at the end of said front portion of said abutting member;

an upper portion of said lower pedal member;

a pivot shaft for said lower pedal member; and a connecting elongated hole formed at an upper portion of said lower pedal member, which is located above the pivot shaft of said lower pedal member, said connecting elongated hole receiving said pin therein, wherein the speed of the forcible displacement of said lower pedal member in from the initial stage to the late stage of crash of the vehicle is determined by the extending direction of said connecting elongated hole of said lower pedal member; and wherein said abutting member and said connecting mechanism are constructed in such a manner that, when the vehicle crashes, the amount of the forcible displacement of said lower pedal member in the late stage of crash of the vehicle is greater than that of in the initial stage of crash of the vehicle.

11. A support structure for a pedal of a vehicle according to claim 10, wherein the speed of the forcible displacement of said lower pedal member in from the initial stage to the late stage of crash of the vehicle is determined by the extending direction of the upper portion of said abutting member, which is located above the pivot shaft of said abutting member and includes said abutting portion thereof.

12. A support structure for a pedal of a vehicle according to claim 10, wherein said abutting member is constructed in such a manner that the upper portion of said abutting member located above the pivot shaft thereof and including said abutting portion extends to the right above of said pivot shaft, and wherein said connecting elongated hole of said lower pedal member is formed along a direction generally normal relative to the direction in which the front portion of said abutting member located in front of the pivot shaft thereof extends.

13. A support structure for a pedal of a vehicle according to claim 1, wherein said abutting member and said reinforce member of the vehicle includes a pinch force reducing means which reduces pinch a force generated by the abutment between the abutting member and the reinforce member and prevents the pinch force from affecting said connecting mechanism, when the vehicle crashes.

14. A support structure for a pedal of a vehicle according to claim 13, wherein said reinforce member of the vehicle is formed in such a manner that said reinforce member of the vehicle has a plane and/or convex shape in the width direction of the vehicle body, so as to prevent the displacement of said abutting member in the width direction of the vehicle body from being restricted, when the vehicle crashes and said abutting member is abutted against said reinforce member of the vehicle.

15. A support structure for a pedal of a vehicle according to claim 13, wherein said abutting member is connected to said upper pedal member with one of the sides of said abutting member exposed.

16. A support structure for a pedal of a vehicle according to claim 13, wherein said connecting mechanism is a link mechanism which comprises:
   a pivot shaft of said abutting member;
   a front portion of said abutting member located in front of the pivot shaft thereof;
   a pin fixed at the end of said front portion of said abutting member;
   an upper portion of said lower pedal member;
   a pivot shaft for said lower pedal member; and
   a connecting elongated hole formed at an upper portion of said lower pedal member, which is located above the pivot shaft of said lower pedal member, said connecting elongated hole receiving said pin therein,
   wherein said upper pedal member has a guiding elongated hole which receives said pin therein for providing guidance for said pin when said pin is slidingly moved in the connecting elongated hole; and
   wherein said connecting elongated hole is formed tightly with respect to said pin, while said guiding elongated hole is formed loosely with respect to said pin.

17. A support structure for a pedal of a vehicle according to claim 16, wherein said guiding elongated hole of the said upper pedal member includes an area which has a normally tight relationship with respect to said pin.

18. A support structure for a pedal of a vehicle according to claim 16, wherein said upper pedal member is comprised of a first upper pedal member and a second upper pedal member disposed on each side of the said lower pedal member, respectively.

19. A support structure for a pedal of a vehicle according to claim 1, wherein said connecting mechanism is a link mechanism which comprises:
   a pivot shaft of said abutting member;
   a front portion of said abutting member located in front of the pivot shaft thereof;
   a pin fixed at the end of said front portion of said abutting member;
   an upper portion of said lower pedal member;
   a pivot shaft for said lower pedal member; and
   a connecting elongated hole formed at an upper portion of said lower pedal member, which is located above the pivot shaft of said lower pedal member, said connecting elongated hole receiving said pin therein,
   wherein said pin is comprised of a body portion inserted in said connecting elongated hole and penetrates into said abutting member, and a fixing portion for fixing said body portion to said abutting member, and
   wherein said connecting elongated hole extends in a radial direction of the pivot shaft of said lower pedal member, and said connecting elongated hole of said lower pedal member is formed along a direction generally normal relative to the direction in which the front portion of said abutting member located in front of the pivot shaft thereof extends.

20. A support structure for a pedal of a vehicle according to claim 19, wherein said upper pedal member has a guiding elongated hole which receives said pin therein for providing guidance for said pin when said pin is slidingly moved in the connecting elongated hole, and wherein said guiding elongated hole has a holding portion which holds said pin in such a manner that relative movement between said upper pedal member and said lower pedal member is prevented when the vehicle is in a normal operation, and which is destroyed so as to provide sliding movement of said pin in said guiding elongated hole when the vehicle crashes.

21. A support structure for a pedal of a vehicle according to claim 20, wherein said upper pedal member is comprised of first and second upper pedal members, one of which is thinner than the other, and the thinner member has said holding portion formed thereon.

22. A support structure for a pedal of a vehicle according to claim 19, wherein said pedal bracket is alTanged so as to cover a head portion of the pin of the connecting mechanism and so as to be located near the location where disengagement of said pin out of said connecting elongated hole and said abutting member is prevented.

23. A support structure for a pedal of a vehicle according to claim 19, wherein said upper pedal member has a guiding elongated hole which receives said pin therein for providing guidance for said pin when said pin is slidingly moved in the connecting elongated hole, and wherein said guiding elongated hole of the said upper pedal member includes an area which has a normally tight relationship with respect to said pin.

* * * * *

UNITED STATES PATENT AND TRADEMARK OFFICE
CERTIFICATE OF CORRECTION

PATENT NO. : 7,415,909 B2
APPLICATION NO. : 11/081881
DATED : August 26, 2008
INVENTOR(S) : Keisuke Miyoshi et al.

Page 1 of 1

It is certified that error appears in the above-identified patent and that said Letters Patent is hereby corrected as shown below:

On the Cover Page:

item (73) Assignee: should read --AUTO TECHNICA CORPORATION, Hiroshima (JP)--

Signed and Sealed this

Ninth Day of December, 2008

JON W. DUDAS
*Director of the United States Patent and Trademark Office*